US007561737B2

(12) United States Patent
Zou et al.

(10) Patent No.: US 7,561,737 B2
(45) Date of Patent: Jul. 14, 2009

(54) MATHEMATICAL EXPRESSION RECOGNITION

(75) Inventors: Yu Zou, Beijing (CN); Lei Huang, Beijing (CN); Mingqing Xu, Beijing (CN); Jian-Lai Zhou, Bejing (CN); Yue Li, Beijing (CN); Dongmei Zhang, Beijing (CN); Xiaohui Hou, Beijing (CN); Wenli Zhu, Beijing (CN); Hongyun Yang, Beijing (CN); Xianfang Wang, Beijing (CN); Jiang Wu, San Jose, CA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 11/155,604

(22) Filed: Jun. 20, 2005

(65) Prior Publication Data

US 2006/0062466 A1    Mar. 23, 2006

Related U.S. Application Data

(60) Provisional application No. 60/611,847, filed on Sep. 22, 2004.

(51) Int. Cl.
*G06K 9/18* (2006.01)
(52) U.S. Cl. .................. 382/186; 382/181; 382/200; 382/201
(58) Field of Classification Search ................. 382/186
See application file for complete search history.

(56) References Cited

U.S. PATENT DOCUMENTS

| | | | | |
|---|---|---|---|---|
| 5,577,135 | A * | 11/1996 | Grajski et al. | ............... 382/253 |
| 6,694,055 | B2 | 2/2004 | Wu | |
| 6,766,320 | B1 | 7/2004 | Wang et al. | |
| 7,447,360 | B2 | 11/2008 | Li et al. | |
| 2002/0126905 | A1* | 9/2002 | Suzuki et al. | ............... 382/229 |
| 2003/0070161 | A1* | 4/2003 | Wong et al. | ................. 717/148 |
| 2006/0062467 | A1 | 3/2006 | Zou et al. | |
| 2006/0062468 | A1 | 3/2006 | Xu et al. | |
| 2006/0062470 | A1 | 3/2006 | Zhu et al. | |
| 2006/0062471 | A1 | 3/2006 | Xu et al. | |

OTHER PUBLICATIONS

Zanibbi, "Recognition of Mathematics Notation via Computer Baseline Structure".*
Grune, Dick and Jacobs, Ceriel J.H., "Parsing Techniques—A Practical Guide," printed from http://www.cs.vu.nl/~dick/PTAPG.html, printed Jun. 20, 2005, 2 pages.

(Continued)

*Primary Examiner*—Bhavesh M Mehta
*Assistant Examiner*—Michael Vanchy, Jr.
(74) *Attorney, Agent, or Firm*—Perkins Coie LLP

(57) ABSTRACT

A mechanism for recognizing and inputting handwritten mathematical expressions into a computer by providing a multi-path framework is described. The framework may include symbol grouping and recognition, tabular structure analysis, subordinate sub-expression analysis, subscript/superscript analysis and character determination, and semantic structure analysis components. A method for recognizing a handwritten mathematical expression includes receiving a plurality of input strokes corresponding to a handwritten mathematical expression and providing a candidate list of recognized candidate expressions based upon the input strokes. Input strokes are grouped into symbols, tabular structures are determined, dominant symbol candidates and subordinate symbols are determined, and subscript and superscript structures are determined.

17 Claims, 43 Drawing Sheets

OTHER PUBLICATIONS

Earley, Jay, "An Efficient Context-Free Parsing Algorithm," Communications of the ACM, vol. 13, No. 2, Feb. 1970, pp. 94-102.

Yu, Hua and Yang, Jie, "Rapid and Brief Communication, A direct LDA algorithm for high-dimensional data—with application to face recognition," Pattern Recognition 34 (2001), pp. 2067-2070.

Jain, Anil K., Duin, Robert P.W., and Mao, Jianchang, "Statistical Pattern Recognition: A Review," IEEE Transactions on Pattern Analysis and Machine Intelligence, vol. 22, No. 1, Jan. 2000, pp. 4-37.

Zanibbi, Richard, "Recognition of Mathematics Notation via Computer Using Baseline Structure," Aug. 3, 2000, pp. 3-87.

Myers, C., Rabiner, L., and Rosenberg, A., "Performance Tradeoffs in Dynamic Time Warping Algorithms for Isolated Word Recognition," IEEE Transactions on Acoustics, Speech, and Signal Processing, vol. ASSP-28, No. 6, Dec. 1980, pp. 623-635.

* cited by examiner

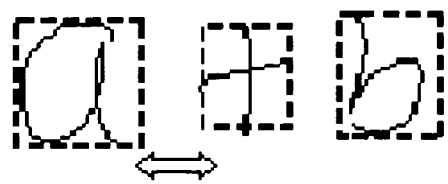
(a)
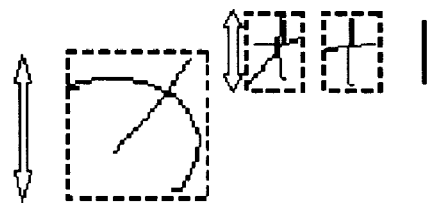
(b)
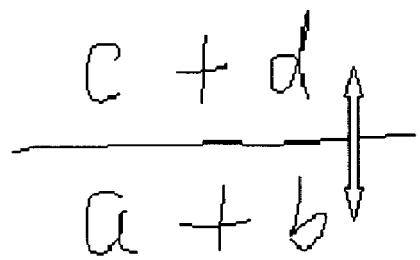
(c)
FIGURE 21
2201
2203
FIGURE 22
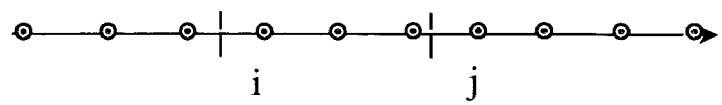
FIGURE 23

$$\begin{pmatrix} 1 & 1 & \lambda+3 \\ 0 & \lambda+1 & -\lambda-1 \\ 0 & -(\lambda+1) & -\lambda^2-\lambda \end{pmatrix}$$

(a) Matrix with brackets $$\begin{bmatrix} 1 & -\frac{\sqrt{5}}{3} & -\frac{5}{\sqrt{24}} \\ 0 & \frac{\sqrt{5}}{3} & -\frac{1}{\sqrt{24}} \\ 0 & 0 & \frac{2}{\sqrt{24}} \end{bmatrix}$$

(b) Matrix with square bracket $$\left| \begin{array}{ccc} \sin\alpha & \sin\beta & \sin\gamma \\ \frac{\partial}{\partial x} & \frac{\partial}{\partial y} & \frac{\partial}{\partial z} \\ P & Q & R \end{array} \right|$$

(c) Determinant $$\begin{Bmatrix} u_i \\ u_{\xi i} \\ u_{\eta i} \\ u_{\zeta i} \end{Bmatrix}$$

(d) Column vector

FIGURE 29A-29D

$$\begin{cases} 2x_1 - 4x_2 + 5x_3 + 3x_4 = 0 \\ 3x_1 - 6x_3 + 4x_3 + 2x_4 = 0 \\ 4x_1 - 8x_2 + 3x_3 + x_4 = 0 \end{cases}$$

(a)

$$f(x) = \begin{cases} a\frac{\sin x - x}{x^3}, & x > 0 \\ \frac{1}{x}(2\sin x - \int_0^x \sin t^2 dt), & x < 0 \end{cases}$$

$$-\frac{b}{2a} \pm \sqrt{b^2 - 4ac} \implies$$

$$f_R(x, y) = \frac{1}{1 + \left(\frac{|o_R(x)|}{x_0}\right)^{\lambda_x}} \times \frac{1}{1 + \left(\frac{|o_R(y)|}{y_0}\right)^{\lambda_y}}$$

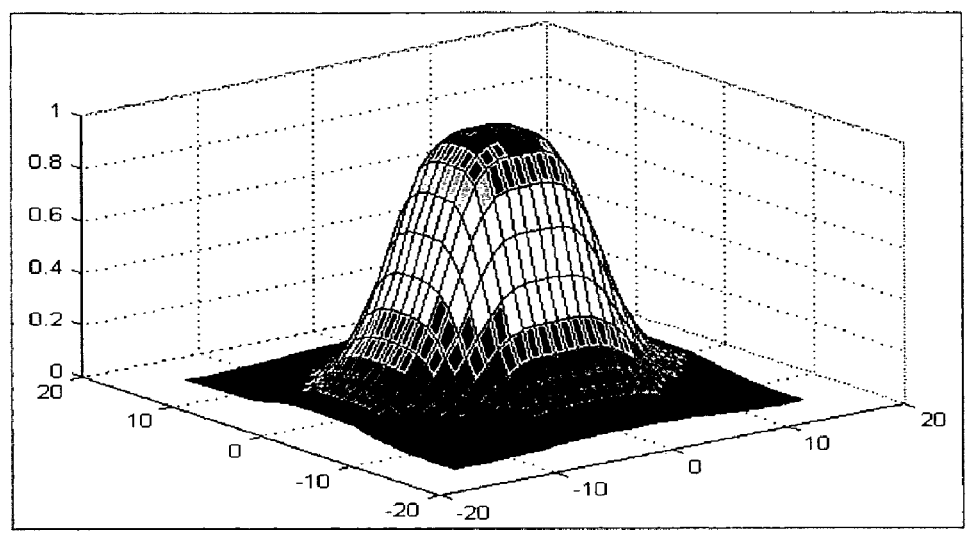
FIGURE 36
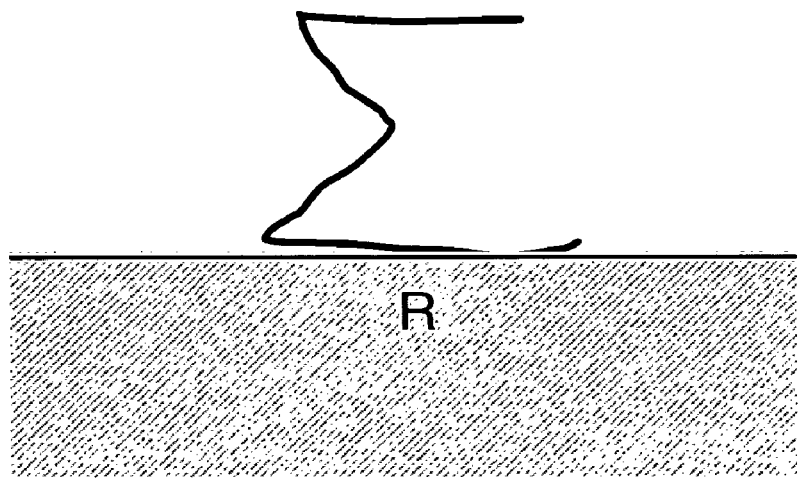
FIGURE 37
$$\text{Relation score} = \frac{1}{\text{area of } S} \iint_S f_R(x, y)\, dx\, dy$$
FIGURE 38

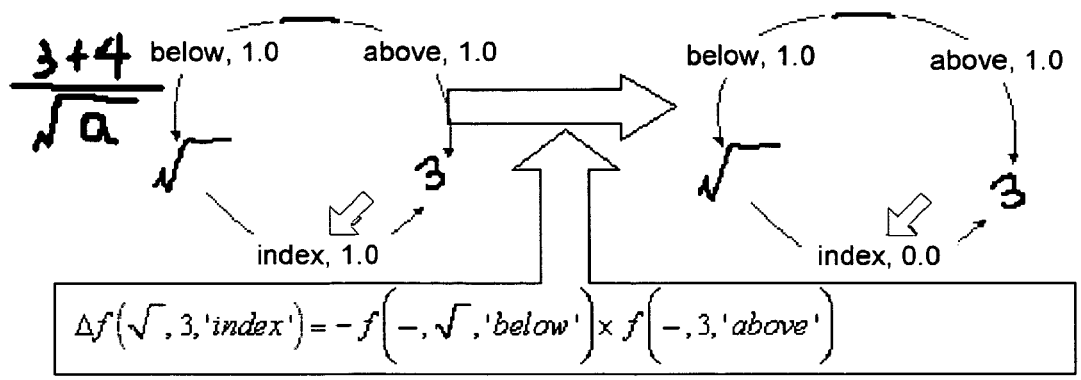
FIGURE 42
$$\Delta f(A,B,R) = -\sum_{s \in S}\left( f(A,s,R) \times f_H(s,B) + \sum_{r \in H}\left(f(s,A,r) \times f_{\bar{r}}(s,B)\right)\right)$$
*where*
$f(A,B,R)$ *denotes the score for R relation between A and B,*
$\bar{r}$ *denotes all relations in H except r*
$$f_H = \sum_{R \in H} f(A,B,R)$$
FIGURE 43
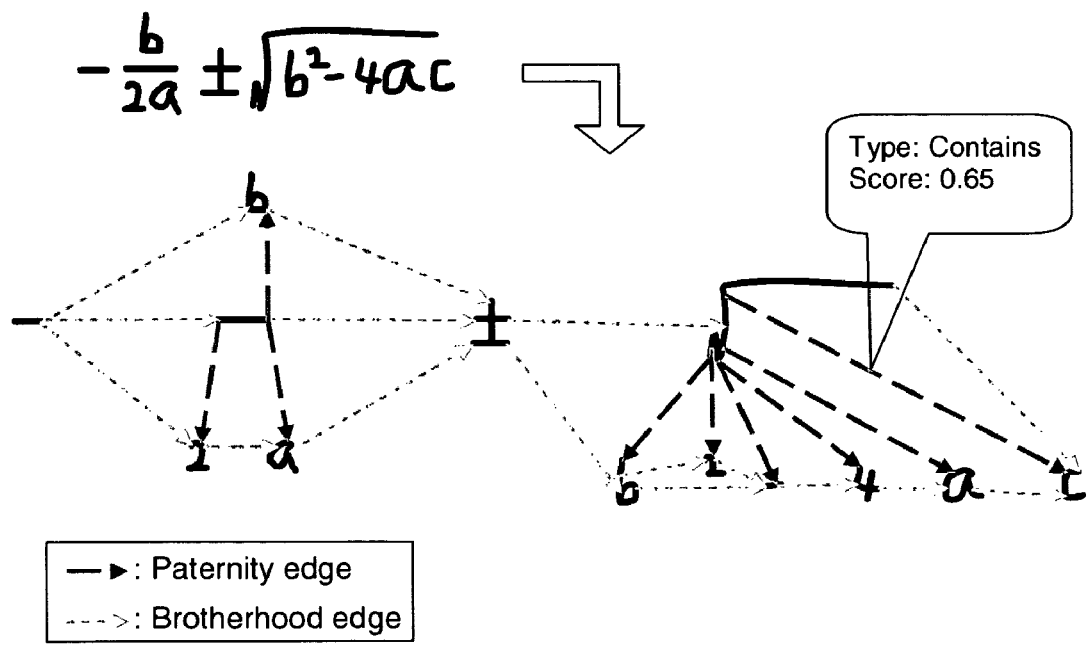
FIGURE 44

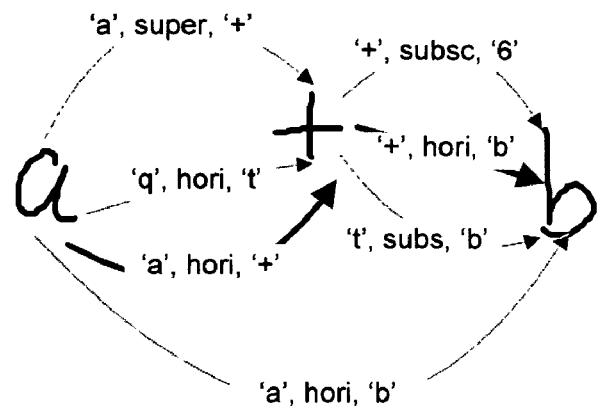
FIGURE 51
$$f(A, B, R) = f^*_{space}(A, B, R) \times f_{bigram}(A, B, R) \times f(S_A) \times f(S_B)$$
*where*
$f(S_A)$ *denotes the reco confidence of* $A$
$f(S_B)$ *denotes the reco confidence of* $B$
FIGURE 52
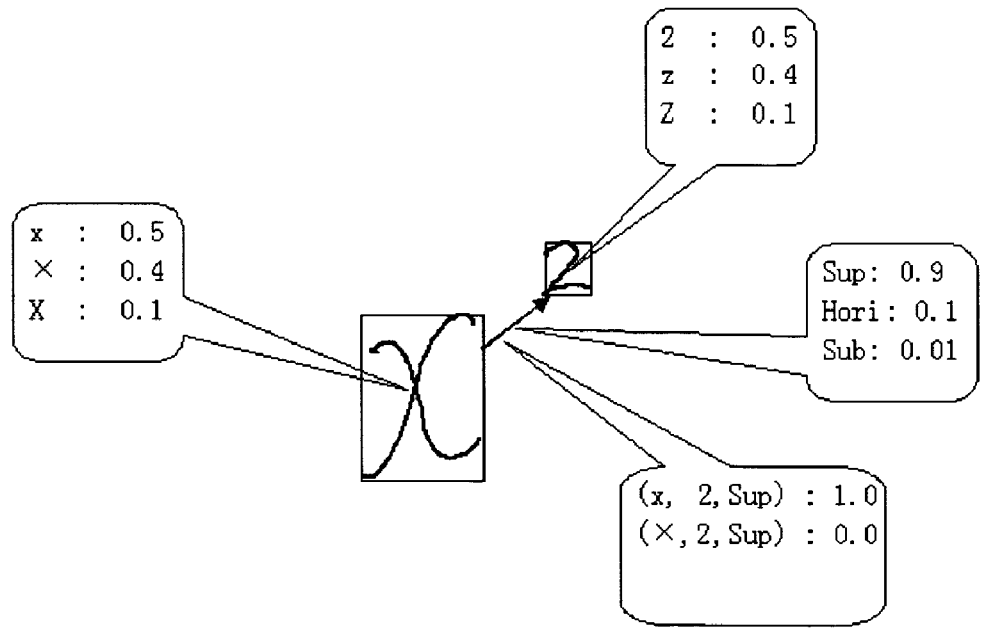
FIGURE 53

$$V_{AB} = \frac{(top(B)+bottom(B))-(top(A)+bottom(A))}{height(A \cup B)}$$

$height(A \cup B)$   $\frac{(top(B)+bottom(B))-(top(A)+bottom(A))}{2}$ $$f_{space}(A,B,R) = \frac{1}{\sigma_R} \exp\left\{\frac{(V_{AB}-\mu_R)^2}{2\sigma_R^2}\right\}$$

$$f_{space}(A,B,R) \xrightarrow{normalize} f^*_{space}(A,B,R)$$

$$f_{bigram}(A,B,R) = p(S_B \mid S_A, R) = \frac{p(R, S_A, S_B)}{p(S_A, R)}$$

Search    Convert to Linear Format    Syntax parse $$\sqrt{b^2 - 4ac}$$

$$\sqrt{b^2 - 4ac} \quad \sqrt{b^2 - 4ac}$$

FIGURE 61

$$\frac{-b \pm \sqrt{b^2 - 4ac}}{2}$$

FIGURE 62

$$-b \pm \frac{\sqrt{b^2 - 4ac}}{2}$$

$$-b \pm \frac{\sqrt{b^2 - 4a}}{2} c$$

$$-b \pm \frac{\sqrt{b^2 - 4}}{2} a$$

$$-b \pm \frac{\sqrt{b^2 - 4ac}}{2}$$

$$-b \pm \frac{\sqrt{b^2 - 4a}}{2} c$$

$$-b \pm \frac{\sqrt{b^2 - 4c}}{2} a$$

$$-b \pm \frac{\sqrt{b^2 - 4ac}}{2}$$

$$-b \pm \frac{\sqrt{b^2 - 4}}{2} u$$

FIGURE 63

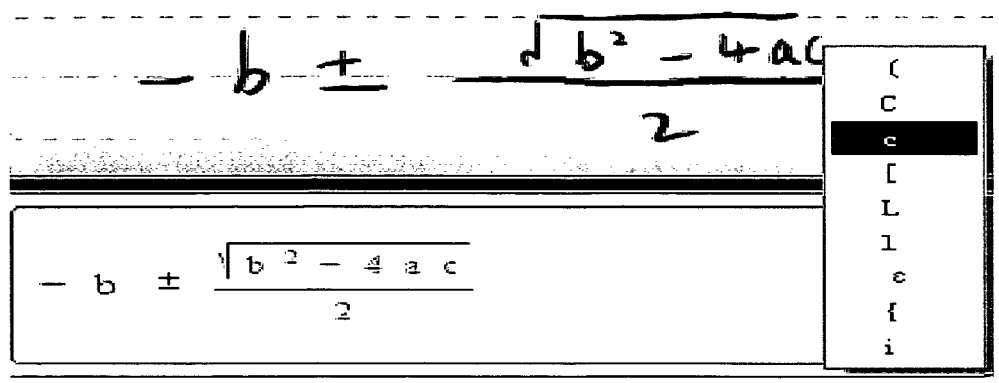
FIGURE 64
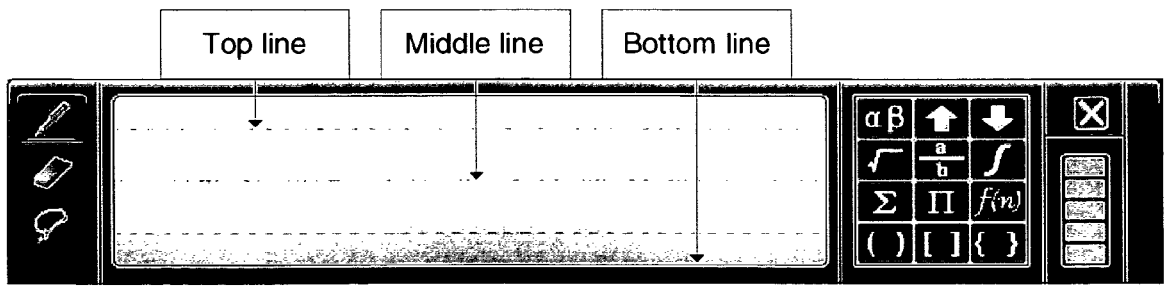
FIGURE 65
FIGURE 66

Handwritten Math Equation ☒

$$\int_0^\infty x\, dx = \frac{\sqrt{x^2 + y^2} + c}{\sum_{n=1}^{\infty} \overline{x}_n + m_1} + \sin\alpha$$

Initiate $$O^\infty 1 \times dx = \frac{\sqrt{x^2 t y^2 + c}}{n_{-1}^{\frac{2}{\sigma}} \overline{x}^{nf}} - m_1^{+s_1^- nx} \Big|$$

Transfer $$O^\infty 1xdx = \frac{\sqrt{x^2 t y_{7c}^2}}{n_{-1}^{\frac{2}{\sigma}} \overline{x}^{nf}} - m_1^{ts_1^- n\alpha}$$

— 7633

$$O^\infty iXdx = \frac{\sqrt{x^2 \div y_t c^2}}{n_{-1}^{\frac{2}{\sigma}} \overline{x}^f} - m_1^{t\sin a}$$

— 7635

$$O^\infty 1Xdx = \frac{\sqrt{x^2 t g^2 + c}}{n_{-1_n}^{\frac{2}{\sigma}} \overline{x}^t} - m_1^{ts\, n\alpha}$$

Enter Expression Again — 7637

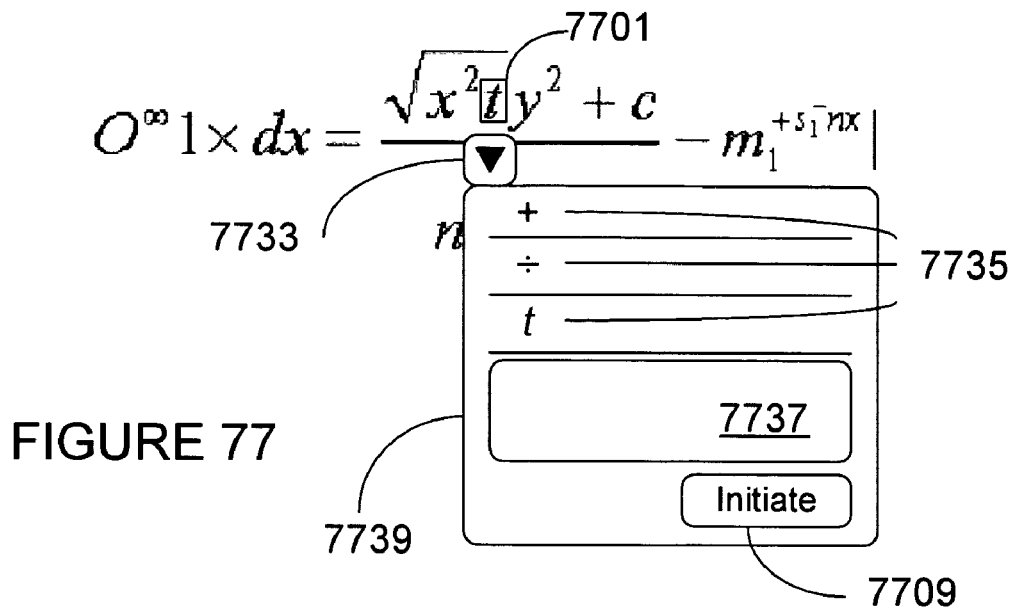
FIGURE 77
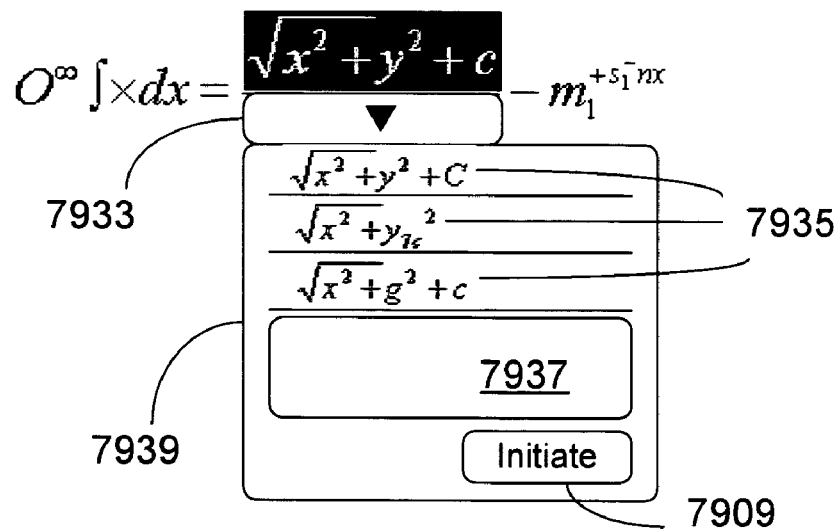
FIGURE 78
FIGURE 79

$$O^\infty 1 \times dx = \frac{\sqrt{x^2 t y^2} + c}{n_{-1}^{\frac{2}{2}} \bar{x}^{n^J}} - m_1^{+s_1^- nx}$$

$$O^\infty 1 \times dx = \frac{\sqrt{x^2 t y^2} + c}{n_{-1}^{\frac{2}{2}} \bar{x}^{n^J}} - m_1^{+s_1^- nx}$$

$$O^\infty 1 \times dx = \frac{\sqrt{x^2 t y^2} + c}{n_{-1}^{\frac{2}{2}} \bar{x}^{n^J}} - m_1^{+s_1^- nx}$$

MATHEMATICAL EXPRESSION RECOGNITION

This application claims priority to and the benefit of U.S. Provisional Application No. 60/611,847, filed Sep. 22, 2004, which is herein incorporated by reference.

BACKGROUND

When writing scientific literature and articles using a computer, users often must input various and sometimes complex mathematical expressions. Today, a user has to input the mathematical expressions in an indirect manner. For example, FIGS. 1A and 1B show two systems for inputting a mathematical expression: a structured expression editor, such as Equation Editor by Microsoft® Corporation of Redmond, Wash. (FIG. 1A); and an expression descript language, such as $L_AT^EX$ Equation Editor (FIG. 1B). FIG. 1A shows a large tool box 101 which contains items 105-1-105-N corresponding to various mathematical symbols and structures. The input of expressions may be laborious for some as a user has to find the proper symbol or structure from the groupings. FIG. 1B shows a second system that is oriented more towards an expert in the area of mathematical expression script languages. Users have to become experts of the script language before they may utilize the language to input expressions freely. Both systems are designed for the mathematical expression to be inputted by a keyboard.

The use of an electronic pen and/or stylus input device is a more natural method for users to input mathematical expressions. The tablet style computer allows a user to enter handwritten notes; however, mathematical expressions have not been recognized with high accuracy by existing handwriting recognition software packages. A need exists for handwritten mathematical expression recognition to enable pen-based input. Comparing to printed expressions, more ambiguities exist in handwritten expressions. Firstly, it is hard to differentiate symbols from each other just by using shape information. For example, 'X' is very similar to '×', such as for designating a multiplication operation. Another typical example is a 'dot'. When a dot is located at a position of a subscript, it is a decimal dot. However, when the dot is at a mid-level position, it is a dot operator. Secondly, there are many uncertainties in a layout structure. For example, a numerator may expand to a region outside of a fraction line because there is not enough room above the line.

With the rise in use of the tablet style computer, applications are being created and/or updated to implement handwritten annotation recognition. However, handwritten text recognition and ink document analysis are the only recognition and analysis systems enabled in a freehand input system. Handwritten mathematical expression recognition has not been available yet.

SUMMARY

Handwritten notations systems for text input allows a user to freely write notes. However, conventional systems do not allow a user to input handwritten mathematical expressions. The invention is a mechanism for recognizing and inputting handwritten mathematical expressions into a computer by providing a multi-path framework. The framework includes symbol grouping and recognition, tabular structure analysis, subordinate sub-expression analysis, subscript/superscript analysis and character determination, and semantic structure analysis components. Claims are directed to systems for receiving and grouping input strokes corresponding to handwritten mathematical expressions into symbols and recognizing the symbols as a mathematical expression for display to a user.

DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 21 illustrates a use of features for determining grouping in accordance with at least one aspect of the present invention;

FIG. 22 illustrates an ambiguous handwritten mathematical expression for symbol grouping;

FIG. 23 illustrates an optimal segmentation of a sequence in accordance with at least one aspect of the present invention;

FIGS. 29A-29D illustrate examples of handwritten mathematical matrices;

FIGS. 30A-30B illustrate examples of handwritten mathematical multi-line expressions;

FIG. 36 is an illustrative example of a graphical description of the equation from FIG. 35 in accordance with at least one aspect of the present invention;

FIG. 37 illustrates an example of a rectangle centered control region for 'Above' and 'Below' sub-expression types respectively in accordance with at least one aspect of the present invention;

FIG. 38 is an equation used to calculate a relational score in accordance with at least one aspect of the present invention;

FIG. 42 illustrates relational scores between strokes of handwritten mathematical expressions in accordance with at least one aspect of the present invention;

FIG. 43 is an overall formal equation to be used to adjust relational scores by global information in accordance with at least one aspect of the present invention;

FIG. 44 is an example relational graph in accordance with at least one aspect of the present invention;

FIG. 51 is an illustrative graph including scores calculated for given edges in accordance with at least one aspect of the present invention;

FIG. 52 is an equation to calculate an edge score in accordance with at least one aspect of the present invention;

FIG. 53 is an illustrative example of score calculators for given parts of handwritten mathematical expression in accordance with at least one aspect of the present invention;

FIG. 61 is an illustrative example of different subordinate sub-expression analysis schemes in accordance with at least one aspect of the present invention;

FIG. 62 illustrates the interaction of a sub expression in a mathematical expression input panel in accordance with at least one aspect of the present invention;

FIG. 63 illustrates an example of a candidate menu in accordance with at least one aspect of the present invention;

FIG. 64 illustrates an example of a symbol candidate menu in the user interface of a mathematical expression input panel in accordance with at least one aspect of the present invention;

FIG. 65 illustrates another example of a candidate menu in accordance with at least one aspect of the present invention;

FIG. 66 illustrates an example of the input area of a user interface of a mathematical expression input panel in accordance with at least one aspect of the present invention;

FIG. 76 illustrates another example of the graphical user interface shown in FIG. 75 with a candidate list in accordance with at least one aspect of the present invention;

FIG. 77 illustrates another example of a graphical user interface with a dropdown menu for a single character in accordance with at least one aspect of the present invention;

FIG. 78 illustrates another example of a graphical user interface with placeholders for a symbol in accordance with at least one aspect of the present invention;

FIG. 79 illustrates another example of a graphical user interface with a dropdown menu for a sub-expression in accordance with at least one aspect of the present invention;

DETAILED DESCRIPTION

In the following description of the various embodiments, reference is made to the accompanying drawings, which form a part hereof, and in which is shown by way of illustration of various embodiments in which the invention may be practiced. It is to be understood that other embodiments may be utilized and structural and functional modifications may be made without departing from the scope of the present invention.

Figure 1A:
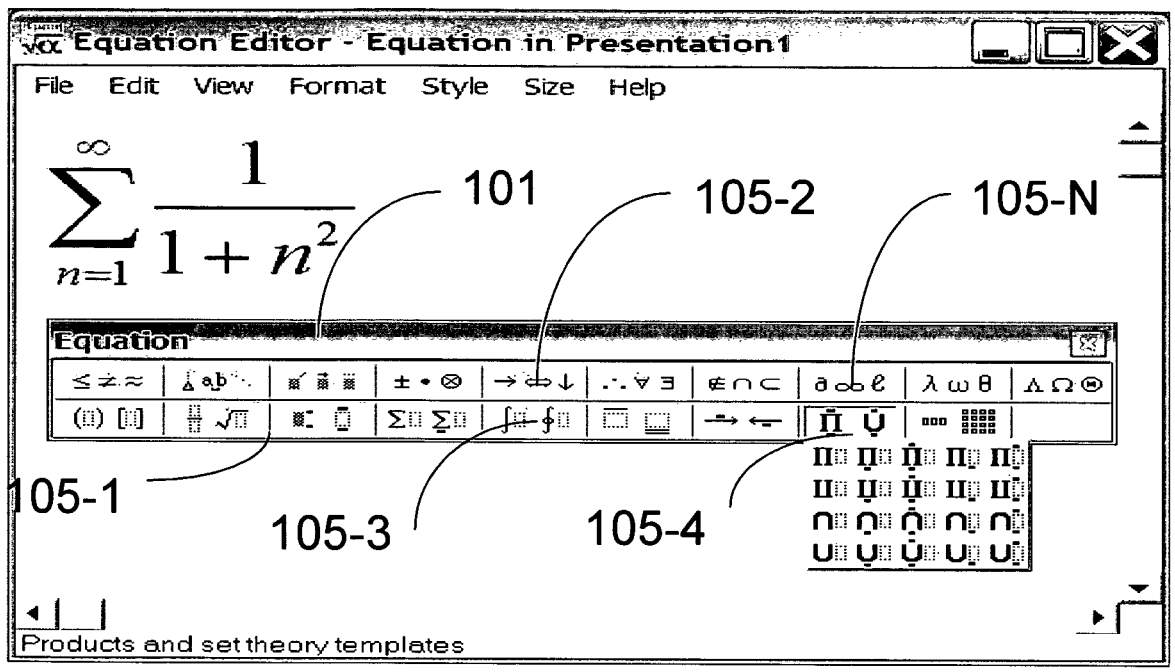
FIG. 1A shows a conventional graphical user interface for inputting mathematical expressions.
Figure 1B:
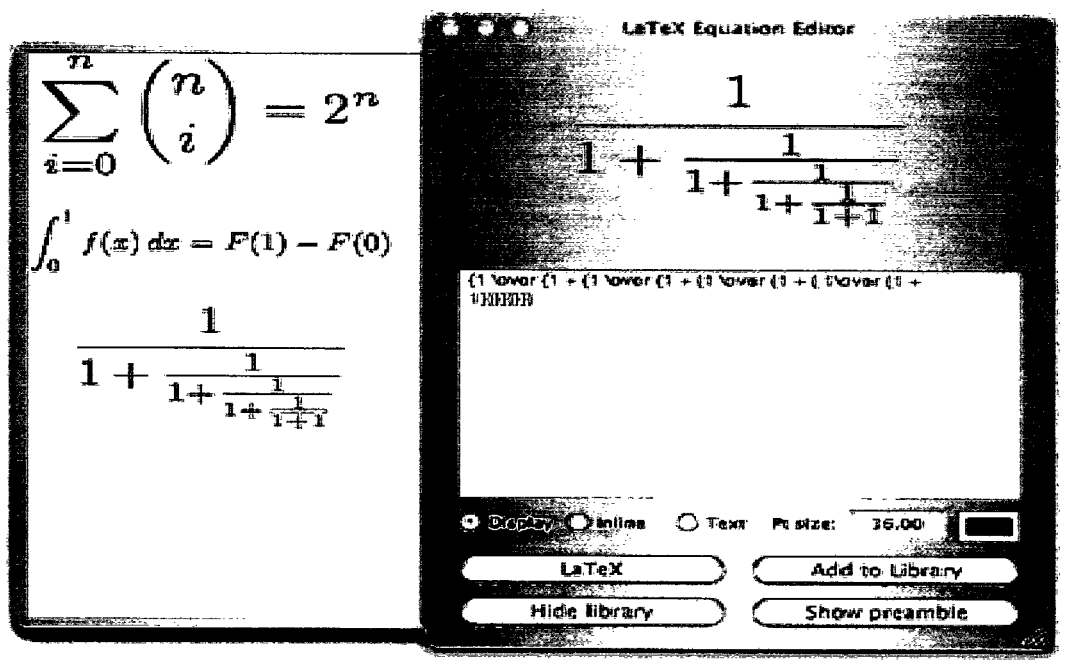
FIG. 1B shows another conventional graphical user interface for inputting mathematical expressions.
Figure 2A:
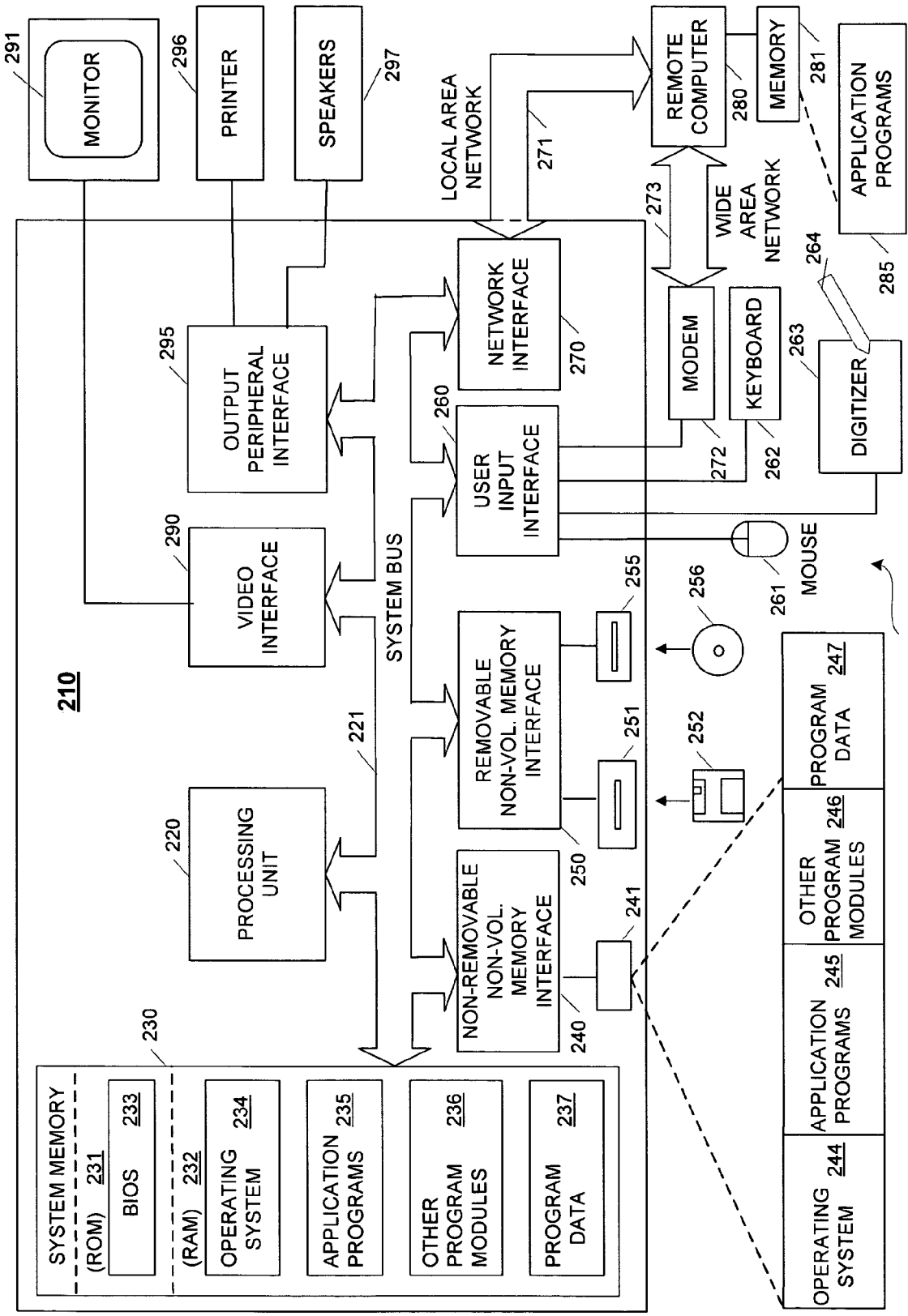
FIG. 2A illustrates a schematic diagram of a general-purpose digital computing environment in which certain aspects of the present invention may be implemented.

FIG. 2A illustrates an example of a suitable computing system environment 200 on which the invention may be implemented. The computing system environment 200 is only one example of a suitable computing environment and is not intended to suggest any limitation as to the scope of use or functionality of the invention. Neither should the computing system environment 200 be interpreted as having any dependency nor requirement relating to any one or combination of components illustrated in the example computing system environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2A, an illustrative system for implementing the invention includes a general-purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media may be any available media that may be accessed by computer 210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as ROM 231 and RAM 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2A illustrates operating system 234, application programs 235, other program modules 236, and program data 237.

The computer 210 may also include other removable/non-removable, volatile/nonvolatile computer storage media. By way of example only, FIG. 2A illustrates a hard disk drive 241 that reads from or writes to non-removable, nonvolatile magnetic media, a magnetic disk drive 251 that reads from or writes to a removable, nonvolatile magnetic disk 252, and an optical disc drive 255 that reads from or writes to a removable, nonvolatile optical disc 256 such as a CD ROM or other optical media. Other removable/non-removable, volatile/nonvolatile computer storage media that may be used in the illustrative operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disc drive 255 are typically connected to the system bus 221 by a removable memory interface, such as interface 250.

The drives and their associated computer storage media discussed above and illustrated in FIG. 2A, provide storage of computer readable instructions, data structures, program modules and other data for the computer 210. In FIG. 2A, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a digital camera (not shown), a keyboard 262, and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

In one embodiment, a pen digitizer 263 and accompanying pen or stylus 264 are provided in order to digitally capture freehand input. Although a direct connection between the pen digitizer 263 and the user input interface 260 is shown, in practice, the pen digitizer 263 may be coupled to the processing unit 220 directly, via a parallel port or other interface and the system bus 221 as known in the art. Furthermore, although the digitizer 263 is shown apart from the monitor 291, the usable input area of the digitizer 263 may be co-extensive with the display area of the monitor 291. Further still, the digitizer 263 may be integrated in the monitor 291, or may exist as a separate device overlaying or otherwise appended to the monitor 291.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2A. The logical connections depicted in FIG. 2A include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2A illustrates remote application programs 285 as residing on memory device 281. It will be appreciated that the network connections shown are illustrative and other means of establishing a communications link between the computers may be used.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2C:
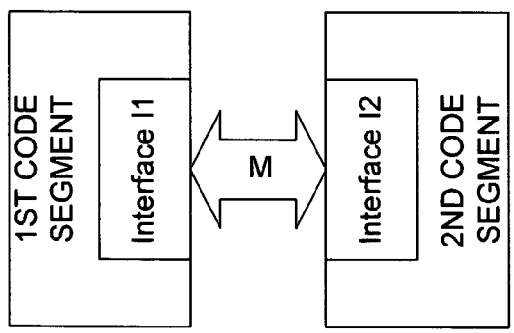
FIGS. 2B through 2M show a general-purpose computer environment supporting one or more aspects of the present invention.
Figure 2E:
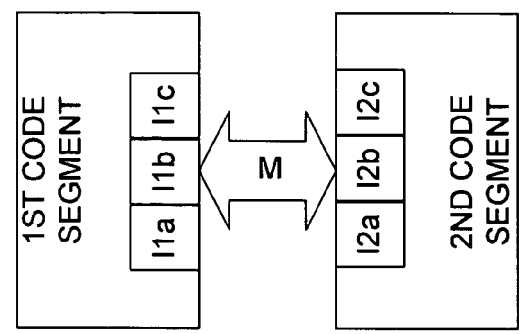
Figure 2B:
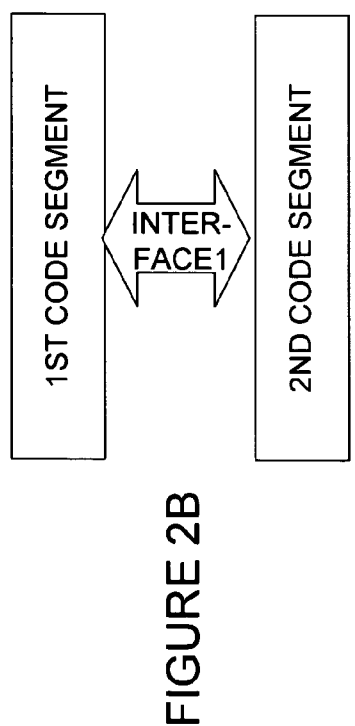

Notionally, a programming interface may be viewed generically, as shown in FIG. 2B or FIG. 2C. FIG. 2B illustrates an interface Interface1 as a conduit through which first and second code segments communicate. FIG. 2C illustrates an interface as comprising interface objects I1 and I2 (which may or may not be part of the first and second code segments), which enable first and second code segments of a system to communicate via medium M. In the view of FIG. 2C, one may consider interface objects I1 and I2 as separate interfaces of the same system and one may also consider that objects I1 and I2 plus medium M comprise the interface. Although FIGS. 2B and 2C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 2B and 2C, but they nonetheless perform a similar function to accomplish the same overall result. We will now briefly describe some illustrative alternative implementations of a programming interface.

A. Factoring

Figure 2D:
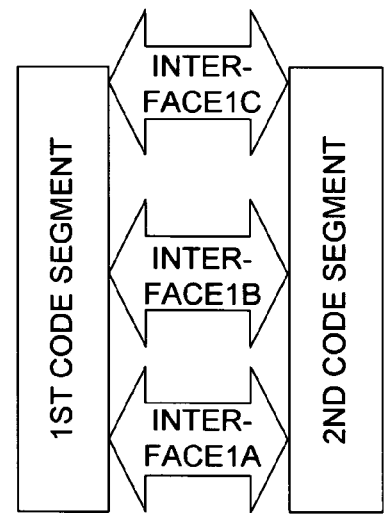

A communication from one code segment to another may be accomplished indirectly by breaking the communication into multiple discrete communications. This is depicted schematically in FIGS. 2 D and 2E. As shown, some interfaces may be described in terms of divisible sets of functionality. Thus, the interface functionality of FIGS. 2B and 2C may be factored to achieve the same result, just as one may mathematically provide 24, or 2 times 2 times 3 times 2. Accordingly, as illustrated in FIG. 2D, the function provided by interface Interface1 may be subdivided to convert the communications of the interface into multiple interfaces Interface1A, Interface1B, Interface1C, etc. while achieving the same result. As illustrated in FIG. 2E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 2D and 2E, the functional spirit of interfaces Interface1 and I1 remain the same as with FIGS. 2B and 2C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts may appreciate that there are a variety of ways of making different function calls that achieve the same result.

B. Redefinition

Figure 2F:
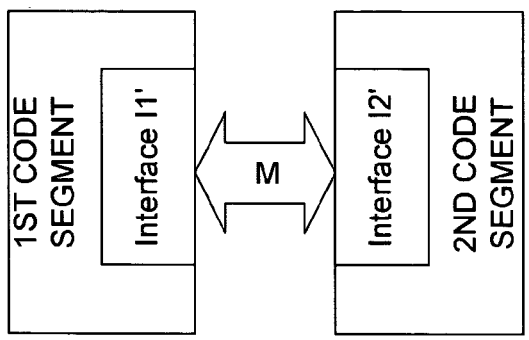
Figure 2G:
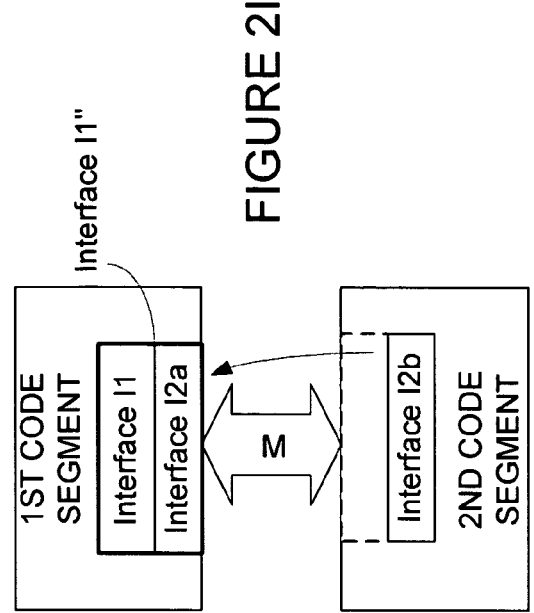

In some cases, it may be possible to ignore, add or redefine certain aspects (e.g., parameters) of a programming interface while still accomplishing the intended result. This is illustrated in FIGS. 2F and 2G. For example, assume interface Interface1 of FIG. 2B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 2F, it could just as well be ignored or even replaced with a meaningless (in this situation) parameter. One may also add an additional parameter of no concern. In either event, the functionality of square may be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 2G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 2H:
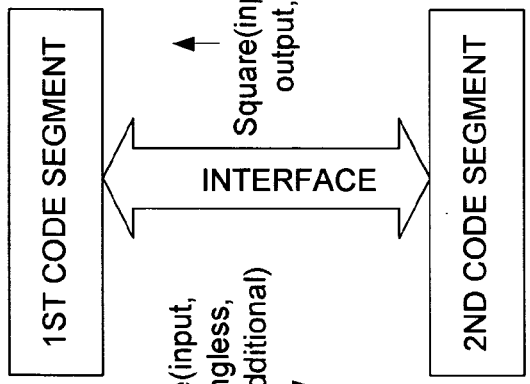
Figure 2I:
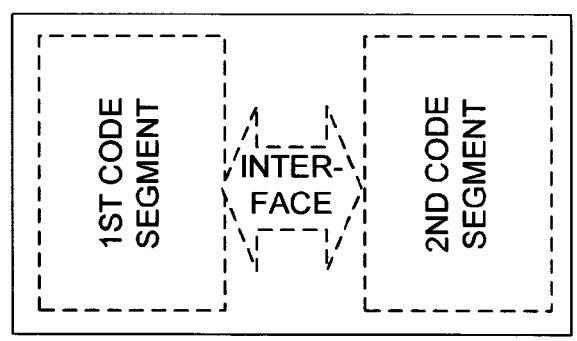

It may also be feasible to merge some or all of the functionality of two separate code modules such that the "interface" between them changes form. For example, the functionality of FIGS. 2B and 2C may be converted to the functionality of FIGS. 2H and 2I, respectively. In FIG. 2H, the previous 1st and 2nd Code Segments of FIG. 2B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 2I, part (or all) of interface I2 from FIG. 2C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 2C performs a function call square (input, output), which is received by interface I2, which after processing the value passed with input (to square it) by the second code segment, passes back the squared result with output. In such a case, the processing performed by the second code segment (squaring input) may be performed by the first code segment without a call to the interface.

D. Divorce

Figure 2K:
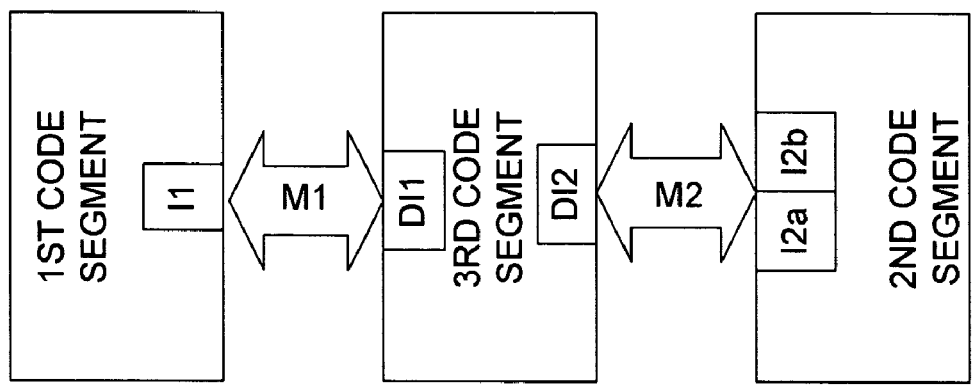
Figure 2J:
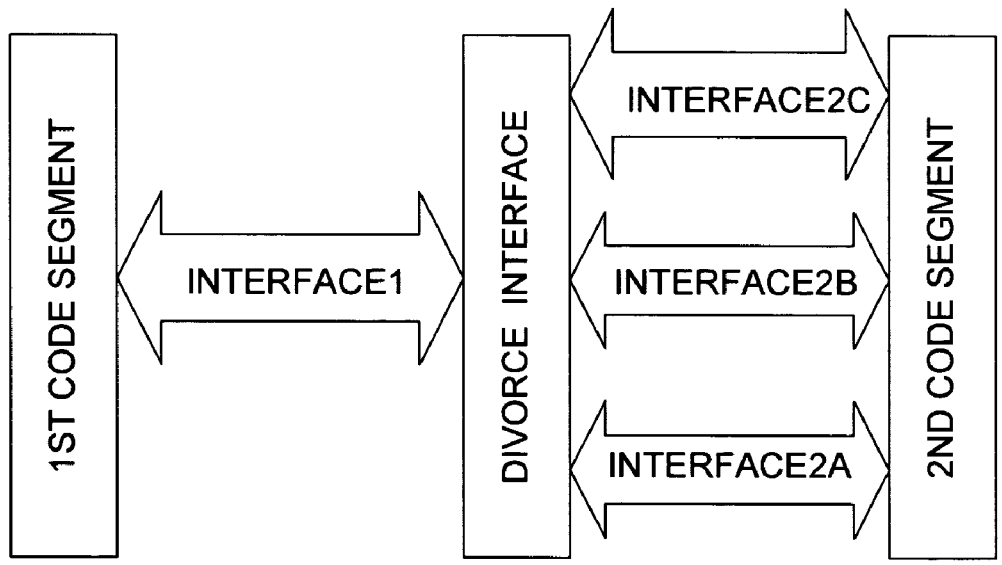

A communication from one code segment to another may be accomplished indirectly by breaking the communication into multiple discrete communications. This is depicted schematically in FIGS. 2J and 2K. As shown in FIG. 2J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 2K, a third code segment may be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 2C to a new operating system, while providing the same or similar functional result.

E. Rewriting

Figure 2L:
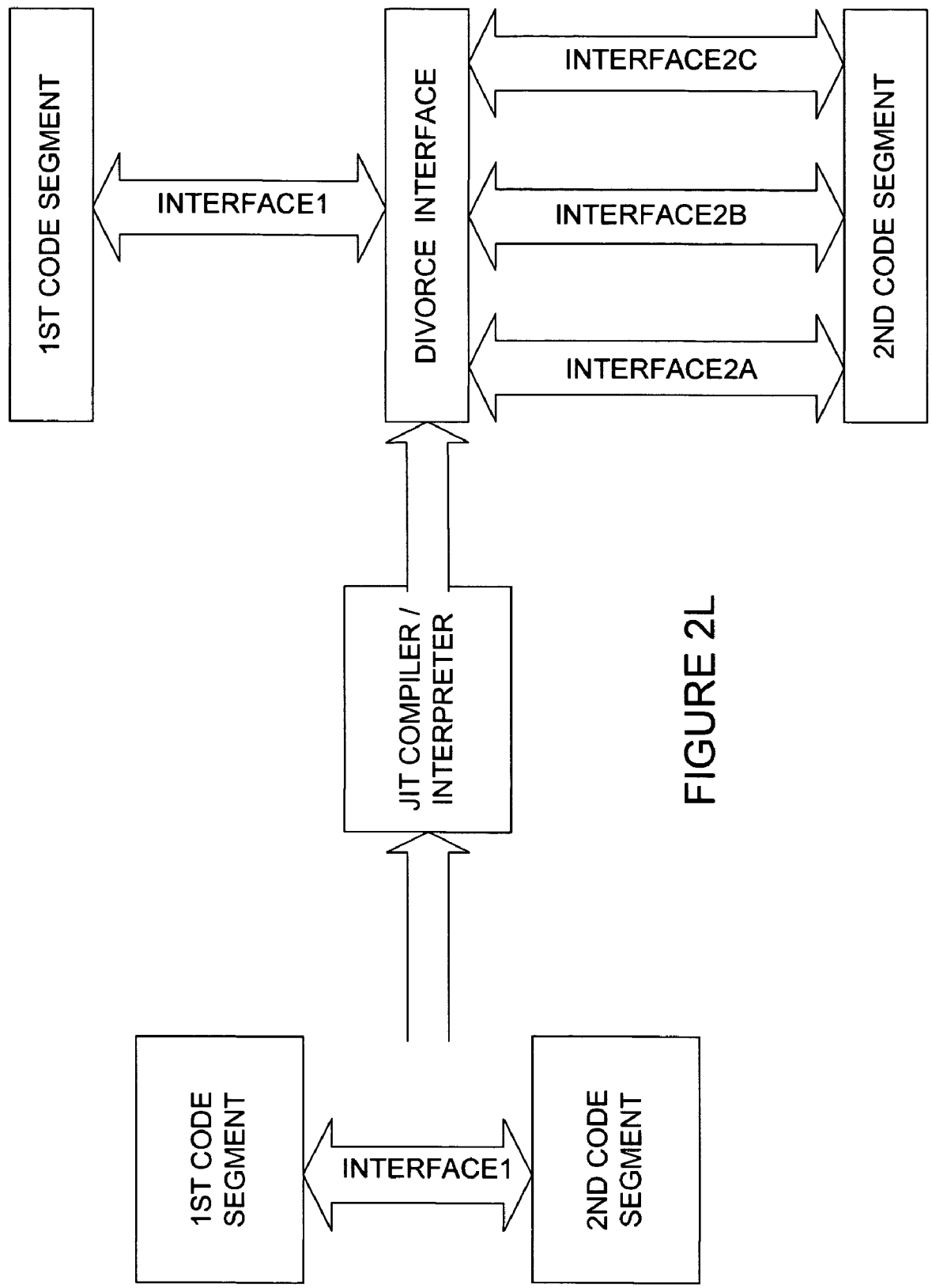
Figure 2M:
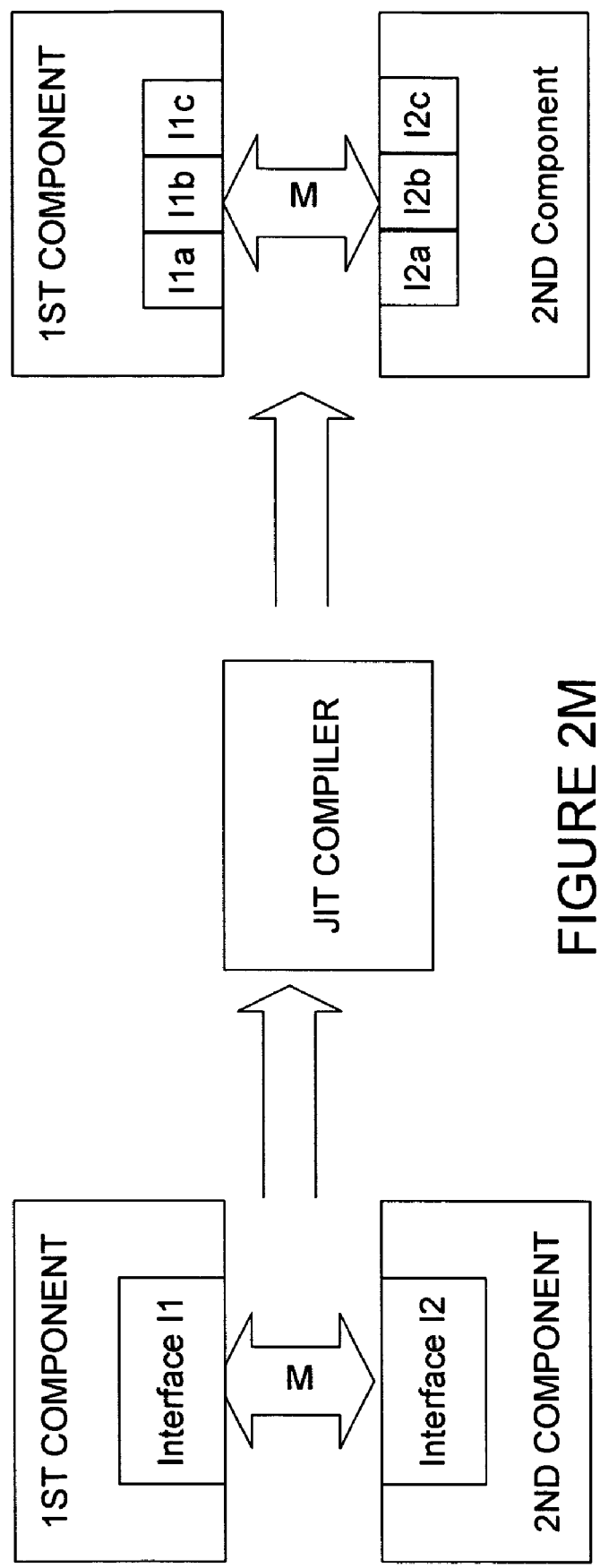

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 2L and 2M. As can be seen in FIG. 2L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 2M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 2B and 2C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Handwritten mathematical expression recognition is needed to enable pen-based input of mathematical expressions. Aspects of the present invention propose a framework for handwritten mathematical expression recognition, which may output multiple expression candidates. In accordance with one embodiment, the multi-path framework utilizes multi-path algorithms and outputs multiple results in several components, including symbol grouping and recognition, tabular structure analysis, subordinate sub-expression analysis, and subscript/superscript analysis, and character determination. The system may output multiple recognition candidates for each handwritten expression by combining multiple results from the various components. With a correction user interface (UI), a user may select a proper choice from the candidates supplied by the system. Aspects of the present invention enable more natural input of mathematical expressions.

Definitions

Stroke is a trajectory of a pen tip between a pen down position and a pen up position. A stroke may be described by a series of points with timestamps (x, y, time).

Symbol includes of one or multiple strokes. A symbol is a handwritten version of pre-defined mathematical characters including Latin alphabets, digits, Greek letters, etc.

Expression is a meaningful combination of mathematical symbols.

Character is the corresponding computer code of a handwritten symbol. Symbol recognition takes the strokes of a symbol as input and outputs the corresponding character of the symbol.

Dominant symbol is a mathematical symbol that may be attached to subordinate sub-expressions. The spatial relationships between dominant symbols and its sub-expressions are variants to the dominant symbols' types. A description of relational types is described below under the section entitled, "Subordinate Sub-expression Analysis".

Sub-expression is a meaningful sub-part of an expression. An expression may include several sub-expressions, which form a tree structure according to their relationships of principal and subordinate. A sub-expression is an expression. There are two kinds of sub-expressions. A subordinate sub-expression is a sub-expression subordinate to a dominant symbol. Subscript and superscript sub-expressions are sub-expressions that are a subscript or superscript of another symbol.

BST tree (baseline structure tree) is a data structure for representing an expression. In the representation, an expression is a tree, whose levels are baselines. Baseline means that symbols within a baseline are located in a horizontal line. Here, a baseline is a synonym of sub-expression.

Parse tree is an extended version of a BST tree. A parse tree may store multiple results for components of the system and support the functionality of providing multiple recognized candidates for a handwritten expression. A parse tree may be included within a data structure for a computer-readable medium.

Symbol recognizer is the model that implements symbol recognition. The symbol recognizer analyzes all available information, such as shape and time series information of a symbol to recognize the symbols.

On-line features are features that use time series information. Usually, a stroke has the time information of each point of the stroke.

Off-line features do not use time series information, instead they use shape information. Off-line features in symbol recognition are often extracted based on image and pixels.

The Gaussian Mixture Model (GMM) is a mixture probability distribution model. A GMM is a linear combination of K Gaussian components.

Tabular structure includes matrix and multi-line expression. Both structures may be divided into rows and/or columns. Multi-line expressions always have only one column and have only one curly bracket on the left side. Matrices have brackets on both the left and right sides.

A matrix is a group of structured strokes that may be divided into multiple rows and/or columns and surrounded by a pair of brackets at both the left and right sides (FIGS. 29A-D). Column vectors (FIG. 29D) and determinants (FIG. 29C) are also regarded as special matrices.

A multi-line expression is a group of strokes that may be divided into several left aligned rows which are led by a left curly bracket (FIGS. 30A-30B).

Brackets in tabular structure analysis are a group of symbols that encapsulate tabular structures. For matrices, it may be a bracket, a square bracket or a vertical line at both the left and right side. For multi-line expression, it may be curly bracket at the left side.

Multi-Path Framework Overview

Figures 3, 4:
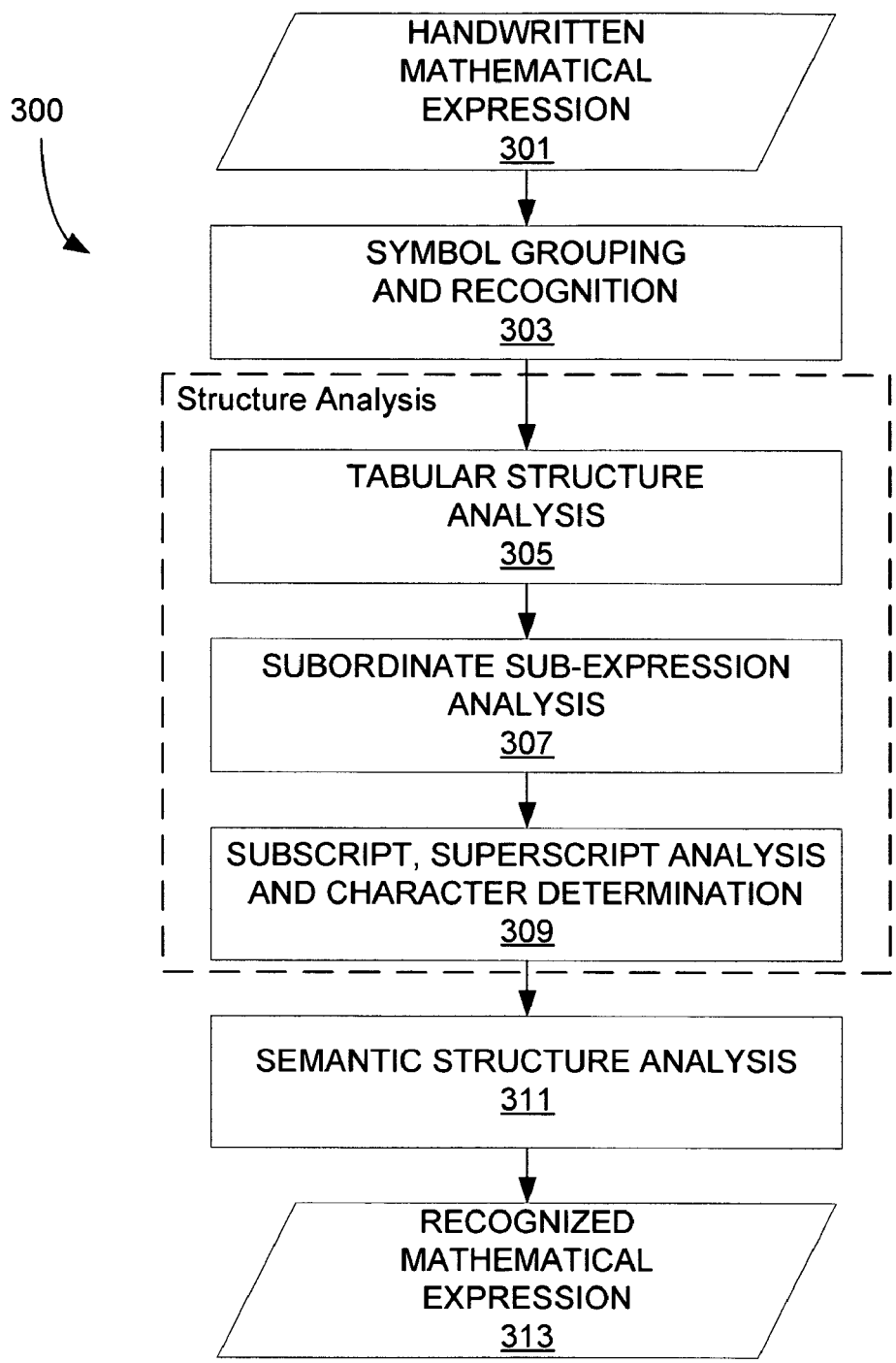
FIG. 3 is an illustrative block diagram of a framework for a system to recognize handwritten mathematical expressions in accordance with at least one aspect of the present invention.
FIG. 4 is an example handwritten mathematical expression.

FIG. 3 is an illustrative block diagram of a framework 300 for a system to recognize handwritten mathematical expressions in accordance with at least one aspect of the present invention. The framework may include five components: a symbol grouping and recognition component 303, a tabular structure analysis component 305, a subordinate sub-expression analysis component 307, a subscript, superscript analysis and character determination component 309, and a semantic structure analysis component 311. Among these components, the symbol grouping and recognition component 303, the subordinate sub-expression analysis component 307, and the subscript, superscript analysis and character determination component 309 may output multiple results.

The symbol grouping and recognition component 303 receives a handwritten mathematical expression 301 and is responsible for grouping strokes into symbols and for recognizing the symbols. The output of component 303 is how strokes are grouped to symbols, and possible character candidates and corresponding confidences for each symbol.

Compared to plain text, mathematical expression is a more complex structured layout. Expressions have specific structures. For example, an N-array summation ('Σ') has two attached sub-expressions, above and below sub-expressions to express below and above summation limits. Also, subscripts and superscripts are typical structures in expressions. Aside from hierarchical structures, tabular expression is high level structure, where multiple sub-expressions are at the same level forming a table. Such structure information is useful for recognizing expressions. The structure analysis component is configured to determine structure information. In accordance with at least one aspect of the present invention, the structure analysis component includes the following three sub-components: the tabular structure analysis component 305; the subordinate sub-expression analysis component 307; and the subscript, superscript analysis and character determination component 309.

Tabular structure analysis component 305 includes matrix and multiple-line structure recognition. Tabular structure analysis component 305 identifies each table and the content of each cell in each table. After tabular structure analysis component 305 identifies tabular structure, later structure analysis components regard each cell as a sub-expression and analyze the structure for each cell further. Subordinate sub-expression analysis component 307 is used to find subordinate sub-expressions for each dominant symbol. Subscript, superscript analysis and character determination component 309 finds subscript and superscript structures and decides each symbol's final character at the same time.

After being processed by the structure analysis component, a tree structure of sub-expressions is found, and the characters of the symbols are decided for the input handwritten mathematical expression. However, the inherent semantic structure is not yet represented in a data structure of a parse tree. Therefore, the semantic structure analysis component 311 is used to translate the linear symbols that are in a sub-expression into a syntax tree and to adjust the parse tree according to the syntax tree, resulting in a recognized mathematical expression 313.

Figure 5:
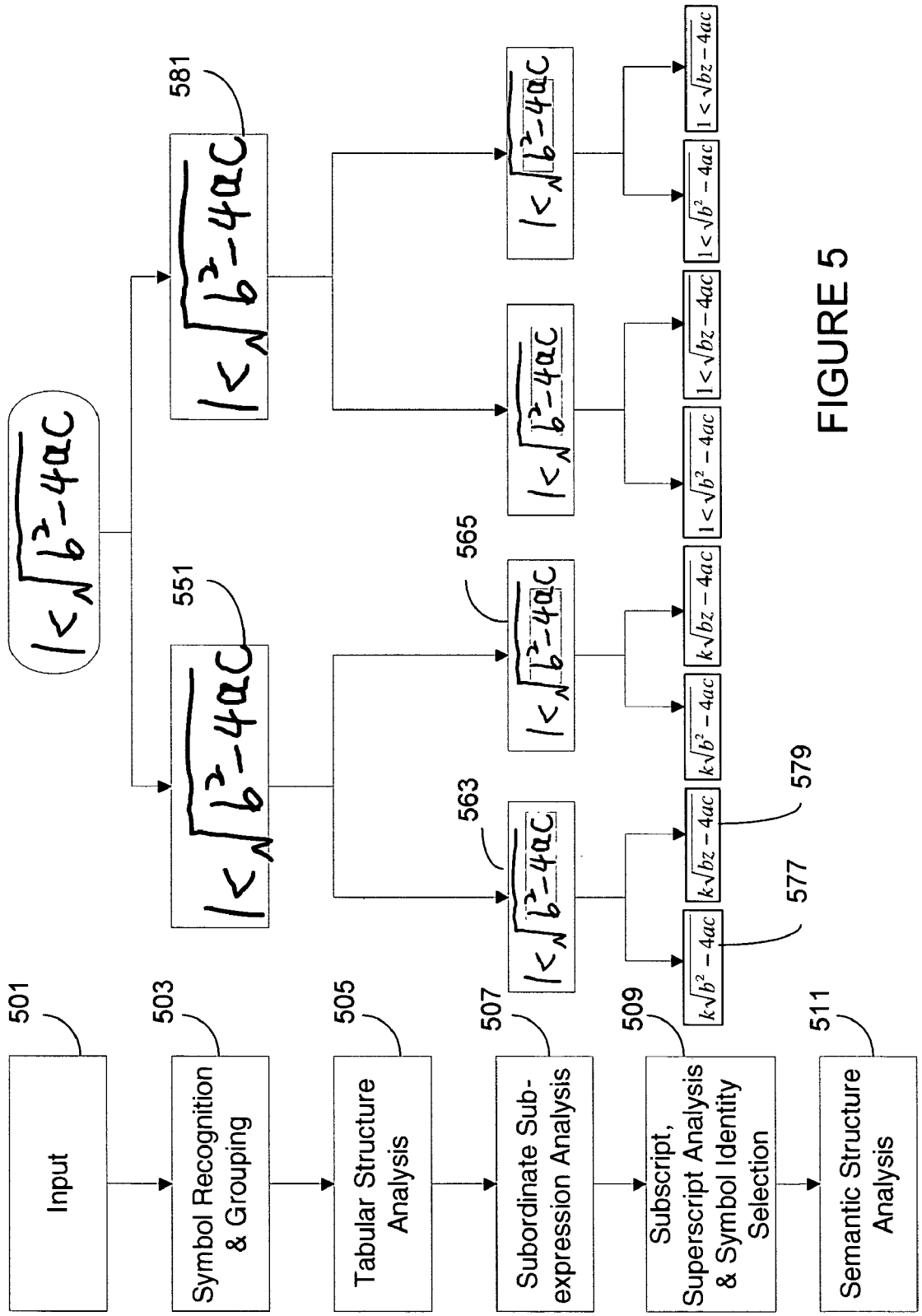
FIG. 5 is an illustrative flowchart showing the sequence of stroke determinations for recognizing handwritten mathematical expressions in accordance with at least one aspect of the present invention.

FIG. 4 is an example handwritten mathematical expression that is used herein for illustrative purposes. FIG. 5 is an illustrative flowchart showing the sequence of stroke determinations for recognizing handwritten mathematical expressions in accordance with at least one aspect of the present invention. FIG. 5 shows a multi-path algorithm workflow with the example from FIG. 4. Inputted handwritten expression 501 is a sequence of strokes. At the symbol recognition and grouping level 503, two possible grouping results are identified. The first result 551 is that the first two strokes are grouped into a symbol 'k'. The second result 581 is that the first two strokes are separated into a symbol '1' and a symbol '<'. At this point, the recognition of the other symbols is the same. At the tabular structure analysis level 505, the parse tree keeps its structure because there is no tabular structure in the example. At the subordinate sub-expression analysis level 507, following each of the two grouping results 551 and 581 are also two feasible results. One result 563 is that the symbols of "b", "2", "−", "4", "a", and "c" are a radicand of the radical sign. The second result 565 is that the symbols of "b", "2", "−", "4", and "a" are a radicand of the radical sign, but that the symbol of "c" is in the main sub-expression, i.e., it is not a radicand of the radical sign. At the subscript, superscript analysis and character determination level 509, there are also two results for the radicand part. For the result 563, candidate "$b^2-4ac$" 577 and candidate "bz−4ac" 579 result. For result 565, the candidate results are similar. The system ends with 8 reasonable candidates for a relatively simple expression before proceeding to the semantic structure analysis component level 511.

In accordance with aspects of the present invention, a data structure stores the multiple results obtained by all the multi-path algorithms. The structure is passed from the first component to the last component. Every component gets the structure from the previous component, performs its analysis operation, and then writes its results back into the structure, passing the structure to the next component. After recognition is complete, the system gets the data structure saving multiple results from many components. With the data structure, a whole expression's candidate may be determined by selecting a result for each multi-path component sequentially. Furthermore, the system may determine multiple expression candidates with different selections and then rank the candidates based on a combined score, which may include scores of various components.

Before describing the data structure of multi-results, a data structure representing a single structured expression is described. A baseline structure tree (BST) is used to represent an expression. One point of a BST tree is to view an expression as a tree including multi-level baselines. Within a baseline, symbols are horizontal neighbors. In the layout, the symbols lie in a horizontal line.

Figure 6:
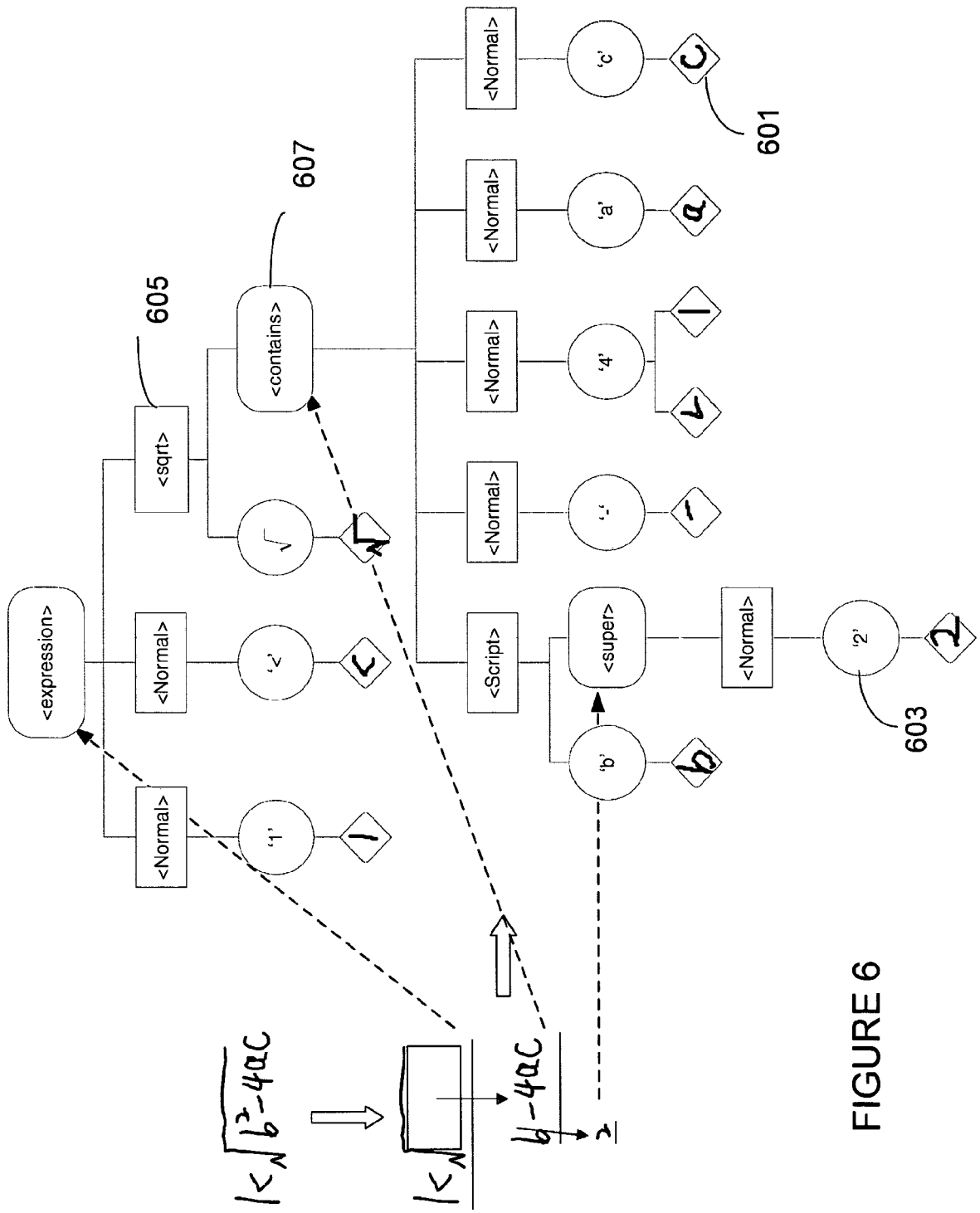
FIG. 6 is an illustrative block diagram of an example baseline structure tree (BST) for representing a mathematical expression in accordance with at least one aspect of the present invention.

FIG. 6 is an illustrative block diagram of an example baseline structure tree (BST) structure for representing a mathematical expression in accordance with at least one aspect of the present invention. The example includes three levels of baselines. The first baseline "1<radical" is the main baseline. The second baseline "b−4ac" is a sub-expression subordinate to the radical sign. The third baseline "2" is a superscript of "b" which is at the second baseline. Four types of tree nodes are defined to represent a BST tree in accordance with the present invention. A stroke node, shown by a diamond shape, such as 601, represents a stroke in ink expressions. It stores position (x, y) of each point of a stroke and a timestamp when the pen tip is down. A symbol node, shown by a circle shape, such as 603, represents a symbol, which may include several strokes. It records the references to its child nodes, which are stroke nodes. A symbol node also stores a symbol's character candidates and confidences determined by symbol recognition.

A BST symbol node, shown by a rectangular shape, such as 605, is a middle-level node between a symbol node and a relational node. The BST symbol node is child node of a relational node. A BST symbol node may have a symbol node and a relational node as its child nodes. A BST symbol node is configured to represent a compound of a dominant symbol and its sub-baselines (sub-expressions). A single symbol, which has no sub-baselines (sub-expressions), is wrapped into a BST symbol node with a tag "normal" in order to become a child of a relational node. The following tags are defined for a BST symbol node:

Normal: a symbol without subordinates.
Decorated: a symbol with subscript or superscript.
Fraction: a fraction line with denominator and numerator.
Radical: a radical sign with radicand.
Integral: an integral sign with integral limits.
N-Array: an N-Array sign (Σ,Π) with above or below limits.
Limits: a symbol "lim" with its below subordinate.
Hats: a hat sign (^, −) with its decorated subordinate.

A relational node, shown by a rounded rectangular shape, such as 607, represents a baseline (sub-expression), which includes several BST symbol nodes located on a horizontal line. Its children are BST symbol nodes. The following tags are defined for a relational node:

Above: a sub-expression above fraction line or N-Array sign.
Below: a sub-expression below fraction line or N-Array sign.
Radicand: a sub-expression that is a radicand of a radical sign.
Radical index: a sub-expression that is radical index of a radical sign.
Superscript: a superscript sub-expression.
Subscript: a subscript sub-expression.
Expression: the main (top-level) sub-expression.

Figure 7:
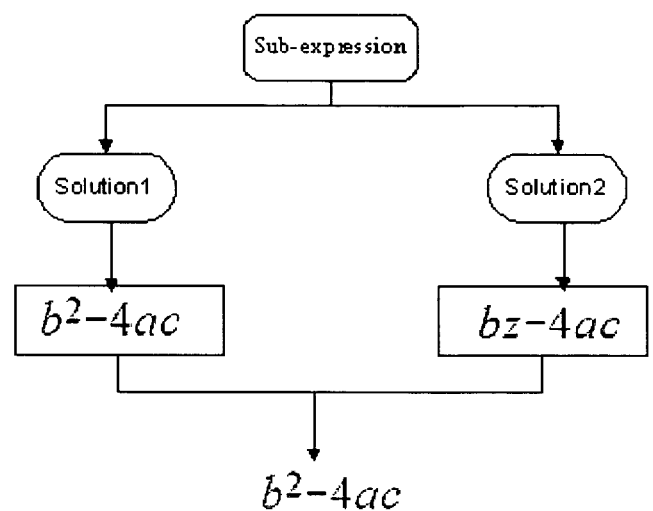
FIG. 7 is an illustrative block diagram of an example portion of a BST for representing a mathematical expression in accordance with at least one aspect of the present invention.

Aside from the above four types of nodes, another type of node, a solution node, is included in the system to represent various results for the same object. FIG. 7 shows how to use solution nodes to represent two interpretations of strokes. Solution1 means "$b^2-4ac$", while Solution2 means "bz−4ac". As FIG. 7 shows, the two solutions refer to the same set of strokes. In implementation, it is also necessary to perform these multiple references to the same objects. Because multiple results may be outputted from three components, duplication of a tree or a sub-tree for each of these results would require a huge amount of memory due to exponential combinations. Moreover, the idea of simple duplication also results in unnecessary repeated calculations for same objects. For example, symbols of "b2−4ac" are a sub-expression in the result 563 from FIG. 5. To implement duplication, subscript, superscript analysis, and character determination has to be done at least twice for the sub-expression because symbols of "b2−4ac" are duplicated for each way of grouping strokes. As shown in FIG. 5, results 577 and 579 are duplicated for both results 563 and 565. Therefore, in accordance with aspects of the present invention, a data structure is implemented where the same child objects may be referred to by multiple parent objects. With this implementation, an extended BST tree is not just a tree structure, but a directional acyclic graph. With such a new type of node and design of multiple references, a BST tree may be extended to a data structure, which may store multiple results obtained by the components. In one embodiment, an extended BST tree is parsed component by component and is often referred to as a parse tree. A parse tree may be included within a data structure.

The following paragraphs will use the example in FIGS. 4 and 5 to explain how the parse tree evolves by each component.

Handwritten Expression Input 501

Figure 8:
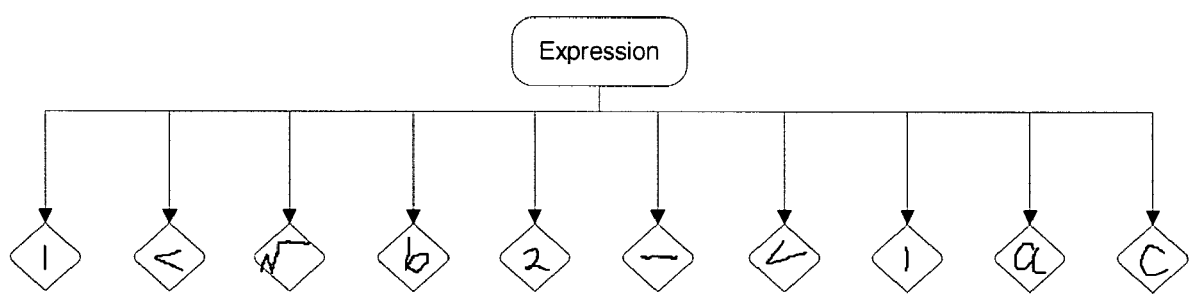
FIG. 8 is an illustrative block diagram of an example collection of ink strokes for the initial creation of a parse tree in accordance with at least one aspect of the present invention.

Before recognition starts, the expression is a set of strokes without structure information. As shown in FIG. 8, the system collects all ink strokes and creates a parse tree, which is a sequence of strokes. At this point, all stroke nodes are located under a root expression node, parallel to each other.

Symbol grouping and recognition 503

Figure 9:
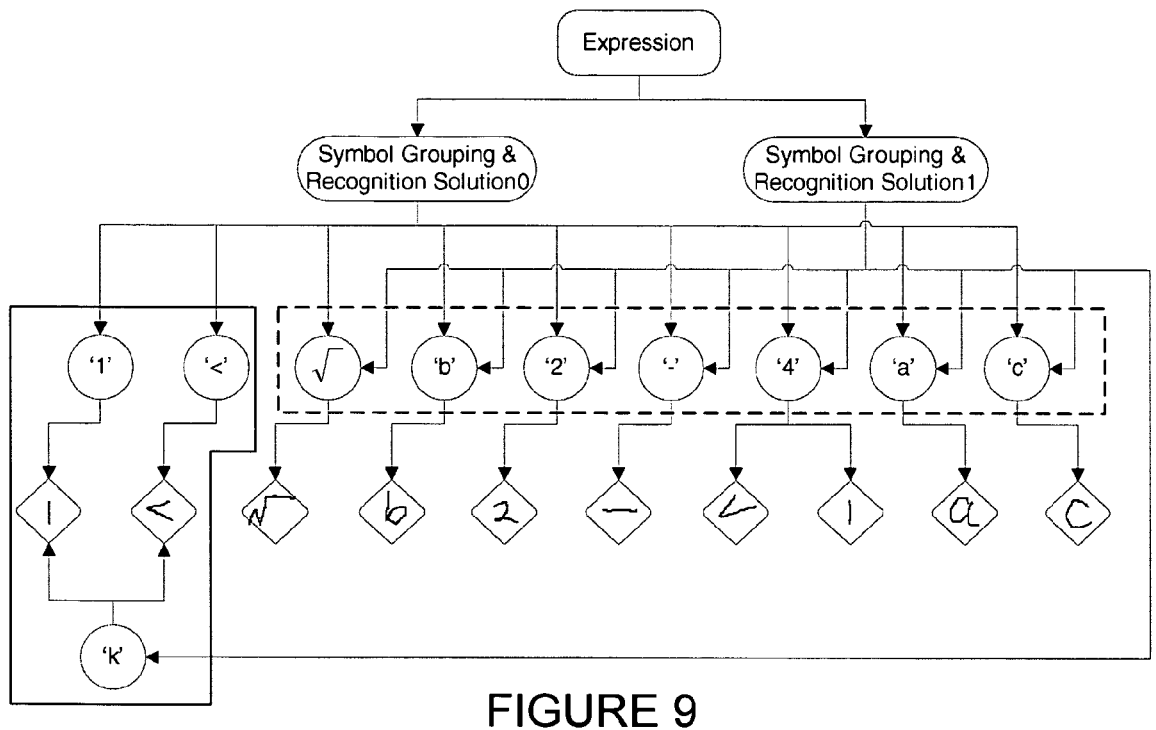
FIG. 9 is an illustrative block diagram of an example parse tree after symbol grouping and recognition solutions have been determined in accordance with at least one aspect of the present invention.

This component takes the input of strokes, and groups the strokes into symbols using a dynamic programming algorithm. Symbol nodes are created to store results at this stage. During dynamic programming, a symbol recognizer is called to test if several strokes could be a meaningful symbol. In this component, there are multiple ways to group strokes. So solution nodes are created in the parse tree to store the multiple results. FIG. 9 shows the parse tree after the symbol grouping and recognition component has determined its results.

FIG. 9 also shows how to use solution nodes to store two ways of grouping efficiently in a parse tree. In the example, one way is that the first two strokes are separated into a symbol '1' and a symbol '<'. The other is that the two strokes are grouped into a symbol 'k'. Grouping results of the other strokes are the same in both ways. In FIG. 9, these same parts, shown in the dashed box, are referred to by two solution nodes. As such, the data for these parts are only stored as one copy in a data structure. The different parts, shown in the solid lined box, are referred to respectively by two solutions. Symbols located in the different parts also refer to the same stroke nodes. With this design of multiple references, multiple results may be stored in the extended BST tree in a manner that saves memory resources and computation time.

The symbol recognizer is called again for each grouped symbol to find possible character candidates and corresponding confidences. The character candidates and confidences are stored at corresponding symbol nodes. They will be passed on to the next component. Later a structure analysis component performs its operation based on the symbol node information.

Subordinate Sub-expression Analysis Component 507

This component finds subordinate sub-expressions subordinate to dominant symbols. The component finds all possible dominant symbol candidates. Then it tentatively looks for subordinate symbols for the candidates using spatial information, such as symbol distance, size, etc. If subordinate symbols are found, then the candidate is a real dominant symbol. Otherwise, the candidate is not a dominant symbol. For each real dominant symbol, the found subordinate symbols construct a subordinate sub-expression.

Figure 10:
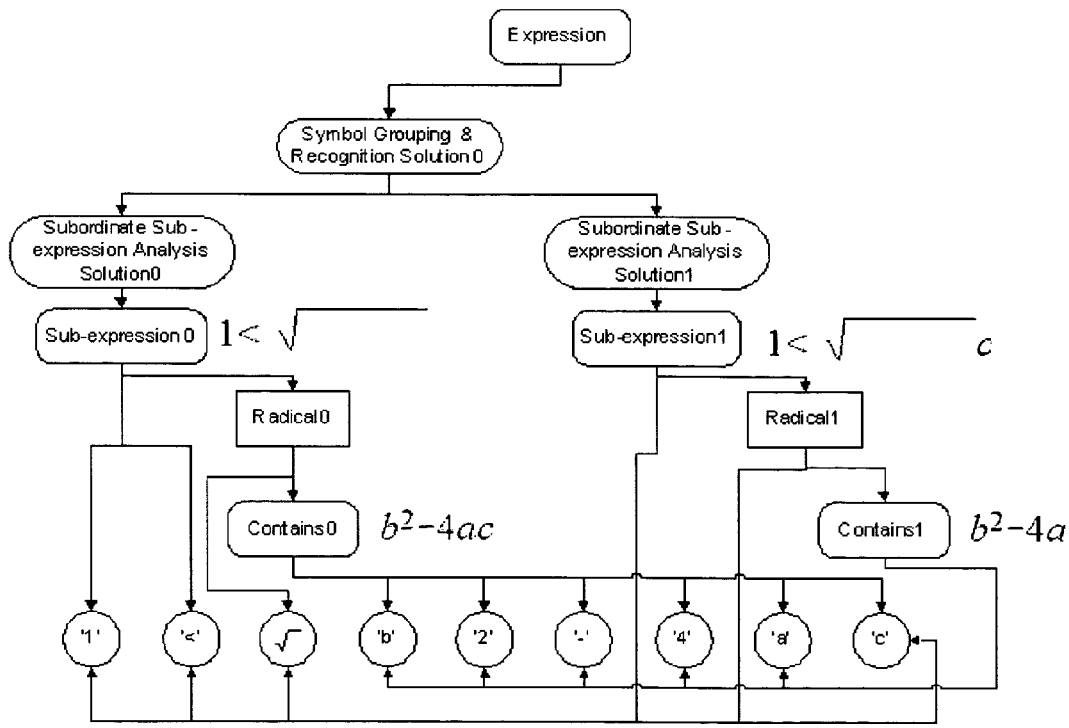
FIG. 10 is an illustrative block diagram of an example parse tree after subordinate sub-expression analysis solutions have been determined in accordance with at least one aspect of the present invention.

FIG. 10 shows results of the subordinate sub-expression analysis component. Only the results following one grouping solution node are displayed in FIG. 10 because the branch following the other grouping solution node is similar to this one. As shown, one solution is that the symbols of "b", "2", "−", "4", "a", and "c" construct a sub-expression subordinate to the radical sign. The other solution is that the symbols of "b", "2", "−", "4", and "a" construct the radicand sub-expression.

Subscript, Superscript Analysis and Character Determination Component 509

Subscript and superscript structures are identified in this step. Subscript and superscript structures are not only related to the symbols' spatial relationship, they are also dependent on the symbols' characters. For example, 'x', as used for multiplication operations, can not be a subscript. Therefore, the component performs two tasks, subscript, superscript analysis and character determination, at the same time. Moreover, syntax analysis is utilized in the component to verify that multiple results outputted by this component are valid in the sense of expression grammar.

Figure 11:
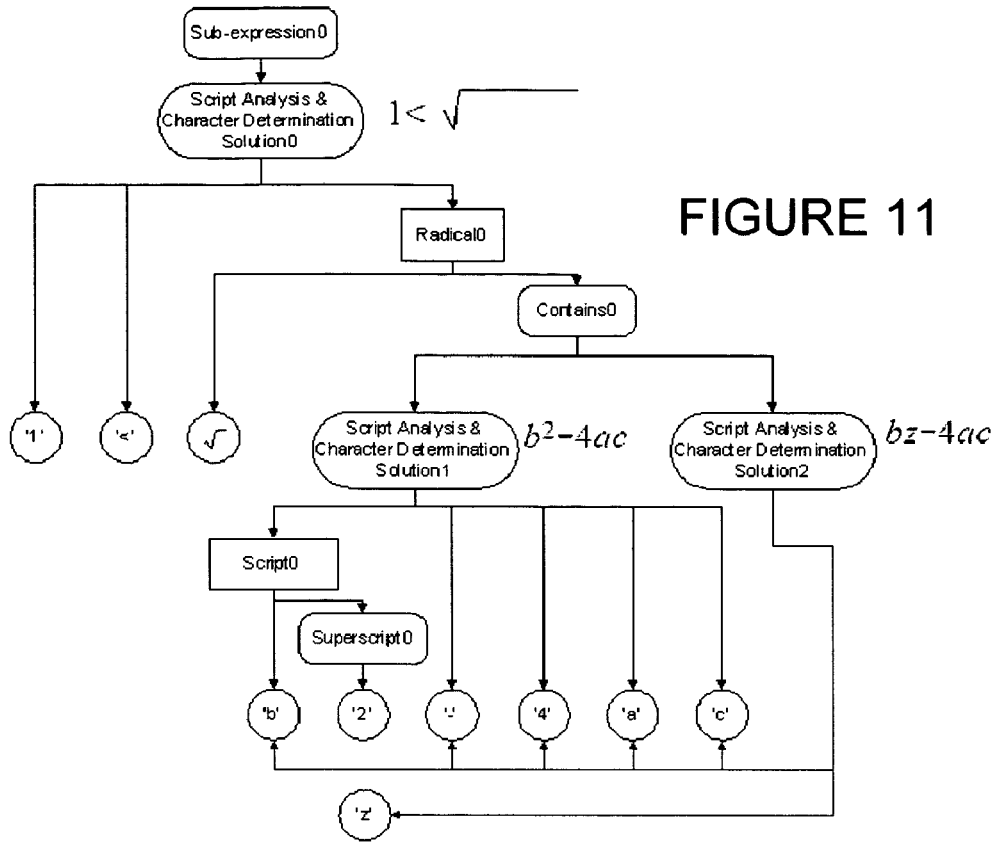
FIG. 11 is an illustrative block diagram of an example parse tree after subscript/superscript and character determination solutions have been determined on one of the solution from FIG. 10 in accordance with at least one aspect of the present invention.

FIG. 11 shows two results of the component following only one solution of the subordinate sub-expression analysis component. As shown, there are two solution nodes for the radicand sub-expression. One solution is "$b^2-4ac$", the other solution is "bz−4ac".

Semantic Structure Analysis

After previous processing, a tree structure of sub-expressions is built up and every character is determined. But semantic structure is not discovered in its sub-expressions. In order to make recognized expression become a semantic structure, text strings translated from sub-expressions are parsed by syntax analysis and transformed into a syntax tree. Finally, this component revises the parse tree according to the results of syntax analysis. The system names the final parse tree as a semantic tree of the expression.

Figure 12:
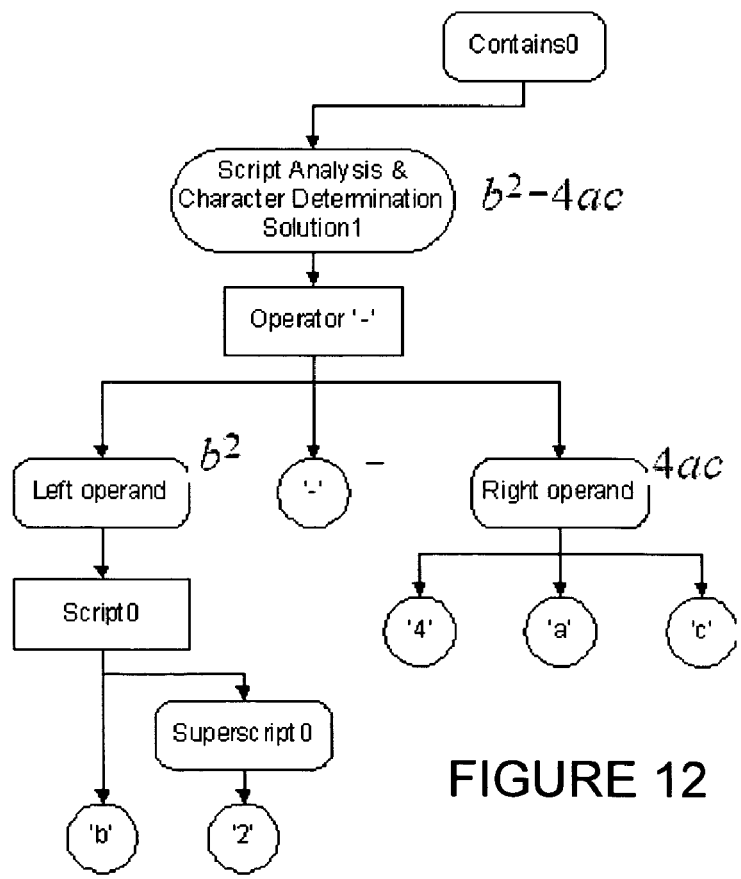
FIG. 12 is an illustrative block diagram of an example semantic tree using BST symbol and relational nodes in accordance with at least one aspect of the present invention.

A semantic tree corresponds to the semantic structure of an expression. In the tree, high level math concepts, such as operators, operands, and priorities etc., are defined. With the semantic tree, the expression may be calculable. FIG. 12 shows how to represent a semantic tree using BST symbol and relational nodes. There, symbol "−" becomes a BST symbol, because it is an operator. This BST symbol has two relational nodes, representing two operands respectively.

The component uses a context-free parser to do syntax analysis. The parser algorithm is a well-known technique, widely applied in the fields of language compiler, natural language processing, knowledge-based system, etc. In the system, a library of grammar rules for mathematical expression may be built. The library may include in excess of 1,000 grammar rules. The following are three example rules about a fraction structure:

FRACTION->FRACTIONLINE DENOMINATOR NUMERATOR

DENOMINATOR->SYMBOL_LEFTCONTROL OPERAND SYMBOL_RIGHTCONTROL

NUMERATOR->SYMBOL_LEFTCONTROL OPERAND SYMBOL_RIGHTCONTROL

Aspects of the present invention recognize a multitude of symbols including Latin alphabets (a, b, c, A, B, C, etc.), Greek letters ($\alpha$, $\beta$, $\theta$, $\lambda$, $\omega$, etc.), Latin digits (1, 2, 3, 4, 5, etc.), Operators ($\Sigma$, $\Pi$, $\int$, $\pm$, $\times$, etc.), and frequently used mathematical symbols ($\partial$, etc.). Aspects of the present invention also support frequently used expression types, including Arithmetic operations (+, −, ×, /, etc.), Fraction (−), Radical ($\sqrt{}$), Integral ($\int$), N-Array ($\Sigma$, $\Pi$), Limits (lim), multi-letter functions (sin, cos, tan, log, ln, etc.), Hats (â, $\overline{AB}$, etc.), and matrix and/or multi-line expressions. In one embodiment, in excess of 150 different mathematical symbols may be recognized by the system.

Symbol Grouping and Recognition

Referring back to FIG. 3, the symbol grouping and recognition component 303 is one part of the whole mathematical expression recognition system 300. The output of component 303 is how strokes are grouped to symbols and possible character candidates and a corresponding confidence for each symbol. Symbol grouping groups strokes into math symbols. Symbol recognition recognizes the symbols using all available information, e.g. shape, time series, and context. As described above, due to ambiguities of a symbol, symbol recognition outputs multiple recognition results.

Figure 26:
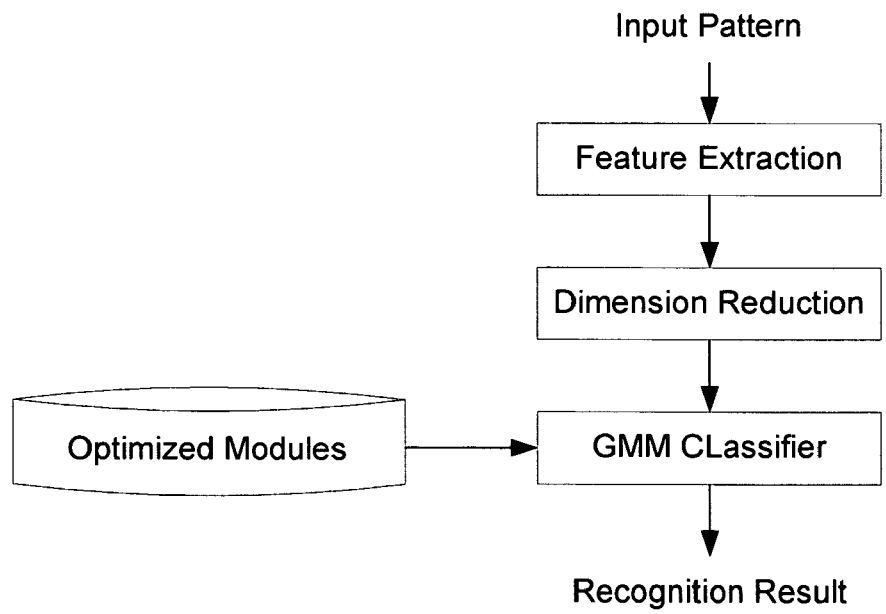
FIG. 26 is an illustrative flowchart of symbol recognition in accordance with at least one aspect of the present invention.
Figure 25:
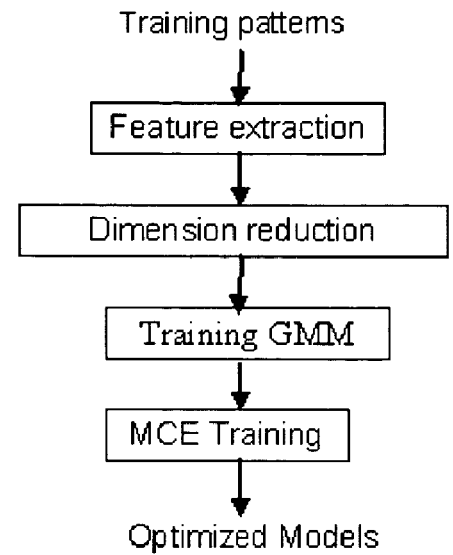
FIG. 25 is an illustrative flowchart of symbol training in accordance with at least one aspect of the present invention.

An on-line handwritten symbol written on a digitizing tablet is represented as a sequence of strokes, which are the loci of the pen tip from its pen-down to pen-up position. On-line recognition is considerably different from off-line recognition because of the dynamic information on writing. Symbol recognition methods are roughly classified into three major groups: statistical method, structure and syntax analysis method, and model matching methods. In accordance with at least one aspect of the present invention, statistical methods are used to recognize symbols. A statistical symbol recognition method consists of two processes, a training stage and a recognition stage. The training framework and recognition framework are shown in FIGS. 25 and 26.

In the training stage, a large amount of training data is assumed available to build some statistical model. Handwritten strokes are first smoothed and normalized to a fixed size. In sequence, some statistical features are extracted from the unknown symbol. Dimensional reduction is used to optimize these features. Next, Gaussian Mixture Models (GMM) are trained as a classifier. Then, discriminative training is adopted to optimize the GMM. In the recognition stage, after preprocessing and feature extraction, the unknown symbol is classified to the class whose members have the most similar features. GMM is a mixture probability distribution model, which provides better similarity measurement than template based classifiers.

Many mathematical symbols are written with multiple strokes. For instance, 'A' may be written with 3 strokes. Usually, an expression consists of several symbols, and each symbol may have one or multiple strokes. But in the input data, all strokes of the symbols are mixed together. Therefore, the first step of handwritten expression recognition is to identify which strokes construct a symbol, and how many symbols are in the handwriting expression. After the identification, ink strokes are grouped into symbols. Then, a subsequent structure analysis may perform further recognition based on the new data representation provided by the symbol grouping step.

Figure 13:
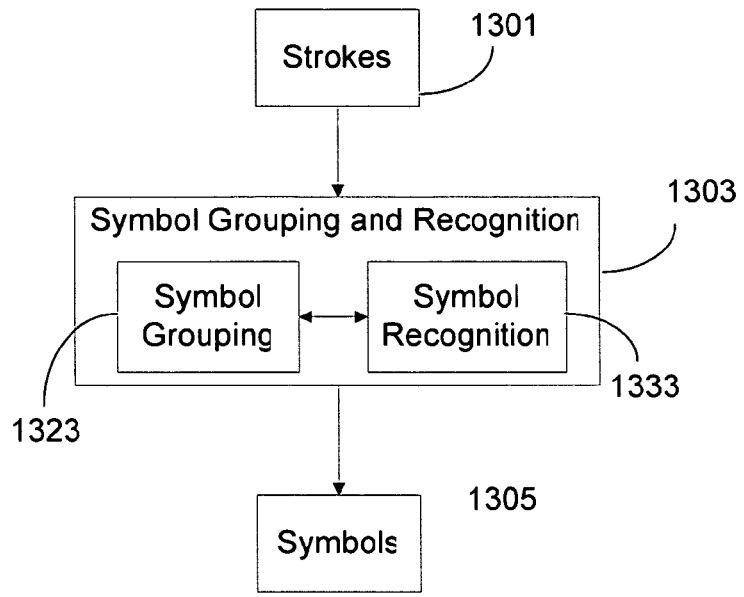
FIG. 13 is an illustrative flowchart of symbol grouping and recognition in accordance with at least one aspect of the present invention.
Figure 14:
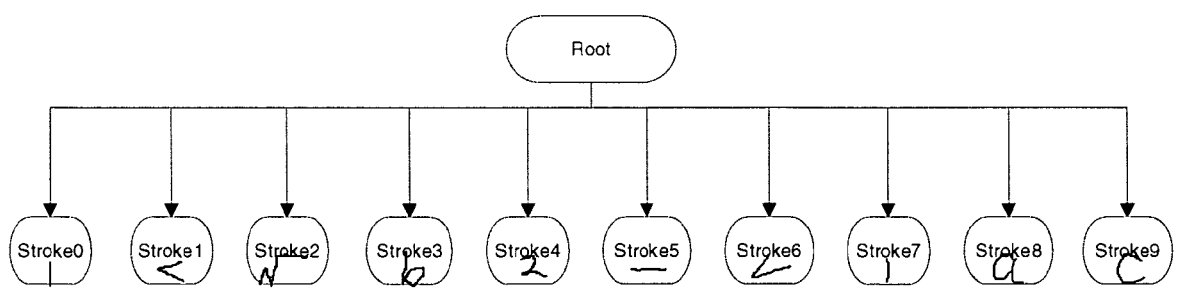
FIG. 14 is an illustrative block diagram of an example of a linear stroke sequence from a parse tree in accordance with at least one aspect of the present invention.
Figure 15:
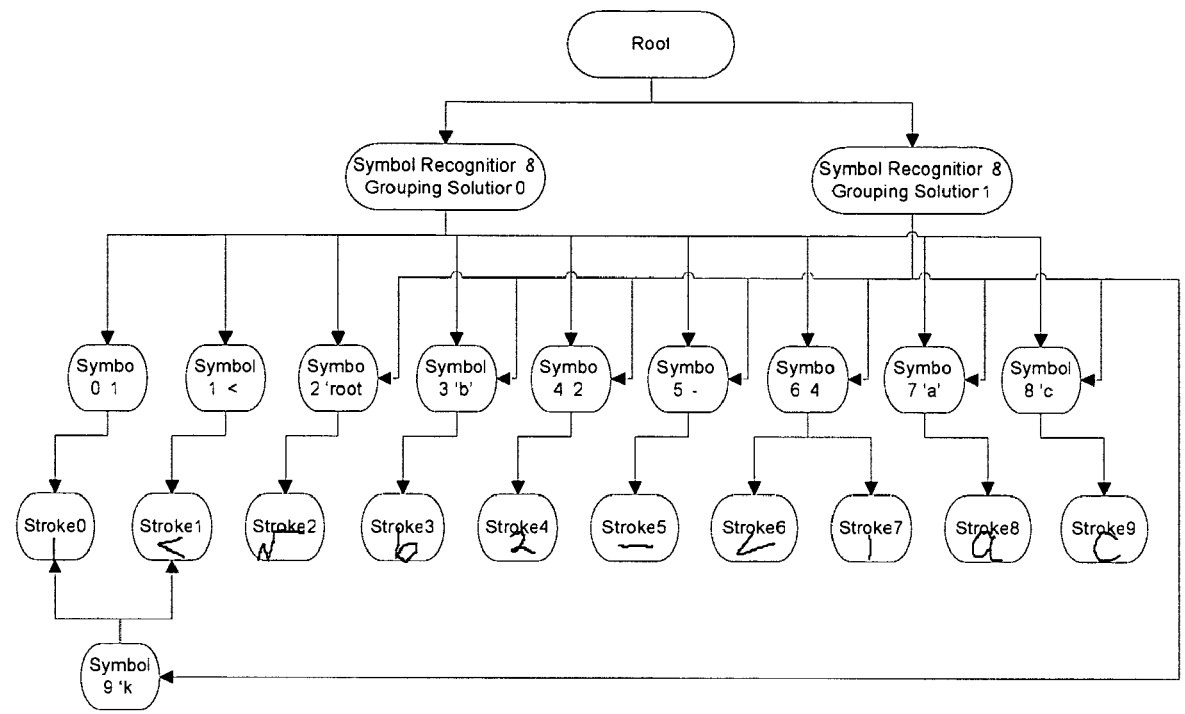
FIG. 15 is an illustrative block diagram of an example of a parse tree change after symbol grouping and recognition in accordance with at least one aspect of the present invention.

Symbol grouping and symbol recognition interacts with each other during the recognition process. FIG. 13 shows the flowchart of symbol grouping and recognition. Symbol grouping and recognition 1303 receives input strokes 1301 from the parse tree (as shown in FIG. 14), and groups input strokes 1301 into symbols 1305 using dynamic programming algorithm. During dynamic programming, symbol recognizer is called to test whether several strokes could be a meaningful symbol. In this component, there are possible multiple results of symbol grouping. Symbol grouping 1323 and symbol recognition 1333 create solution nodes in a parse tree to write back the multiple results. FIG. 15 shows the changed parse tree after symbol recognition and grouping. Symbol nodes are created at this stage. Then symbol recognizer is called again for each grouped symbol to find possible characters candidates and confidences. Character candidates and confidence of a grouped symbol are stored by corresponding symbol nodes. They are passed to succeeding components through the parse tree. The structure analysis component performs its operation at a later time based on the symbol node information.

Symbol Recognition

In one embodiment, an approach based upon Gaussian Mixture Model (GMM) is used to implement symbol recognition. An off-line feature is used in the GMM based symbol recognition. For computing off-line features, the writing direction for each point in the symbol strokes is calculated. The writing direction is the tangent direction of a sampling point. Usually, a tangent direction is not easy to calculate. For sampling point t, the tangent direction is estimated by using the line direction between sampling point t−1 and sampling point t. The angle ($\alpha$) between this line and the horizontal line is the value of the writing direction of point t. The writing direction is defined by:

$$\Delta x(t) = x(t) - x(t-1)$$

$$\Delta y(t) = y(t) - y(t-1)$$

$$\cos\alpha(t) = \frac{\Delta x(t)}{\sqrt{\Delta x^2(t) + \Delta y^2(t)}}$$

$$\sin\alpha(t) = \frac{\Delta y(t)}{\sqrt{\Delta x^2(t) + \Delta y^2(t)}}$$

Figure 17:
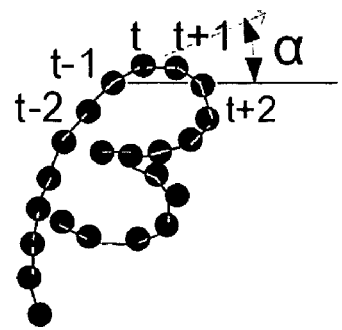
FIG. 17 illustrates an image and writing direction of a point t in accordance with at least one aspect of the present invention.

FIG. 17 shows the writing direction of the $t^{th}$ point in the point sequence. The point sequence is then converted to an image. Each adjacent point pair in the point sequence is connected with a line and an image may be obtained. FIG. 17 shows the converted image of $\beta$. The writing direction of each point on a line is equal to the writing direction of its former sampling point. In other words, the writing direction of the points between sampling point t and sampling point t+1 is equal to that of sampling point t. The size of the image is the same with ink strokes.

Because the size of different images is different, it is inconvenient to measure them. So, the image was normalized to a fixed scale of 64×64 pixels in symbol recognition. In this example, a nonlinear normalization is used. After normalization, the center of the normalized image should correspond to the gravity point. Normalization may be expressed as:

$$ax^2+bx+c=m$$

$$dy^2+ey+f=n,$$

where (x, y) is a point of original image, and (m, n) is a corresponding point in a normalized image. Here, five corresponding points may be obtained to solve this equation:

(0,0)→(0,0), (0,0)→(0,M), (Y,0)→(N,0), (X,Y)→(M,N), (Centroid)→(M/2,N/2), where X, Y is the width and height of the original image, and M, N is width and height of the normalized image, respectively. After these six (6) parameters are calculated, the origin point will be normalized using the above two equations. The centroid point may be calculated by:

$$CX = \frac{\sum_{i=1}^{m \times n} p(i)x(i)}{\sum_{i=1}^{m \times n} p(i)}$$

$$CY = \frac{\sum_{i=1}^{m \times n} p(i)y(i)}{\sum_{i=1}^{m \times n} p(i)}$$

if $i^{th}$ is black pixel, p(i)=1, else p(i)=0.

Figure 18:
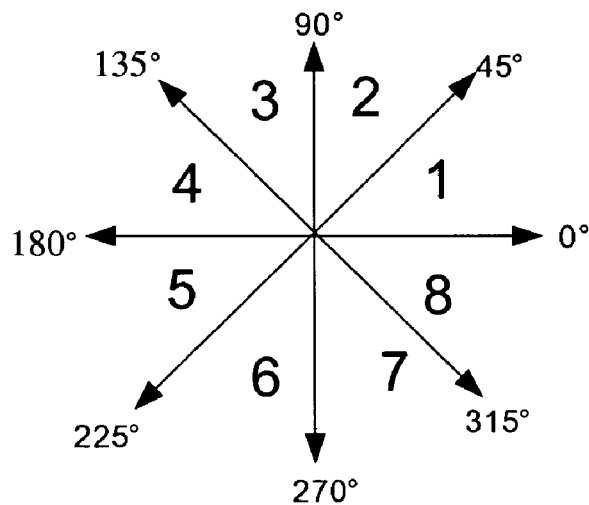
FIG. 18 illustrates a quantified directional graph in accordance with at least one aspect of the present invention.

The writing direction of each point is classified to eight (8) levels. FIG. 18 shows the quantified 8 directions. For example, as shown in FIG. 18, if the writing direction α of a point is 140°, then the quantified direction value is 4.

The commonly used mesh statistical method may be used to obtain a feature vector. The image may be evenly subdivided into 8 rows and 8 columns, so that the size of each sub-region is 8×8. The number of each direction in each sub-region is counted. A 512-dimension feature vector (8 rows×8 columns×8 directions) is obtained. For example, there are five black pixels in a sub-region. Writing directions of the 5 pixels are 30°, 40°, 50°, 80°, 110°. The quantified direction of each pixel, 1, 1, 2, 2, 3, may be obtained respectively. The 8 dimensional feature vector of this sub-region is 2, 2, 1, 0, 0, 0, 0, 0. All 64 sub-regions have such an 8 dimensional feature vector and finally a 512-dimensional feature vector may be generated.

Dimension reduction is another step in symbol recognition. Two reasons for using dimension reduction include cost and relativity. A 512-dimension system requires much more in calculation and some features may be correlated to other features, e.g., redundant information exists in the 512-dimension feature. In accordance with at least one aspect of the present invention, the 512-dimension feature is transformed to a 128-dimension feature. Any of a number of different dimension reduction techniques may be used for this purpose and those skilled in the art would understand the various techniques.

A technique commonly used for dimensionality reduction is Fisher's Linear Discriminant (FLD). It should be understood by those skilled in the art that FLD is commonly known. FLD is an example of a class specific method, in the sense that it tries to "shape" the scatter in order to make it more reliable for classification. This method selects the projection $W_{opt}$ in such a way that the ratio of the between-class scatter and the within-scatter is maximized. The between-class scatter matrix may be defined as:

$$S_B = \sum_{i=1}^{c} P_i (\mu_i - \mu)(\mu_i - \mu)^T,$$

and the within-class scatter matrix may be defined as:

$$S_w = \sum_{i=1}^{c} P_i \frac{1}{N_i} \sum_{j=1}^{N_i} (x_j - \mu_i)(x_j - \mu_i)^T,$$

where $\mu_i$ is the mean vector of class $X_i$, $P_i$ is prior probability of class $X_i$, and $N_i$ is the number of samples in class $X_i$. As a result, the optimal projection $W_{opt}$ is chosen as the matrix with orthonormal columns which maximizes the ratio of the determinant of the between-class scatter matrix of the projected samples to the determinant of the within-class scatter matrix of the projected samples, $$W_{opt} = \arg\max \frac{|W^T S_B W|}{|W^T S_w W|} = [w_1\ w_2\ \cdots\ w_m]$$

This ratio is maximized when the column vectors of projection matrix W are the eigenvectors of $S_w^{-1} S_b$ associated with the largest eigen values. The result is to maximize the between-class scatter while minimizing the within-class scatter.

To avoid the ill-pose problem when computing the eigen values of the matrix $S_w^{-1} S_b$, one embodiment of the present invention adopts the method as described in Swets, Daniel L. and Weng, John, *Using Discriminant Eigen Features for Image Retrieval*, IEEE Trans Pattern Analysis and Machine Intelligence, vol. 18, pp. 831-836, 1996. It should be understood by those skilled in the art, this method is merely illustrative and that any other similar methods may be used for the purpose.

H and Λ are computed such that, $S_w = H\Lambda H^T$, where H is orthogonal and Λ is diagonal. Then, $$\left(H\Lambda^{-\frac{1}{2}}\right)^t S_w \left(H\Lambda^{-\frac{1}{2}}\right) = I$$

U and Σ are then computed such that, $$\left(H\Lambda^{-\frac{1}{2}}\right)^t S_b \left(H\Lambda^{-\frac{1}{2}}\right) = U \sum U^t,$$

where U is orthogonal and Σ is diagonal. Then, $$S_w^{-1} = H\Lambda^{-1} H^t, \text{ and}$$

$$S_b = H\Lambda^{\frac{1}{2}} U \sum U^t \Lambda^{\frac{1}{2}} H^t$$

Defining, $$\nabla = H\Lambda^{-\frac{1}{2}} U,$$

the decomposition of $S_w^{-1} S_b$ may be found as following:

$$S_w^{-1} S_b = H\Lambda^{-1} H^t H\Lambda^{\frac{1}{2}} U \sum U^t \Lambda^{\frac{1}{2}} H^t$$
$$= \nabla \sum \nabla^{-1}$$

Fisher's Linear Discriminant (FLD) technique may be applied to transform a 512-dimension off-line feature into a 128-dimension feature. When this feature is fed into a GMM for symbol recognition purpose, dimension reduction significantly reduces calculation costs. In addition, recognition accuracy is also improved. The FLD technique maximizes the between-class scatter while minimizing the within-class scatter. As a result, the classification capacity of the reduced feature may be optimized.

The computation of product of a high-dimensional matrix and a high-dimensional vector is costly. The computation cost could be reduced by various techniques, such as quantification.

Gaussian Mixture Model (GMM) is a mixture probability distribution model. The probability of a symbol class may be represented by a GMM. If the number of symbol classes is C, C GMMs are required for classification task. A GMM is a linear combination of K Gaussian components, given by $$p(x) = \sum_{k=1}^{K} p(x|k)p(k) = \sum_{k=1}^{K} N_k\left(x \mid \mu_k, \sum_k\right)p(k) = \sum_{k=1}^{K} N_k\left(x \mid \mu_k, \sum_k\right)c_k,$$

where K is the Gaussian number for each symbol, $c_k$ is mixture weight subject to constraints $0 \leq c_k \leq 1$, and $$\sum_{k=1}^{K} c_k = 1,$$

$p(x|k)$ is called a Gaussian component. As such, $$p(x|k) = N_k\left(x \mid \mu_k, \sum_k\right) = \sum_{j=1}^{D} \frac{1}{(2\pi)^{D/2}\sigma_j^d}\exp\left(-\frac{1}{2}\frac{(x-\mu_j)^2}{\sigma_j^2}\right),$$

where D is dimension of feature (here D=128) and $\mu_k, \sigma_k, c_k$ are mean vector, variance vector, and priority of the $k^{th}$ component, respectively.

Next, a set of class conditional likelihood functions is considered:

$$g_i(X:\Lambda) = p_i(x),$$

where i=1,2, ..., C defined by the parameter set $\Lambda$ (including $\mu_k, \sigma_k, c$).

The classifier/recognizer operates under the following decision rule (classifier):

$$C(X) = C_i \text{ if } g_i(X; \Lambda) = \max_j g_j(X; \Lambda)$$

The Expectation-Maximum (EM) algorithm is a general method of finding the maximum Likelihood Estimation (MLE). In accordance with at least one aspect of the present invention, an EM algorithm is used to train a GMM via EM. The following is a process of training a GMM.

The process begins with data set X of N feature vectors $x_n$, n=1, ..., N, an initial set of K Gaussian components with $N_k = N_k(x|\mu_k, \Sigma_k)$, and K mixture weights $C_k$, k=1, ..., K. N is number of training symbols and the dimension feature is 128.

Then, the responsibility $p(k|x_n)$ of each component PDF for each training symbol feature (128-dimension) is determined as $$p_{kn} = p(k|x_n) = \frac{p(x_n|k)p(k)}{p(x_n)},$$

with GMM likelihood $$p(x_n) = \sum_{k=1}^{K} p(x_n|k)p(k).$$

Next, components' probability distribution functions (PDFs) and weights are re-estimated based on the data and responsibilities:

$$\hat{p}(k) = \frac{1}{N}\sum_{n=1}^{N} p_{kn}$$

$$\hat{\mu} = \frac{\sum_n p_{kn} x_n}{\sum_n p_{kn}}$$

$$\hat{\sigma}_{ik}^2 = \frac{\sum_n p_{kn}(x_{in} - \hat{\mu}_{ik})^2}{\sum_n p_{kn}}, i = 1, 2, \cdots, D.$$

The responsibility of each component PDF for each training symbol feature is determined, and the component PDFs and weights are re-estimated until GMM likelihood $$p(x) = \prod_{n=1}^{N} p(x_n)$$

of the entire training data set does not change appreciably:

$$\Delta L = \frac{L_{Current} - L_{previous}}{|L_{Previous}|} < 1 \times 10^{-4},$$

where L=log p(x).

Finally, the Gaussian Mixture Models are saved as classifier parameters.

One component in the pattern matching approach to symbol recognition is the training algorithm, which aims to produce typical (reference) patterns or models for accurate pattern comparison. In accordance with at least one aspect of the present invention, the method of classifier design by way of distribution estimation and the discriminative method of minimizing classification error rate (MCE) are used. In general, after EM training, the MCE method provides a significant reduction of recognition error rate. On a training sample, a loss function is computed to approximate the classification error, and on a training dataset, the empirical loss is minimized by gradient descent to optimize the classifier parameters. Let the discriminant function of class $\omega_i$ equate to:

$$g_i(X; \Lambda) = \max_j g_j(X; \Lambda).$$

One difficulty associated with the MCE training approach lies in the derivation of an objective function that has to be not only consistent with the performance measure, i.e., the error rate, but also suitable for optimization. The error rate based on a finite data set is a piecewise constant function of the classifier parameter $\Lambda$, and thus a poor candidate for optimization by a simple numerical search method. Following the methods as described in Juang, Biing-Whang et al., *Minimum classification error rate methods for speech recognition*, IEEE Transaction on Speech and Audio Processing, vol. 5, no. 3, May 1997, the misclassification measure of a pattern from class $\omega_i$ is given by:

$$d_i(x) = -g_i(x; \Lambda) + \log\left[\frac{1}{M-1}\sum_{j,j\neq 1} \exp[g_j(x; \Lambda)\eta]\right]^{1/\eta},$$

where $\eta$ is a positive number. The misclassification measure is a continuous function of the classifier parameters $\Lambda$ and attempts to emulate the decision rule. For an $i^{th}$ class utterance X, $d_i(X)>0$ implies misclassification and $d_i(X)<0$ means correct decision. It should be understood by those skilled in the art that these are illustrative methods and that the present invention is not so limited to the methods described herein.

A loss function may be defined as:

$$l_i(X; \Lambda) = l(d_i(X)) = \frac{1}{1+\exp(-\gamma d_i(X))},$$

where $\gamma$ is normally set to $\geq 1$. Clearly, when $d_i(X)$ is much smaller than zero, which implies correct classification, virtually no loss is incurred. Finally, for an unknown x, the classifier performance is measured by:

$$l(X; \Lambda) = \sum_{i=1}^{C} l_i(X; \Lambda) 1(x \in C_i),$$

where $1(\cdot)$ is the indicator function:

$$1(x) = \begin{cases} 1 & x \text{ is true} \\ 0 & x \text{ is false} \end{cases}$$

So the expected loss may be defined as:

$$L(\Lambda) = E_X\{l(X; \Lambda)\} = \sum_{i=1}^{C} \int_{x \in C_i} l_i(x; \Lambda) p(x) dx.$$

In discriminative learning, the parameters of GMM are adjusted to minimize the classification error on the training dataset. Various minimization algorithms may be used to minimize the expected loss. The generalized probabilistic descent (GDP) algorithm is an algorithm that may be used to accomplish this task. In the GPD-based minimization algorithm, the above target function $L(\Lambda)$ is minimized according to an iterative procedure. The parameters are updated by following equation:

$$\Lambda_{t+1} = \Lambda_t - \epsilon_t \nabla l(x_t, \Lambda)|_{\Lambda=\Lambda_t},$$

where t is iteration times and $\epsilon(t)$ is a small positive number satisfying:

$$\sum_{t=1}^{\infty} \varepsilon_t = \infty, \sum_{t=1}^{\infty} \varepsilon_t^2 < \infty, \varepsilon_t > 0.$$

The following GMM parameter transformations maintain the following constraints during adaptation:

$$c_{jk}(t+1) = c_{jk}(t) - \varepsilon(t)\frac{\partial l_i(x; \Lambda)}{\partial c_{jk}(t)}$$

$$\mu_{jkl}(t+1) = c_{jkl}(t) - \varepsilon(t)\frac{\partial l_i(x; \Lambda)}{\partial \mu_{jkl}(t)}$$

$$\sigma_{jkl}(t+1) = \sigma_{jkl}(t) - \varepsilon(t)\frac{\partial l_i(x; \Lambda)}{\partial \sigma_{jkl}(t)}$$

$$\varepsilon(t) = \varepsilon_0\left(1 - \frac{t}{T_{\max}}\right).$$

Figure 16:
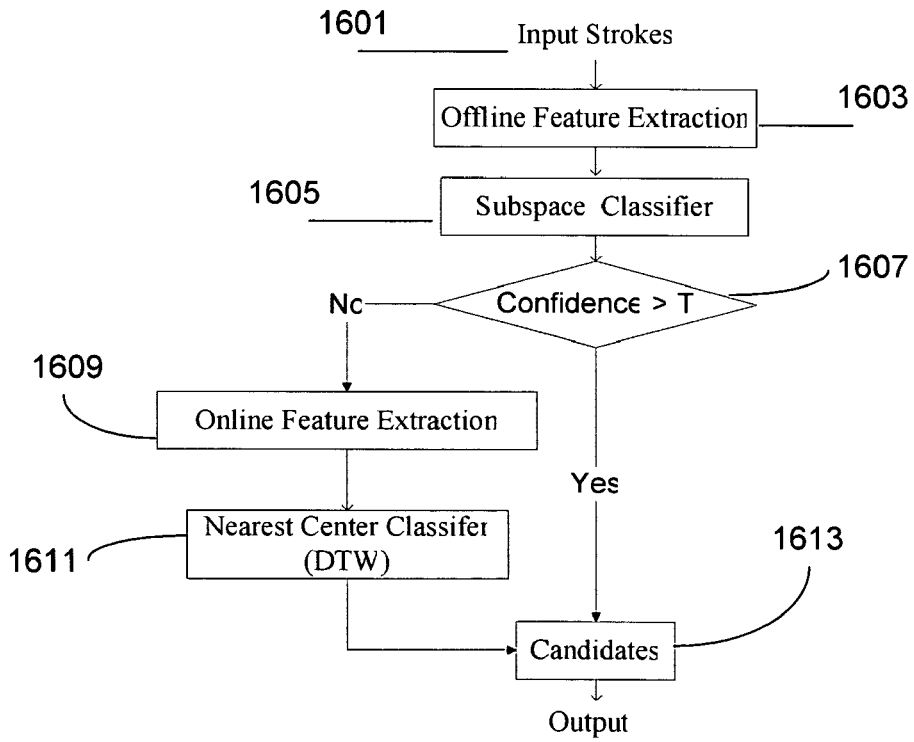
FIG. 16 is an illustrative flowchart of symbol recognition in accordance with at least one aspect of the present invention.

In another embodiment, a two-layer classifier may be used to implement symbol recognition. FIG. 16 is the flowchart of a two-layer symbol recognition. First, symbol recognizer extracts off-line features 1603 of the strokes 1601 which may be a symbol grouped by symbol grouping. Subspace classifier 1605 is used to classify the features and gives character candidates with confidence. If the top–1 confidence of the first candidate is high enough 1607, the symbol recognizer will output the candidates and confidence directly 1609. Otherwise, the recognition will go to the second layer. On-line features will be extracted 1611 and the nearest center classifier 1613 is used to give new character candidates and confidence.

The off-line classifier is a template-based classifier, which uses the same approaches of feature extraction and dimension reduction with GMM recognition. The online classifier is also based on a template matching approach. The online classifier extracts on-line features, and uses a classic Dynamic Time Warping (DTW) algorithm to calculate the distance between a template and a test pattern.

Figure 19:
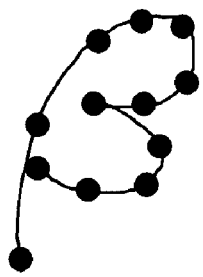
FIG. 19 illustrates a graph of dominant points in accordance with at least one aspect of the present invention.

For on-line feature extraction, dominant points are first detected at strokes. Dominant points are important points that may represent strokes well. If dominant points are removed from strokes, the strokes will be distorted significantly. In this example as shown in FIG. 19, the following three types of dominant points are used: pen-down and pen-up points, corner points, and mid-points. A pen-down and pen-up points are used firstly. A pen-down point is the first point of a stroke and a pen-up point is the last point of a stroke. If a writing direction of a point changes above a threshold amount from that of its previous point, we call this point as a corner point. The third type is the mid-points, which are points between two dominant points with above types. If a distance of two dominant points is too far, a third type of dominant point is created.

Figure 20:
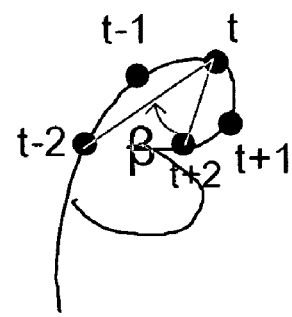
FIG. 20 illustrates a curvature direction of a point t graph in accordance with at least one aspect of the present invention.

With the dominant points detected, a local feature for each dominant point is extracted. Local features include the tangent direction and curvature direction. Every dominant point has a 4 dimensional feature: $f_i = (\cos \alpha(i), \sin \alpha(i), \cos \beta(i), \sin \beta(i))^T$. The tangent direction ($\alpha$) is shown in FIG. 17. In FIG. 20, the angle ($\alpha$) between the two lines is the approximate curvature direction ($\beta$). The curvature direction feature is described as:

$\cos \beta(t) = \cos \alpha(t-1) \cos \alpha(t+1) + \sin \alpha(t-1) \sin \alpha(t+1)$ $\sin \beta(t) = \cos \alpha(t-1) \sin \alpha(t+1) - \sin \alpha(t-1) \cos \alpha(t+1)$ Finally, the feature vector sequence: $F=f_1 f_2 f_3 \ldots f_m$, where m is the number of dominant points, and $f_i=(\cos \alpha(i), \sin \alpha(i), \cos \beta(i), \sin \beta(i))^T$ is generated.

In accordance with aspects of the present invention, symbol grouping depends on the confidence of symbol recognition. Generally, symbol recognition may tell the degree of similarity between a test pattern and an appointed symbol, but may not tell the degree that the given strokes are similar to a symbol.

Figure 24:
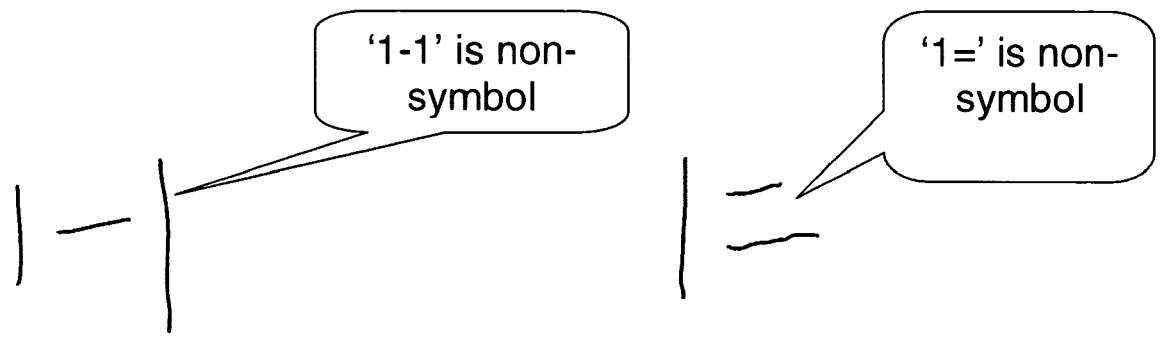
FIG. 24 illustrates examples of non-symbol recognition in accordance with at least one aspect of the present invention.

Sometimes, strokes may not be a symbol, but symbol recognition gives a very high confidence to the top-1 candidate. As described above, FIG. 24 shows two examples. In a usual symbol recognizer, may be recognized as "H", and may be recognized as "F" with high confidence. In dynamic programming, may be grouped into a symbol with high probability.

In order to resolve this ambiguity, in symbol recognition, a special symbol, a non-symbol, which means a stroke is not a symbol, is introduced. In other words, the symbol recognizer views non-symbols as "special symbols". Moreover, symbol recognition may give confidence of a non-symbol. It provides a decision base for symbol grouping. As described above, many non-symbol samples are generated from labeled expression data. Because symbols in expression data are labeled, other stroke combinations are all non-symbols. These samples are added into a dataset as a type of "special symbol". So if the system recognizes strokes as the "special symbol", these strokes are grouped into a symbol with a lower confidence.

Symbol Grouping

The task of symbol grouping is to separate strokes into several groups, which are most likely to be symbols. If any combination of strokes is considered in the calculation, the searching space is very large. For example, the number of different ways to only separate n strokes into 2 groups is $2^{n-1}-1$. However, the exact group number is unknown before symbol grouping is done. If all stroke combination of 3 groups, ..., n groups is considered, the searching space is so huge that calculation for grouping is not feasible at all.

To alleviate the computations, in accordance with one aspect of the present invention, an assumption is made that users write a symbol with several strokes which are consecutive in time order. Such an assumption is reasonable for most handwritten expression. Although a dot for an 'i' and a cross bar for a 't' may be appended after a writer has completed an math expression, few people write half a symbol then finish the symbol after completing the remainder of the sentence or other writing.

With this assumption, in accordance with one aspect of the present invention, the strokes may be sorted by time order. A consideration is made as to how to separate a stroke sequence into several segments, where each segment is a symbol, as shown in FIG. 23. Now the number of different ways to group strokes is $2^{n-1}$. Although the searching space is still large, it has been reduced sharply. Moreover, the assumption allows the use of a dynamic programming algorithm to search for an optimal solution for the problem. It should be understood by those skilled in the art that $2^{n-1}$ is the count of separating strokes into only 2 groups if no above time order assumption. However, the group (symbol) count is unknown before the calculation. So the count may be any one of 1, 2 ..., n, if the assumption described in the next paragraph is not incorporated. Therefore, the number of different ways separating n strokes without time order assumption is much greater than the number with time order assumption. In accordance with at least one aspect of the present invention, the stroke count of a symbol may always be below a fixed number. Because the vast majority of mathematical symbols are simple, users may write them with several strokes. Such a situation also reduces the searching space. Moreover, such a situation makes it easier to implement a dynamic programming approach after a relational score between neighboring symbols is involved.

A stroke sequence may be defined as strokes 1, 2, ... N. There may be many different ways to separate strokes in the stroke sequence into segments, e.g., to group the strokes into groups. For example, $(n_1=1, n_2-1), (n_2, n_3-1), \ldots (n_{k-1}, n_k-1=N)$ is one illustrative way to separate the N strokes into segments. A measurement may be defined to measure the different ways of grouping. With a defined measurement, different ways of grouping strokes may be compared, and an optimization technique may be used to find the solution.

In accordance with at least one aspect of the present invention, a way to group strokes may be evaluated based upon two aspects. First, a determination is made as to how likely a group is a symbol according to intra-group information. For the given segmentation, there are $p(1), \ldots, p(k)$ scores to measure the k groups. Second, a determination is made as to the relationships between neighboring groups to determine how likely two groups may be neighbors. $p(i|i-1)$ is defined to be the relational score between the $i\text{-}1^{th}$ and $i^{th}$ groups, where i is from 1 to k. If i is equal to 1, $p(1|0)$ is the likelihood that the group would be a first symbol of the stroke sequence. Therefore, the measurement for a way to group strokes may be defined by:

$$\text{Measurement} = \prod_{i=1}^{k} (p(i|i-1) \times p(i))$$

Although the searching space is reduced sharply, it is practically infeasible to calculate the scores for all ways and compare them to get the optimal one by brute force. There is a good characteristic in the grouping problem. If $s_1, \ldots, s_k$ are symbols for a stroke sequence. If the strokes of $s_k$ are erased, $s_1 \ldots, s_{k-1}$ are the symbols for the remaining stroke sequence. Formulaically, if $(n_1=1, n_2-1), (n_2, n_3-1), \ldots (n_{k-1}, n_k-1=N)$ is an optimal way of grouping the N strokes, then $(n_1=1, n_2-1), \ldots (n_{j-1}, n_j-1)$ is also an optimal way of grouping the sub-sequence $(n_{i-1}, n_j-1)$ of strokes. As such, dynamic programming may be utilized to obtain a global optimization based on the combinations of the local optimizations.

$S(1, i)$ is defined as the score of the optimal segmentation for sequence $(1, i)$. If the scores $S(1, i)$, where i is from 1 to N-1, are already known, the optimization for sequence $(1, N)$ may be calculated as:

$$S(1, N) = \max_{1 \leq L \leq 5}(S(1, N-L) \times p(N-L+1, N|1, N-L) \times p(N-L+1, N)),$$

where L is the length of last group, $S(1,N-L)$ is optimal score of sequence $(1, N-L)$, $p(N-L+1,N|1,N-L)$ is the likelihood that group $(N-L+1, N)$ may be the next group of the optimal groups of sequence $(1, N-L)$, and $p(N-L+1,N)$ is the likelihood that $(N-L+1, N)$ is a symbol. There, $p(N-L+1,N|1,N-L)$ only depends on the last group of sequence $(1, N-L)$.

The use of space analysis alone to determine whether several strokes may be a math symbol is rather difficult. FIG. 22 shows an example of this problem, where strokes within box 2203 are not much different from strokes within box 2201 from the perspective of spatial information. However, strokes within box 2203 should be grouped to a symbol because the strokes are part of the character 'A.' Therefore, besides spatial information, symbol recognition is an important information source for symbol grouping. Symbol recognition may output possible character candidates and their corresponding confidences for any given strokes, which may be utilized in the calculation for grouping.

Usually, symbol recognition assumes given strokes must be a predefined symbol, and symbol recognition outputs the top–n likely candidates for the given strokes. For the task of symbol grouping, one aspect is that symbol recognition determine if given strokes are a predefined math symbol, and with how much confidence. The non-symbol is similar to a common symbol, so that symbol recognition may recognize the non-symbol and give its confidence. But the non-symbol is also a special symbol, which means given strokes are not a math symbol if the strokes are recognized as a non-symbol.

Thus, symbol recognition may output the top-n character candidates and their confidences. Moreover, there may be possible non-symbols in the candidates, with the summation of all confidences being equal to 1. As described above, determination of a score, which is likelihood that given strokes are a math symbol would be helpful. In accordance with at least one aspect of the present invention, the score $S_r$ is defined as the confidence summation of all candidates which are symbols.

Usually, system recognition has to normalize inputting strokes to its inner scale, and the recognition operates best in the inner scale. But different from text handwriting, where characters are almost the same size, the sizes of math symbols may vary, especially when the mathematical symbols are located at different levels of within an expression. Under such conditions, the normalization loses some needed space information. Several spatial features may be used to compensate for this weakness.

As described above, the distance feature (d) is one feature for determining grouping. This feature prevents over-grouping of strokes. At different levels of grouping such a symbol, the function string, the definition and the calculation of distance are different. In (a) of FIG. 21, there is an obvious distance between 'a' and '+', so 'a' and '+' should not be grouped together.

The size difference feature ($\delta$) prevents a symbol and its subscript or superscript from being grouped. In (b) of FIG. 21, the size difference may be used to distinguish some special letters, such as lower case 'o' and upper case 'O'. Without this feature, it may be difficult for a recognition engine to distinguish lower case and upper case letters correctly.

The offset feature ($\sigma$) is another feature in symbol grouping which is used to guarantee symbol strokes located in the same horizontal line. As shown in (c) of FIG. 21, "a+b" and "c+d" are not grouped into a symbol because there is a fraction line between them.

After the feature extraction, a decision function is constructed to combine the features to get a score, which is the probability that the stroke set is a correct group. The decision function is constructed as the following:

$$f(d, \delta, \sigma) = \frac{1}{1 + \left( \left(\frac{d}{d_0}\right)^\alpha + \left(\frac{\delta}{\delta_0}\right)^\beta + \left(\frac{\sigma}{\sigma_0}\right)^\gamma \right)}, (\alpha, \beta, \gamma > 1),$$

where $d_0, \delta_0, \sigma_0$ are the thresholds of the three geometrical features. The $\alpha, \beta, \gamma$ are similar to the $\lambda$ of a sigmoid function and are used to tune the softness of the decision boundary. With the function, a score $S_s$ based on spatial information, which also measures how likely a stroke set is a symbol, may be determined.

Now, with the two scores from intra-group information, the following formula may be used to combine the two scores to determine a final intra-group score:

$$S_w = (S_r)^p \times (S_s)^{1-p},$$

where p is a weight corresponding to how much the score given by the symbol recognition subsystem may be trusted. Moreover, a different weight p may be used for a different character. For example, if the symbol recognition subsystem gives robust confidence for character 'A,' a big weight p for character 'A' may be used. By doing this, better flexibility in determining symbol recognition may be obtained.

Besides weight p, $d_0, \delta_0, \sigma_0$ and $\alpha, \beta, \gamma$ also depend on the character given by symbol recognition. In accordance with at least one aspect of the present invention, supported characters are categorized into certain number of clusters. Each cluster has independent model parameters, which may be trained with a training program. The design of cluster-dependent parameters achieves better accuracy performance than a system with only one set of parameters.

Figure 28:
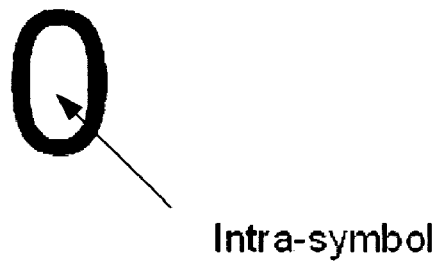
FIG. 28 illustrates an intra-symbol spatial relationship configuration in accordance with at least one aspect of the present invention.
Figures 33, 34, 35:
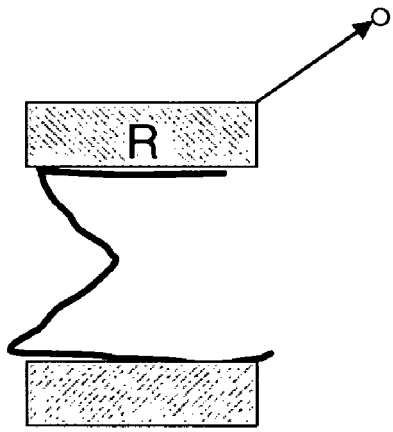
FIG. 33 illustrates an example of an expression with a tree of sub-expressions in accordance with at least one aspect of the present invention.
FIG. 34 illustrates an example of a rectangle centered control region for 'Above' and 'Below' sub-expression types respectively in accordance with at least one aspect of the present invention.
FIG. 35 is an equation used to calculate a relational score in accordance with at least one aspect of the present invention.

A mathematical expression is a two dimensional (2D) layout of symbols. Some symbols have unique spatial structures. For instance, symbol '$\Sigma$' usually has other associated symbols in the regions directly above and directly below the symbol, such as shown in FIG. 34. The rich spatial information may be used to solve the grouping problem. A typical example is the symbol '$\theta$'. If inter-group spatial information is not considered, symbol '$\theta$' is often separated into two symbols: '0' and '–', such as shown in FIG. 28. However, it is not possible that '0' and '–' overlap each other spatially in an expression. This correlates to the understanding that the separation is incorrect.

Figure 27:
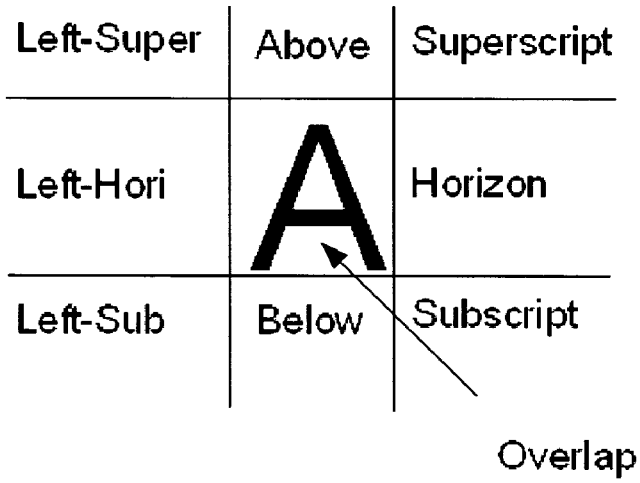
FIG. 27 illustrates an inter-symbol spatial relationship configuration in accordance with at least one aspect of the present invention.

In the system in accordance with at least one aspect of the present invention, nine spatial relations are defined for inter-symbol spatial relationships, such as shown in FIG. 27. They are horizon, superscript, subscript, above region, below region, overlap, left-horizon, left-super, and left-sub. During the calculation for grouping problem, whether a break is correct or not is not know. If a tentative break lies in a symbol, the relationship of two groups separated by the break are classified into nine classes. However, such a configuration of the nine classes is meaningful only for inter-symbol spatial relations. As such, in accordance with at least one aspect of the present invention, the intra-symbol relationship is defined to better model the situation of a break lying in a symbol, such as shown in FIG. 28.

In sum, there are ten spatial relationships defined in the system. Given two neighboring groups, spatial features are extracted from the two groups. A Gaussian Mixture Model may be used to fit its feature distribution for each relationship. With the Gaussian models, a classifier identifies the spatial relationship between two groups. Moreover, the classifier may give the confidence for the identified relationship. The confidence may be defined as p(R|F), where F is the spatial features and R is one of ten relationships.

A mathematical expression is also a syntax structure. Although a user may write math symbols in any order, which perhaps is not consistent with the syntax structure, it is still reasonable to utilize the temporal context information to calculate grouping. For example, if a user writes a digit, it is possible that the next written symbol is also a digit. Therefore, a bi-gram probability may be built in the system to utilize the temporal context information.

The bi-gram probability is built by combing spatial relationships together. The bi-gram probability is defined as $p(S_2|S_1,R)$, where $S_1$ is the previous character, $S_2$ is the next character, and R is one of ten relations. $p(S_2|S_1,R)$ may be calculated by:

$$p(S_2|S_1, R) = \frac{p(S_1, S_2, R)}{p(S_1, R)} = \frac{C(S_1, S_2, R)}{C(S_1, R)},$$

where $C(S_1,S_2,R)$ represents the count of events of a previous character is $S_1$, and a next character $S_2$, and their relationship is R. $C(S_1,R)$ represents the count of events of a previous character $S_1$ and R represents the relationship with a next symbol.

Because the bi-gram probability $p(S_2|S_1,R)$ depends on the characters of the symbols, given two neighboring groups, symbol recognition may output their character candidates and confidences. An inter-group score may be calculated as:

$$S_b = \prod_{S_1, S_2, R} (p(S_1) \times p(S_2) \times P(R|F) \times P(S_2|S_1, R))$$

Tabular Structure Analysis

Returning to FIG. 3, tabular structure analysis for handwritten mathematical expressions component 305 is another module in the mathematical expression recognition system. Tabular structure includes matrix and multi-line expression. It may be useful to divide a group of handwritten strokes into columns and rows and thus form matrices or multi-line expressions. Each cell of the results may be further recognized as a sub-expression by other modules or recursively processed if it still contains tabular structures.

The algorithm of tabular structure analysis in the recognition system for mathematical expression includes three parts. Firstly, X-Y projection divides the inputted strokes into rows and columns. This affects those divisible parts and has no negative effect for non-tabular structures. Secondly, those candidates of tabular structures given in the previous step are accepted or rejected by judging whether brackets exist. Thirdly, some rows and columns may be merged to correct the over segmentation problem in the X-Y projection. The main difference between matrices and multi-line expressions is the surrounding brackets. This is judged in the second step. If a structure is judged to be a multi-line expression, all columns may be merged into one column in the third step.

Tabular structure analysis is the process of dividing strokes into rows and columns. Blank is a feature for tabular structures. Rows and/or columns are divisible when there are blanks among them. An X-Y projection is used to identify the blanks in the rows and/or columns of strokes, such as shown in FIG. 31.

Figure 31:
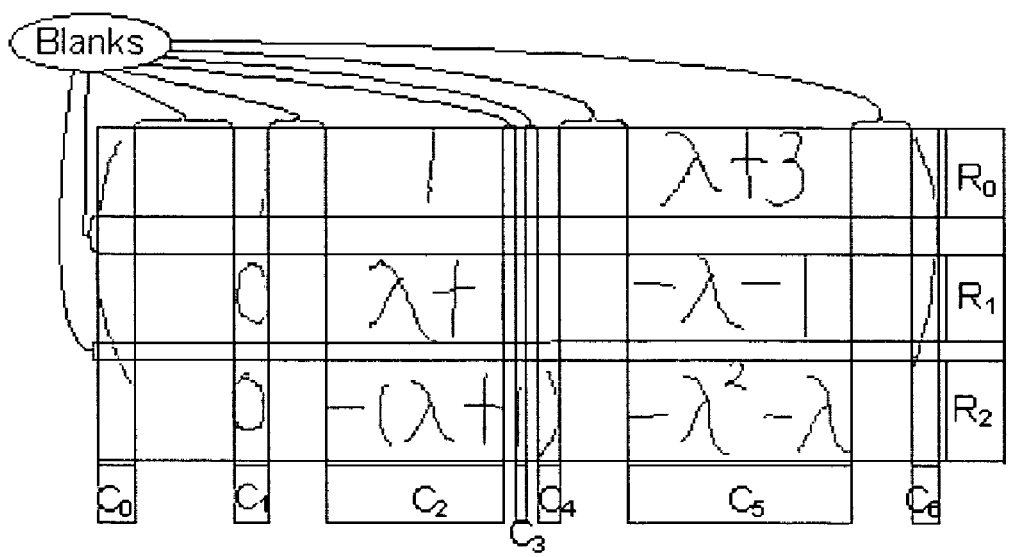
FIG. 31 illustrates the use of an X-Y projection on a handwritten mathematical expression in accordance with at least one aspect of the present invention.
Figure 32:
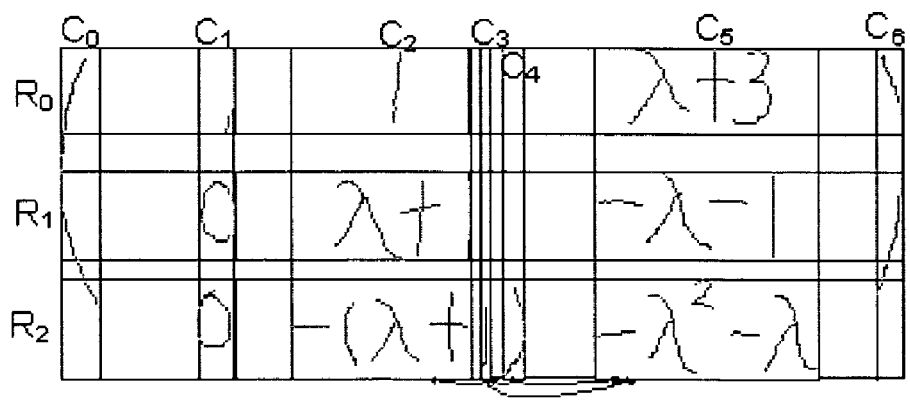
FIG. 32 illustrates another use of an X-Y projection on a handwritten mathematical expression in accordance with at least one aspect of the present invention.

The following is an illustrative implementation with respect to FIGS. 31 and 32. Firstly, a whole input block is projected on the X axis and divided into columns. For example, as shown in FIG. 31, the whole input block is divided into seven columns, $C_0$, $C_1$ ... $C_6$. Secondly, the maximum divisible columns from left to right are searched incrementally. Each column is projected to the Y axis with previous divisible columns to judge whether these columns are also divisible. If divisible, searching continues to the next divisible column. Otherwise, a determination is made as to whether previous divisible columns exist. If previous divisible columns do not exist, no further determinations are needed and the process continues. Otherwise, the previous divisible columns are used to form a tabular structure and previous divisible columns are set to empty.

For example, column $C_0$ in FIG. 31 is first processed and shown as indivisible. Moving to the next column, column $C_1$ is divided into 3 rows. Column $C_2$ is the same as column $C_1$ and the combination of these two columns also form 3 rows. Although column $C_3$ has only one stroke, as shown in row $R_2$, and thus is indivisible, the Y projection on the combination of columns $C_1$, $C_2$, and $C_3$ identifies a structure of 3 rows and 3 columns. After processing columns $C_4$ and $C_5$, a tabular structure of 3 rows and 5 columns is obtained. Because over segmentation problem exists (e.g., columns $C_3$ and $C_4$ should not be separated from column $C_2$), such a tabular structure may contain empty cells which will be eliminated later. Column $C_6$ is then processed next. As with column $C_0$, column $C_6$ is indivisible so the previous five columns are regarded as a candidate of a tabular structure and processing continues as described in the following.

A bracket is a component of tabular structures. If a pair of brackets is found at the left and right sides of a candidate which is given in the previous X-Y projection, the candidate is accepted as a matrix. If there is only one curved bracket at the left side and the right side has an opening, the candidate is accepted as a multi-line expression. Otherwise, the candidate is rejected and processed by other modules as appropriate. For example, if some superscript and subscript elements are aligned as a vector, they may be a candidate given by X-Y projection. However, because the left and right strokes are not brackets, the false candidate may be rejected at this point.

A symbol should satisfy the following two requirements to be accepted as a bracket. One is that its symbol recognition result should be a valid bracket which is described above. The other requirement is that the height of the symbol is large enough to encapsulate the candidate and that the proportion between the width and the height of the symbol is small enough in comparison to one or more thresholds. Such criterion may be controlled by two pre-defined thresholds.

A simple X-Y projection may introduce the over segmentation problem described above with reference to FIG. 31. The system may not be configured to support matrices which contain empty cells. If some columns which have empty cells are found after the X-Y projection, they may be merged with one of the neighboring columns. The distance to the left neighbor and right neighbor may be compared and such a column will be merged with the nearer neighbor. For example, columns $C_3$ and $C_4$ in FIG. 32 are nearer to column $C_2$ comparing with the distance to column $C_5$. So columns $C_2$, $C_3$, and $C_4$ are merged into one.

Next, the distances between any two neighboring columns are compared with a pre-defined threshold. Those columns whose distances are very short may also be merged to reduce over segmentation further. If the right side of the tabular structure is opening, then it is recognized as a multi-line expression and all columns are merged into one. Finally, rows may be also merged when the distances between rows are short enough when compared to a pre-defined threshold. Such a determination and process may be used to correct the over segmentation for those cells that only contain a fraction.

Subordinate Sub-expression Analysis

Mathematical expression is data with structure information. Besides subscript and superscript structures, there are above and below spatial relations (Σ) and pre-superscript spatial relations (√) in expressions. To represent the relationship between symbols, people use more layout types for expressions in both handwritten notes and printed documents. This makes expression structure analysis much different than text layout analysis, where regular words, lines, paragraphs exist.

The data structure of a mathematical expression is inherently a tree structure. Logically, an expression may be divided into several sub-expressions and a sub-expression may be subordinate to a symbol which is in another sub-expression. With the subordinate relationship, the sub-expressions form a tree. Therefore, the inherent hierarchical sub-expression structure for the system may be found. For further processing, an entire expression may be subdivided into several parts. The following describes the task as structure analysis.

In accordance with at least one aspect of the present invention, two sub-expression types are distinguished to be handled. The first type is a sub-expression subordinate to special structural symbols, such as Σ, √, ∫, which are named as dominant symbols. These symbols always imply unique layout relations existing in expressions. The second type is a sub-expression of a subscript or a superscript, which also often appears in common text. In accordance with one aspect of the present invention, the first type of sub-expressions is found in an expression and the recursive structure is then determined. The other type will be processed by the next component.

The subordinate sub-expression analysis component is a component of the system of expression recognition. Three points are described again for the sake of consistency. A parse tree is used and passed by all components in the mathematical expression system. The parse tree may be an extended BST tree, which is defined herein.

FIG. 3 shows the framework of the recognition system. The subordinate sub-expression analysis component 307 gets symbols from the parse tree, analyzes these symbols, and writes the multi-results back to parse tree. Arriving at this point, the parse tree includes multiple results of the previous symbol grouping and recognition component 303. This component continues to handle all these results respectively.

As described herein, there are so many ambiguities in a handwritten mathematical expression. Structure ambiguity is one of the ambiguities. Sometimes, it is not easy to judge if a symbol is inside a radical sign or not. FIG. 33 is such an example. The ambiguity is whether the symbol "c" is inside or outside the radical sign. In accordance with at least one aspect of the present invention, multiple results are outputted to resolve these kinds of ambiguities.

As mentioned herein, an expression is a tree of sub-expressions. FIG. 33 shows this concept clearly. In FIG. 33, the content in each rectangle is a sub-expression. The left two sub-expressions are subordinate to the fraction line and the right sub-expression is subordinate to the radical sign. The two dominant symbols lie in the main sub-expression. The four sub-expressions form a tree structure. Sub-expressions may include one or more symbols. Within a sub-expression, there are no other spatial relations except horizontal spatial relations between symbols. This component mainly analyzes the first type of sub-expression, namely the subordinate sub-expression. In the component, subscript and superscript are handled in the same way to deal with horizontal relationships. The subtle distinctions among them are processed by the next component.

Dominant symbols imply particular layout types in expressions. They are separated from other symbols and used as hints by this component. In Table-1, the rows are dominant symbols supported by the component so far and the columns are the types of their relationships with the corresponding sub-expressions. The marks in cells of the table body mean dominant symbols may have the corresponding types of sub-expressions. For example, there are two cells marked in the first row, so that fraction line may have two sub-expressions, one is the numerator above the fraction line and the other is the denominator below the fraction line.

TABLE 1

Example Dominant Symbols and Relationships

| | Above | Below | Contain | Index |
|---|---|---|---|---|
| — (fraction line) | ✓ | ✓ | | |
| Π (N-Array product), | ✓ | ✓ | | |
| Σ (N-Array sum) | | | | |
| ∫ (Single integral sign) | ✓ | ✓ | | |
| ∮,∫∫,∫∫∫ (Other integral signs) | | ✓ | | |
| √ (radical sign) | | | ✓ | ✓ |
| -, → (hat symbols) | | ✓ | | |

This component uses a graph search algorithm, which includes the steps of constructing a relational graph and searching the Top-N optimized spanning tree. In the graph, vertexes are symbols and edges are possible relationships between symbols and their corresponding intensity. It is also possible that there are multiple relations between two symbols due to spatial ambiguities.

The graph is not the final description of symbol relationships. There are many conflicts in the graph. One is, as mentioned above, multiple relationships exist between two symbols, but actually only one is valid. Another example is a symbol may be subordinate to multiple symbols in the graph. So after graph construction, a search process is performed in the graph to decide which relations are valid. These valid relations (edges) finally form an optimal spanning tree on the graph. Moreover, the search algorithm investigates almost all possible combinations of edges during the process. It may evaluate all combinations, which are spanning trees, and record Top-N optimal results. This component performs the following two tasks. First, the component finds subordinate sub-expressions for each dominant symbol. By doing this, Top-N hierarchical trees of a sub-expression are constructed. These multiple results are mapped to a parse tree for further processing.

Second, the component decides characters of dominant symbols. The symbol recognition component supplies a list of character candidates for each symbol, but the character of the final symbol is still undetermined. Actually, it is impossible to decide a unique character for each symbol only by symbol recognition. For example, 'Minus' and 'Fraction line' may not be classified from each other by a symbol recognizer. For such a case, structure context information is needed, because 'Fraction line' has two sub-expressions—denominator and numerator. So the component also may determine characters of dominant symbols with structure information.

Figure 48:
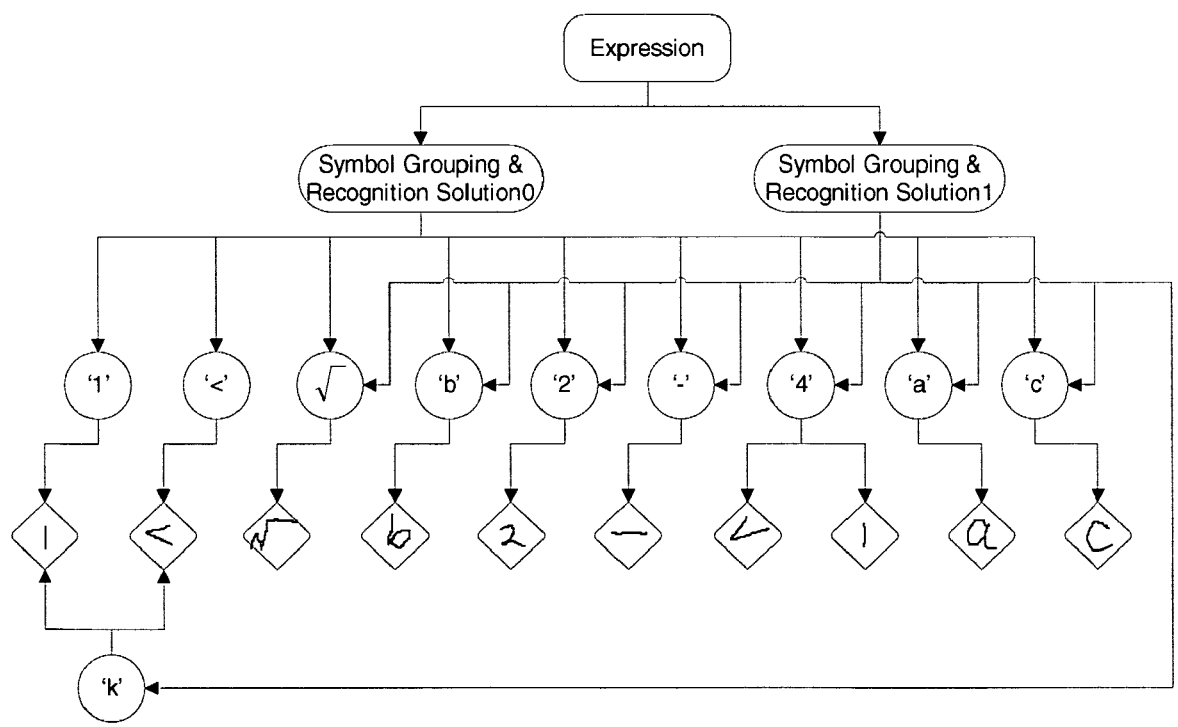
FIG. 48 is an illustrative block diagram of an example of a parse tree change after symbol grouping and recognition in accordance with at least one aspect of the present invention.
Figure 49:
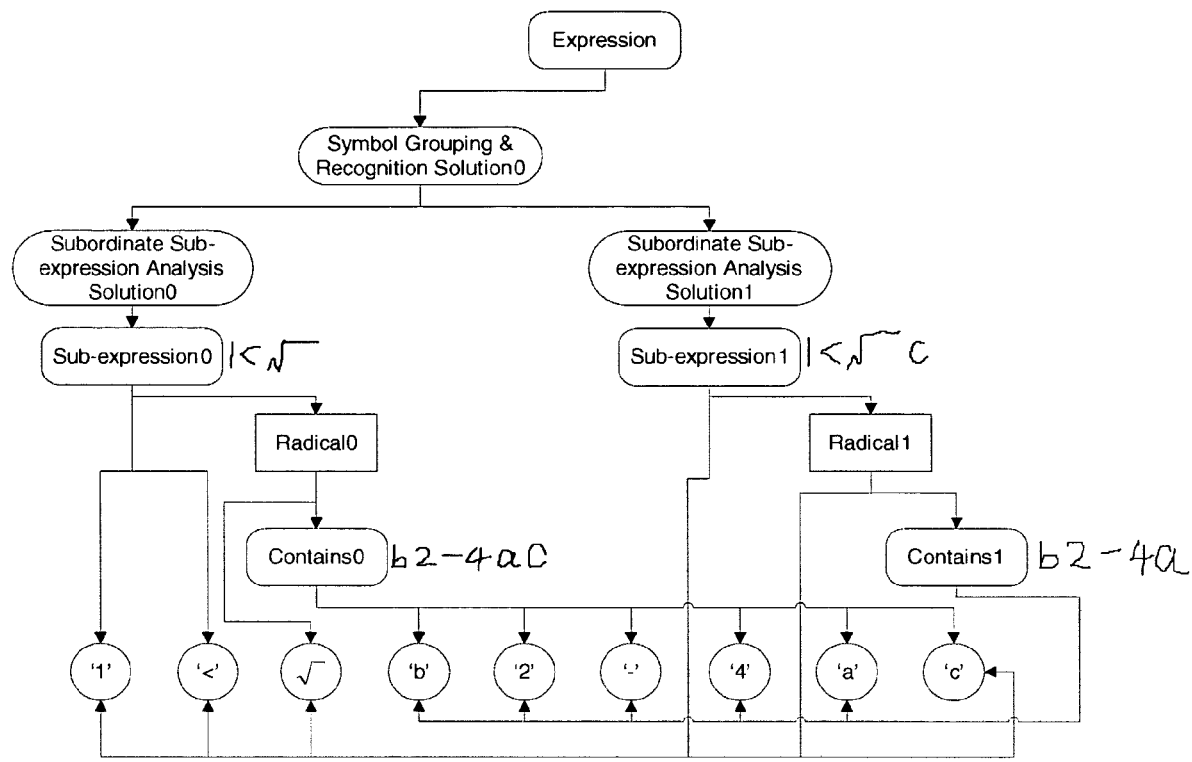
FIG. 49 is an illustrative block diagram of an example of a parse tree change after subordinate sub-expression analysis in accordance with at least one aspect of the present invention.

The input of this component is a handle of the parse tree. By this handle, this component may access the whole parse tree. Arriving at this point, the parse tree has been processed by the symbol grouping and recognition component. It has created some symbols grouping and recognition solution nodes in the parse tree to represent the multiple results of the symbol grouping and recognition component. For an intuitive image, an example snap shot of the parse tree at this time is given at FIG. 48. This component accesses one solution node, gets all the descendent symbols node of the solution nodes, processes the symbols nodes, writes back multi-results, accesses another solution node and continues until all symbols grouping and recognition solution nodes are processed. This component will create a new subordinate sub-expression analysis solution node in the parse tree for each result. Processed by this component, the parse tree may look like FIG. 49.

In construction of a graph, calculating relational scores for edges may be needed. A relational score is a measure of the intensity of a relationship. Five relational types are taken into consideration. Beside the four relational types in Table 1, the horizontal relationship enabled for any math symbol is considered. So for each couple of math symbols, there are five possible edges between them initially. Edges with a lower score than a specified threshold are removed in order to reduce memory cost and time cost. The following are some concepts in the calculation.

For each symbol and for each enabled relational type, a rectangle centered control region is calculated from a fairly large training set. The control region is a centered rectangle which is infinite and truncated. In FIG. 34, the two shadowed rectangles represent the two rectangle centered control regions for 'Above' and 'Below' sub-expression types respectively. FIG. 37 is an example to describe how the control region is truncated.

The score is calculated to measure to what extent a point (x, y) is subordinate to a specified control region according to sub-expression type R. If the point is located inside the centered rectangle of a control region, the score will be set to 1.0, the biggest score value. In the alternative, if the point is not located in the control region, the score will be set to 0.0, the smallest score value. The general principle when calculating a relational score is that the nearer the point is to the centered rectangle, the bigger the score will be and the farther the point is to the centered rectangle, the smaller the score will be. FIG. 35 is the equation used to calculate the score. In FIG. 35, $f_R(x,y)$ represents the score. $O_R(X)$, $O_R(x)$ represent the offsets of the point (x, y) to the according rectangle respectively. $\lambda_x, \lambda_y, x_0, y_0$ are specified thresholds. FIG. 36 is the graphical description of the equation in FIG. 35.

Figure 39:
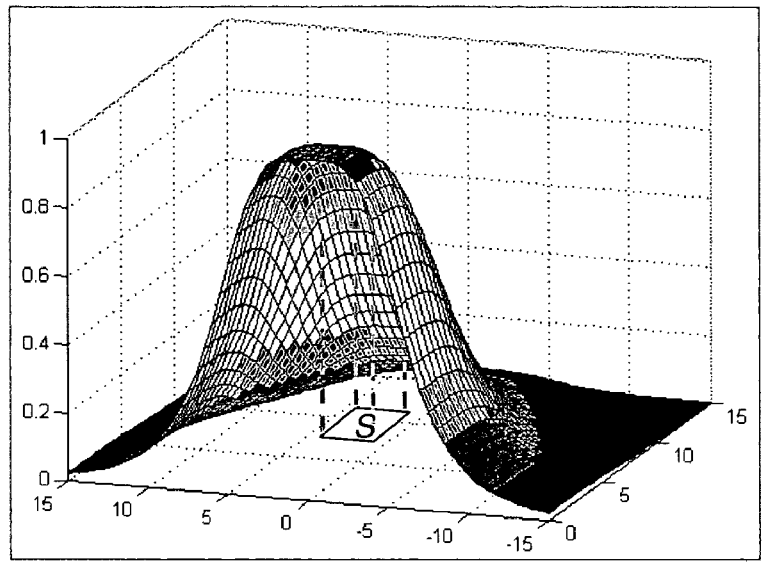
FIG. 39 is an illustrative example of a graphical description of the equation from FIG. 38 in accordance with at least one aspect of the present invention.

Given a symbol, the bounding box may be determined. This component calculates symbol score to a control region by the corresponding bounding box. First, it samples a specified large number of points in the bounding box uniformly. Second, it calculates point relational score for each sampled point one by one using the method mentioned above. Third, it averages all those score obtained at the second step to get the symbol relational score. FIG. 38 is a formal description where S is the bounding box of a symbol to calculate relational score, R is the according infinite but truncated control region and (x, y) is point in S. FIG. 39 is an intuitive description of such an operation.

Figure 40:
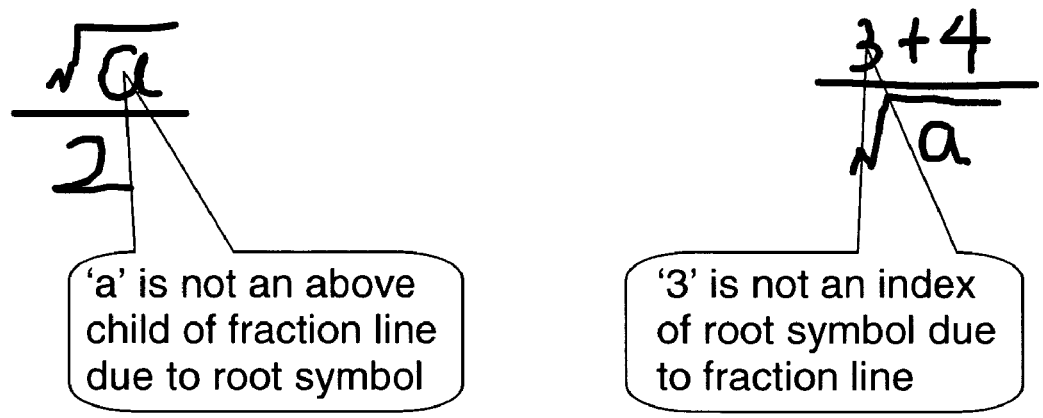
FIG. 40 illustrates a set of handwritten mathematical expressions in accordance with at least one aspect of the present invention.

The relational score from the previous step has a shortcoming in that it does not take the global information into consideration. But a third symbol may affect the relationship between two symbols. There are two cases. The first case is that the subordinate symbols subordinates to a more specific dominant symbol. For example, in the left part of FIG. 40, symbol "a" is above the fraction line and is contained by the radical sign. Because the radical sign is above the fraction line, it is the more specific dominant symbol related to the symbol "a". In this case, the radical sign affects the relationship between the symbol "a" and the fraction line. There is no direct relationship between the symbol "a" and the fraction line at all because of the existence of the more specified radical sign. The other case is that two symbols having some relationship with each other are separated by a third dominant symbol. The right part of FIG. 40 shows this case. If the fraction line does not exit, the index relationship between the symbol "3" and the radical sign will be assigned a high score. Such does not occur here. Because of the existence of the fraction line, the symbol "3" becomes the numerator and the radical sign becomes the denominator. The two symbols have no direct relationship any more.

Figure 41:
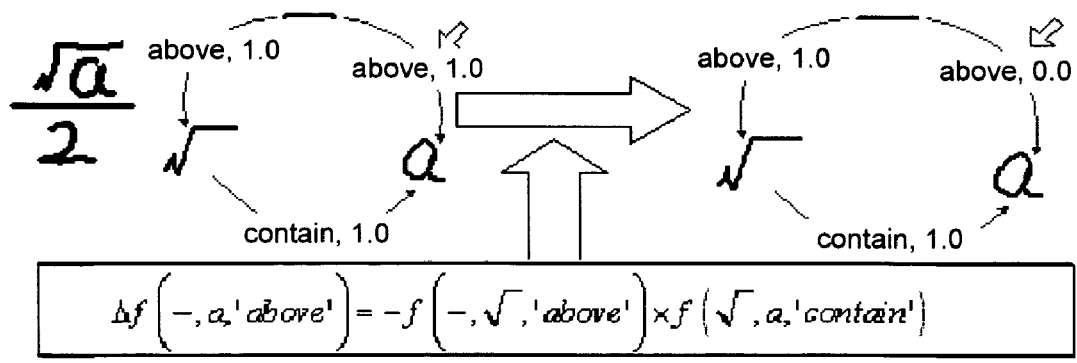
FIG. 41 illustrates relational scores between strokes of handwritten mathematical expressions in accordance with at least one aspect of the present invention.

The relational score needs to be adjusted with reference to global information for both of the two cases mentioned above. For the first case that the subordinate symbols subordinates to a more specific dominant symbol, the original relational score is subtracted a value equal to the product of two relation scores. One is the relational score between the subordinate symbol and the more specific dominant symbol. The other is the relational score between the more specific dominant symbol and the subordinate symbol. In FIG. 41, the above relational score between the symbol "a" and the fraction line is subtracted from the value of the relational score between the symbol "a" and the radical sign which is a more specific dominant symbol to the symbol "a". For the other case that two symbols having some relationship are separated by a third symbol, the relational score between the two symbols is subtracted from a value equal to the product of the relational scores between the third symbol and the two symbol respectively. In FIG. 42, the index relational score between the symbol "3" and the radical sign is subtracted from a value of the product of the above relational score between the symbol "3" and the fraction line and the below relational score between the radical sign and the fraction line which is a separator. Generally speaking, to adjust the relational score between two symbols, all the other dominant symbols must be gone though to perform the two rules mentioned above. FIG. 43 is an overall formal equation to be used to adjust the relational score by global information in this component.

In this graph, an edge represents a relationship between two linked math symbols. Because of the ambiguity in handwritten mathematical expressions, there may be more than one relationship between each couple of math symbols. An edge will be created for each couple of symbols and for each relational type. In order to build such a graph, the horizontal relationship is also taken into consideration. All math symbols including dominant symbols may have a horizontal relationship with the symbols behind them. So there will be two types of edges namely the paternity edges and the brotherhood edges in the obtained graph. In order to reduce time cost and storage cost, edges with relational score lower than a specified threshold will be pruned. FIG. 44 is such a relational graph.

Figure 45:
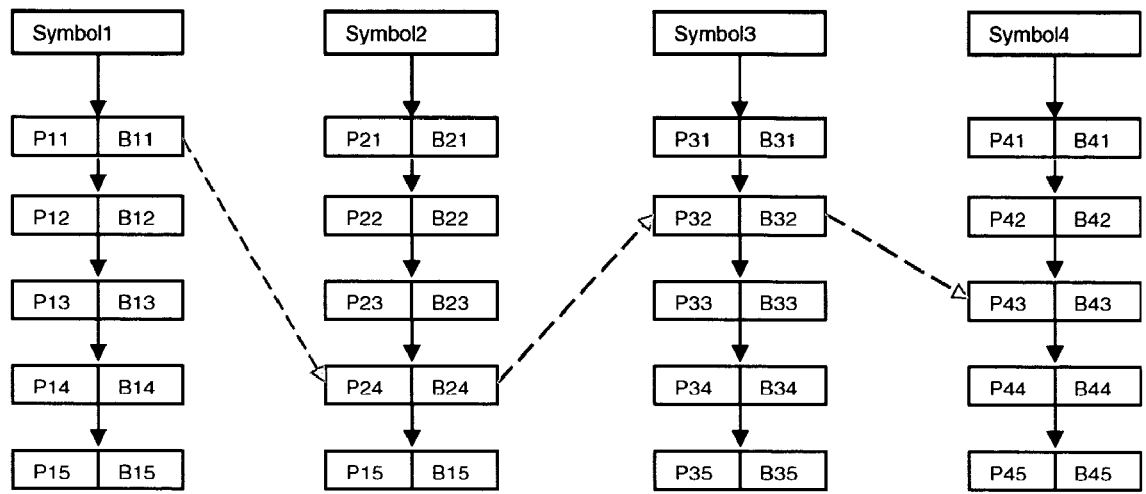
FIG. 45 is the search process and FIG. 46 is the input and output of the search process in accordance with at least one aspect of the present invention.
Figure 46:
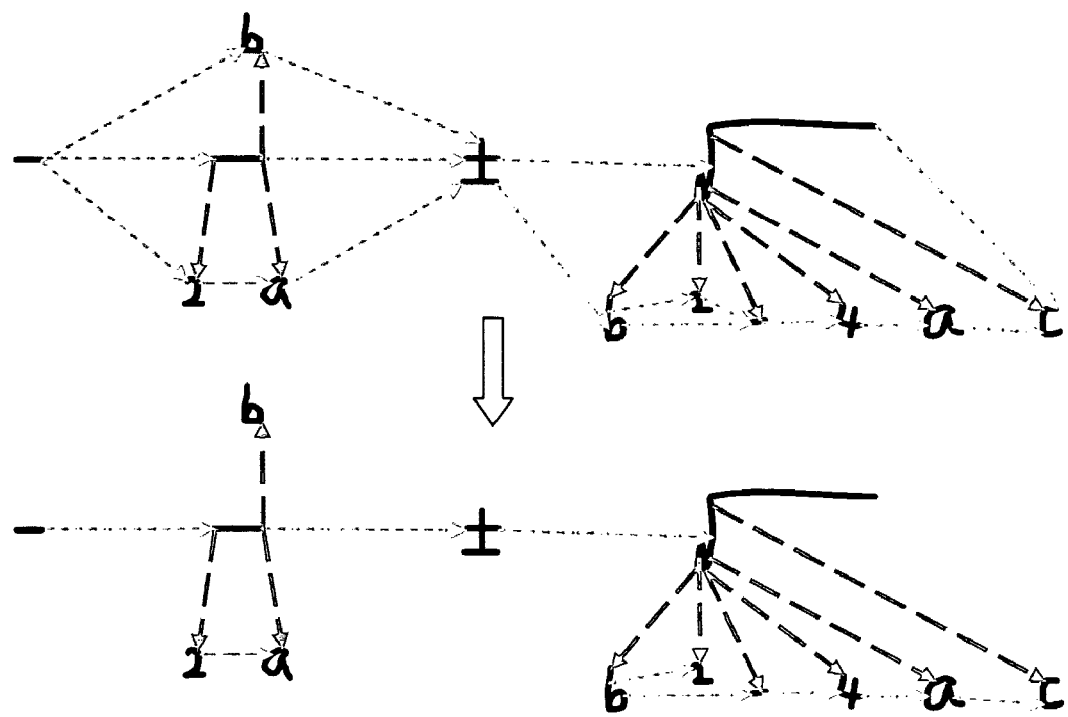

The recursive structure of a mathematical expression may be expressed by a tree. So a search process will be performed in the relational graph for the according tree structures. The search process considers both the two types of edges for each symbol. In order to resolve the structure ambiguities of mathematical expression, the top-N optimized spanning tree will be reserved. FIG. 45 is the search process and FIG. 46 is the input and output of the search process.

Figure 47:
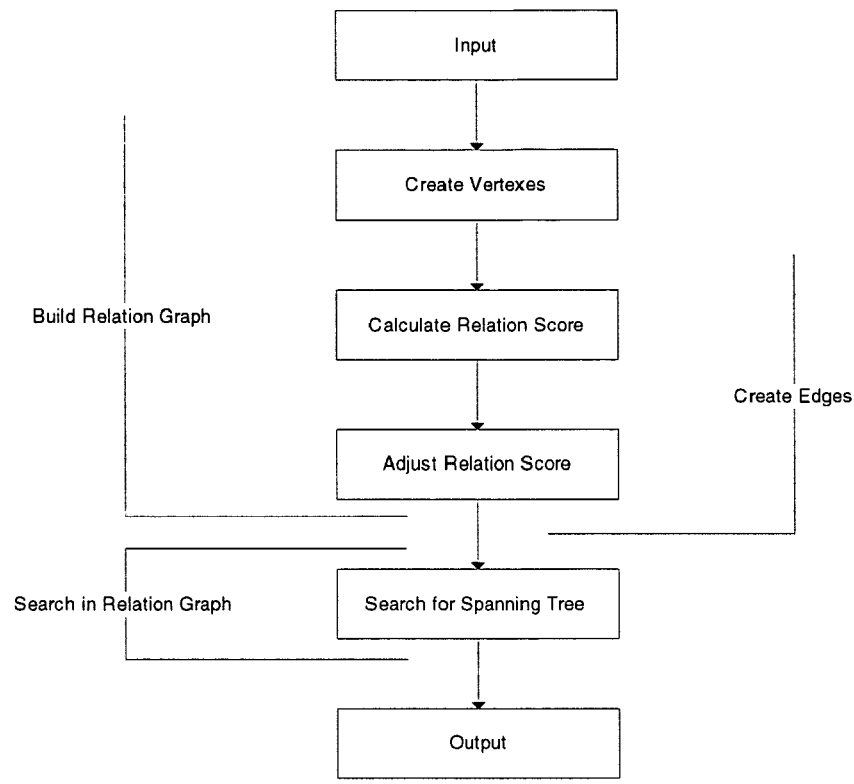
FIG. 47 is a flowchart to illustrate the process of subordinate sub-expression analysis in accordance with at least one aspect of the present invention.

Results found by the previous search process are optimal only with respect to local relational scores, and thus may not guarantee that the result is valid globally. For example, in a result found by the search process, the fraction line may have a numerator, but no denominator. But this kind of global structural information must be considered. So structure validity checking is involved in the subordinate sub-expression analysis component to verify if the results are valid, after previously finding multiple results. Finally, only valid and optimal results will be outputted to the parse tree. An overall configuration of the subordinate sub-expression analysis component is illustrated in FIG. 47.

Subscript, Superscript Analysis and Character Determination

The symbol grouping and recognition component supplies multiple character candidates with confidences for each symbol. The subordinate sub-expression analysis component finds out sub-expressions for each dominant symbol but it does not step into subtle distinctions among subscript, super script and horizontal relations within each sub-expression. This component performs two tasks, one is to select a unique character for each symbol and the other is to analyze the subscript and superscript structures within a sub-expression. In order to deal with the ambiguities existing in a handwritten mathematical expression, aspects of the present invention adopt a graphical search algorithm. The first step is to build a graph for a sub-expression and the second step is to search in the graph for the top-N optimized spanning trees each of which represents a unique mathematical sub-expression.

Figure 58:
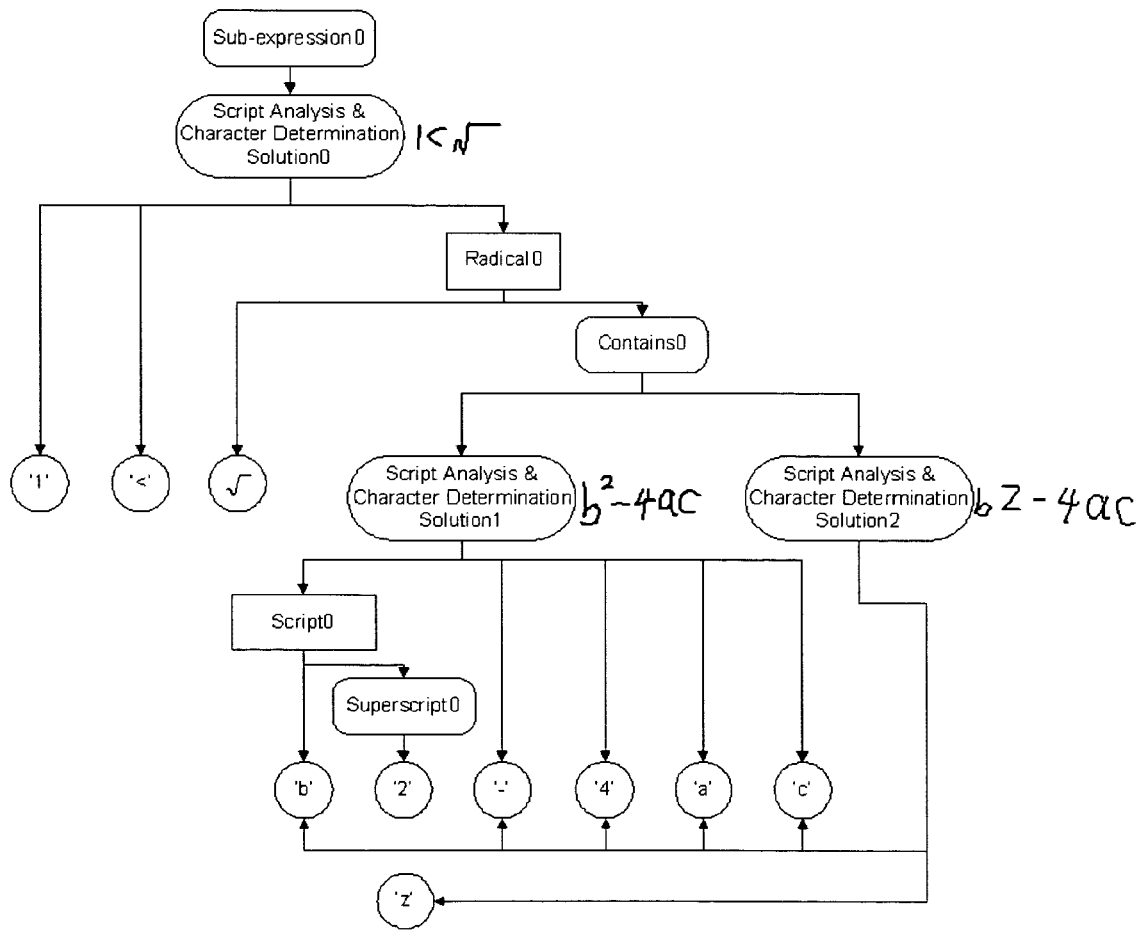
FIG. 58 is an illustrative block diagram of an example of a parse tree change after subscript/superscript and character determination in accordance with at least one aspect of the present invention.
Figure 59:
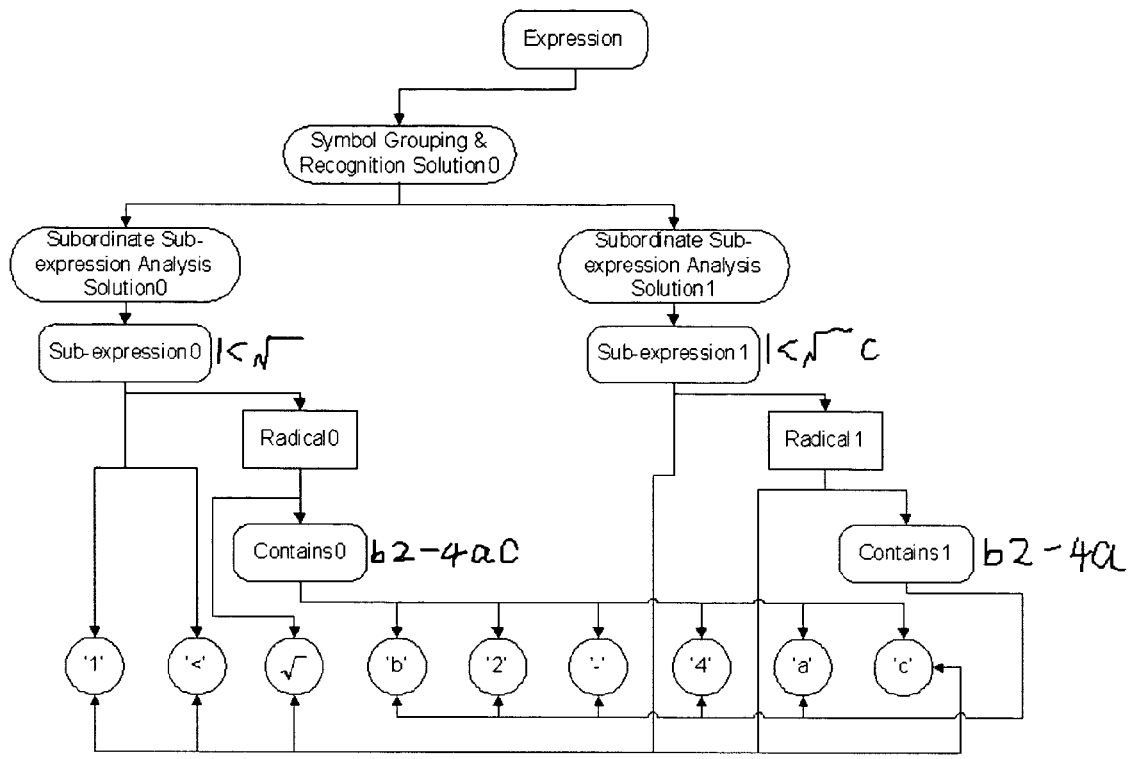
FIG. 59 is an illustrative block diagram of an example of a parse tree changed after subordinate sub-expression analysis in accordance with at least one aspect of the present invention.

The subscript, superscript analysis and character determination component is a component of the whole handwritten mathematical expression recognition system which aims to supply a natural way for humans to input a mathematical expression into computers. The input of this component is a handle of a parse tree. By this handle, the component may access the whole parse tree. Arriving at this point, the parse tree has been processed by the subordinate sub-expression analysis component. It analyzes sub-expressions associated with dominant symbols and creates a new relational node for each such sub-expression. Dominant symbols also belong to some sub-expressions. For an intuitive image, an example snap shot of the parse tree at this time is given at FIG. 59. This component accesses one relational node, gets all the child symbol nodes of the node, processes the symbols nodes, writes back multi-results, accesses another relational node and continues until all the relational nodes are processed. This component will create a new subscript/superscript and character determination solution node in the parse tree for each result. Processed by this component, the parse tree may look like FIG. 58.

Figure 50:
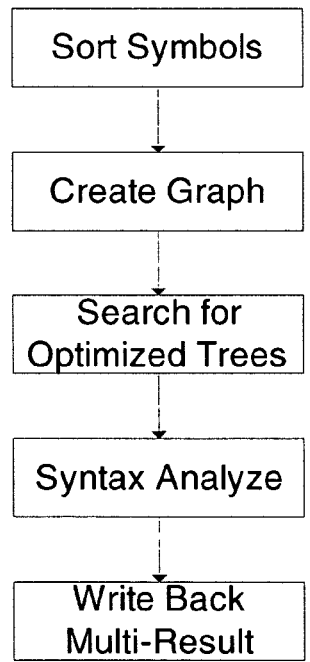
FIG. 50 is an illustrative flowchart of subscript/superscript and character determination component in accordance with at least one aspect of the present invention.

The algorithm deals with each sub-expression in the same way. FIG. 50 is the flowchart of this algorithm. The first step is to sort all the symbols in a sub-expression from left to right. After the symbols are sorted, a graph is built based on the symbols. Then a searching process is performed on the graph to find the top-N optimized spanning trees. Each spanning tree represents a unique mathematical sub-expression. To confirm the validation of each spanning tree, a syntax analyze process is performed on each spanning tree. In this process, invalid spanning trees are removed. The last step is to write back the multiple possible results of the sub-expression to the parse tree. Not only the structure of the sub-expression is unique, but also the character of each symbol is also unique in a specified spanning tree.

There are only three types of relationships namely subscript relation, horizontal relation, and superscript relationship within a sub-expression. A graph includes vertexes and edges. Each vertex represents a particular symbol of the given sub-expression. For each couple of symbols, for each character of a symbol and for each relational type being considered an edge will be created. The edge records the characters of two linked symbols and the relational type between them. In addition, a score as an intensity measure of an edge is also recorded in the edge. In order to reduce the storage cost and time cost, any edge with a lower score than a specified threshold is pruned. FIG. 51 is a finished graph. The score of an edge is the product of three parts as shown in FIG. 53. The first part is a space score which represents the spatial relationship between the two linked symbols. The second part is a context probability score, such as a bi-gram probability, which represents a short syntax grammar for mathematical expressions. The third part is the product of confidences of the corresponding two symbol characters which come from the symbol grouping and recognition component. FIG. 52 is the equation to calculate the edge score. In this equation, A, B are two symbols and R is a specified relational type. The left part is the score of R relationship between A and B. There are four factors in the right part. The first one is the normalized space score for the R relationship between A and B. The second part is the context probability, such as a bi-gram probability. The last two factors are confidences of A and B respectively supplied by the symbol grouping and recognition component.

Figures 54, 55, 56:
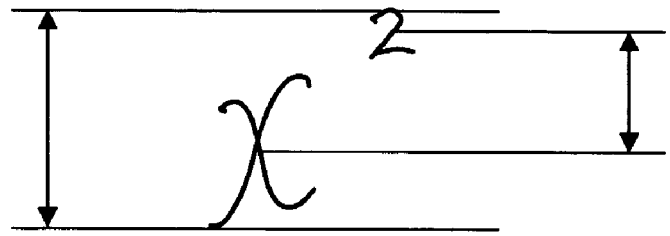
FIG. 54 is an equation for calculating an offset in the vertical direction in accordance with at least one aspect of the present invention.
FIG. 55 is an equation for calculating a space score in accordance with at least one aspect of the present invention.
FIG. 56 is an equation for calculating a bi-gram probability in accordance with at least one aspect of the present invention.

In order to calculate the space score for symbols A and B with respect to relation R, an offset in a vertical direction is calculated by the equation in FIG. 54 firstly. The second step is to calculate space score by the equation in FIG. 55, and then normalize the space score.

Given the characters of A and B and the specified relational type, a bi-gram probability may be expressed by the equation in FIG. 56. It is a conditional probability of B, given the characters of A and the relation R. A large mathematical expression set is used to obtain bi-gram probabilities for all couples of characters and for all the three relational type in consideration. This information is kept down in a table. So, the bi-gram probability for two symbols with respect to a specified relational type may be looked up in a prepared table.

The task of the next step is to find the top-N optimized spanning trees from the built graph that is to select the n−1 best edges from all the edges in the graph if there are n vertexes under the following constraints. Edges in the spanning tree must agree with each other in the structure of the mathematical expression. Edges in the spanning tree must agree with each other in the character of each math symbol.

Figure 57:
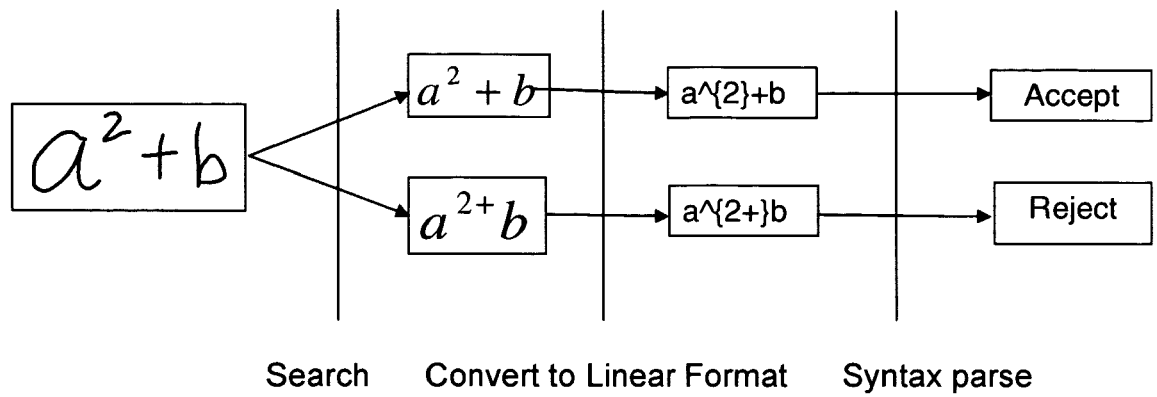
FIG. 57 is an illustrative block diagram for a process for removing invalid spanning trees in accordance with at least one aspect of the present invention.

The search process gets more than one spanning trees each of which represents a unique mathematical sub-expression. Because the search process only utilizes local information, the obtained top-N spanning trees may not represent valid mathematical expressions. In order to resolve this problem, each spanning tree will be analyzed by the inherent grammar in mathematical expressions. The well known Earley's context-free parsing algorithm, as described in Grune, D. and Jacob, C. J. H., *Parsing Techniques: a practical guide*, Ellis Horwood, Chichester, 1990 and Earley, J., *An Efficient Context-Free Parsing Algorithm*, Comm. ACM 13, 2 pp. 94-102, February 1970, is adopted here. It should be understood by those skilled in the art that the above described algorithm is commonly known and understood by those skilled in the art. Spanning trees are converted to linear format that may be analyzed by the algorithm. Only valid spanning tree may pass the algorithm. Those spanning tree that cannot pass the algorithm will be removed. FIG. 57 gives an example of this process.

Mathematical Expression User Interface

Whether due to illegible or poor handwriting of a user or an incorrect evaluation of strokes, inaccurate results may occur. In response, the user will need to correct the inaccuracies. In accordance with one embodiment, there are two places where a correction user interface may be provided: on ink, the handwritten version, or on text, the recognized version. Once ink is recognized, structures in ink are identified. Ink strokes are grouped into symbols and sub-expressions are identified. Corrections on ink may be provided based on the ink structures such as symbols and sub-expressions.

Figure 60:
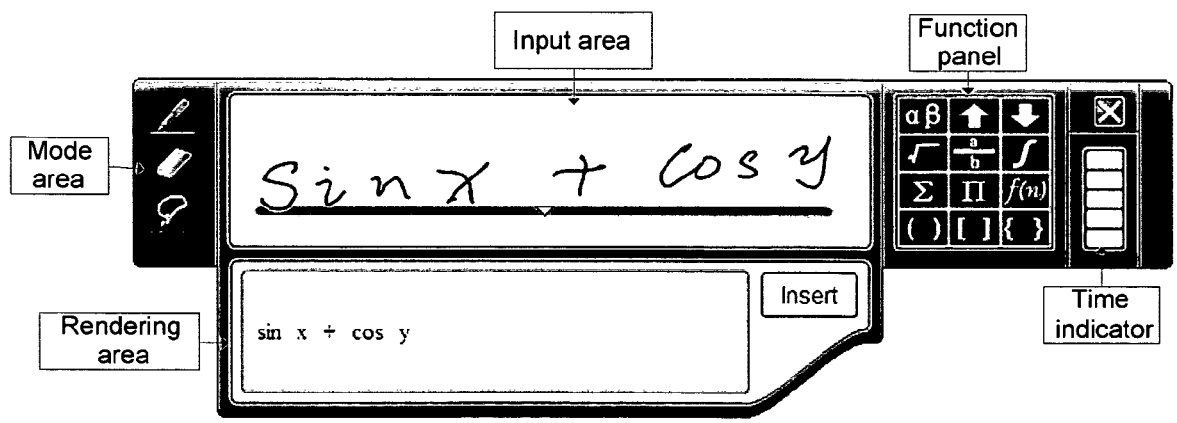
FIG. 60 is an illustrative graphical user interface for inputting mathematical expressions in handwritten form in accordance with at least one aspect of the present invention.

A user interface (UI) in accordance with aspects of the present invention allows users to modify recognized results and helps users to get mathematical expressions correctly, easily, and efficiently. In accordance with aspects of the present invention, the UI may be an input panel, a dialog, or other type of UI that allows a user to handwrite, convert, and/or correct the recognition results and to place the results into an application program the user wants placed, such as into a word processing application program document. An example UI of a mathematical expression input panel may be divided into four parts: an input or handwriting area, a rendering or display result area, a tools area, and a function panel as shown in FIG. 60.

One part of the interface is the input area or handwriting area. Users may write, erase, and select strokes in the input area. There are three modes for the input area: writing, erasing and selecting. The modes are indicated by three icons in the mode area at the left of the input area. The recognition results are shown in the rendering area or result display area below the input area. The area may be shown automatically after the program gets the parse result and hidden automatically when users begin to write or erase, or the area may be shown at all times. The description text may be also shown in the rendering area after users click on the icons in the function panel. There is a button "Insert" at the right of the rendering area. After getting the desired result, users may click "Insert" to send the results to the active application. The function panel is at the right of the input area. There are twelve icons, which represent different function names, in the function panel. The whole layout is compact and functional.

There are two types of ambiguities in the results of mathematical recognition, structural ambiguity and symbol ambiguity. For example, the original strokes have two different grouping schemes in FIG. 61 and each scheme is reasonable. The stroke .

may be interpreted as 'c', '(' or '1' and each interpretation may be correct under different conditions. Candidates for a symbol, sub-expression and the entire expression are provided by the underlying mathematical expression recognition engine. Providing candidates makes it easy for users to make a choice to correct the recognition errors.

A thin line is displayed underneath each sub-expression and the entire expression to indicate that there are candidates. When users hover on a line, the line becomes thickened, as shown in FIG. 62. Users may then click on the thickened line. After clicking on the line, a candidate menu will pop up, as shown in FIG. 63. If a pen hovers above the bounding box of one symbol, the color of the symbol will be changed, for example to gray, indicating there are candidates for the symbol. After a user clicks on the symbol (actually, anywhere inside the bounding box of the symbol), the candidates menu will pop up for users to make a choice, as shown in FIG. 64. Another way users may open the candidates menu is to click anywhere inside the bounding box of a symbol, a sub-expression, or the entire expression, and the system will open the candidates menu for the unit that has the smallest bounding box encompassing the spot the user clicked on. This method allows users not to have to accurately position the pen. Users may click and select in a large enough area to get the candidates menu. The application minimizes the number of operations of the user.

To provide better candidates, candidates at different levels may be provided. For example, when the whole expression is selected, the first time users click to open the candidates menu, top n candidates, where n may be any reasonable number, for example, 3, 5, 8 and so on, of the whole expression may be shown, as shown in FIG. 63. After users choose a candidate from the candidates menu, e.g., the first candidate, more candidates with the same grouping scheme as the candidate selected in the first round may be shown, as shown in FIG. 65. This gives users more choices. Typically, the more candidates shown, the more likely the correct recognition result may be in the candidates list. This maybe measured by the accuracy of symbol recognition and structure recognition given the number of candidates. For example, in one implementation, the accuracy of symbol recognition increases by about 6.5% when the number of candidates provided is increased from 1 to 5. Similarly, the accuracy of structure recognition increased about 8% when the number of candidates provided is increased from 1 to 5. Because candidates are provided for symbols, sub-expressions and the entire expression, the chances that the correct symbol, sub-expression and whole expression is provided are increased.

The mathematical expression input panel is a pen-based application and the interactions may be optimized for a pen. For example, in one implementation, the program may launch the parser automatically two seconds after the user stops editing. The rendering area may be shown automatically after the program gets the parse result and hidden automatically when the user begins to write or erase. A symbol eraser may be implemented, e.g., after the recognition, when a user uses the eraser to erase all strokes of a symbol at a time. The reason for the symbol eraser is when a user erases some strokes after the recognition, it is more likely there is an error with the whole symbol. With the symbol eraser, a user may erase more than one stroke in one removal operation.

There are three dashed lines in gray as reference lines in the input area, as shown in FIG. 66. The middle line gives a user a reference baseline to write. The top and bottom lines give the user upper and lower reference limit lines respectively. The three lines maybe designed such that they do not interfere with the user's focus on the strokes.

Figure 67:
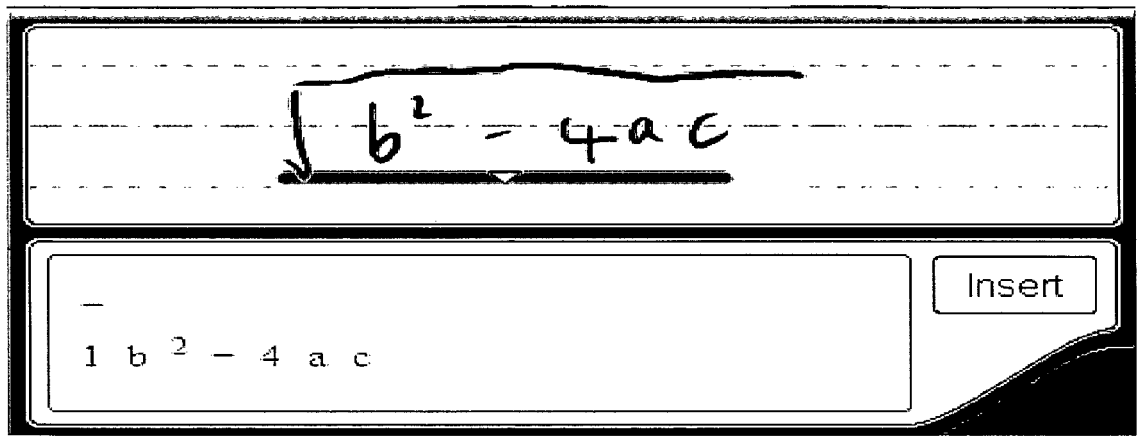
FIG. 67 illustrates another example of the user interface of a mathematical expression input panel in accordance with at least one aspect of the present invention.

Due to the algorithm limitation, there may not be a right choice under some conditions, as shown in FIG. 67. Users may specify the meaning of related strokes in the mathematical expression input panel through some operations. There are twelve functions in the function panel, as shown in FIG. 60. From top to bottom, from left to right, they are "Regroup," "Promote," e.g., to a superscript, "Demote," e.g., to a subscript, "Radical Expression," "Fraction," "Integration," "Summation," "Product," "Function Name," "Parenthesis," "Square Bracket," and "Curly Bracket." There are ToolTips attached to all icons in the function panel. The effect of each function is represented by their names. For example, the function "Radical Expression" specifies the selected strokes as a radical expression.

Figure 68:
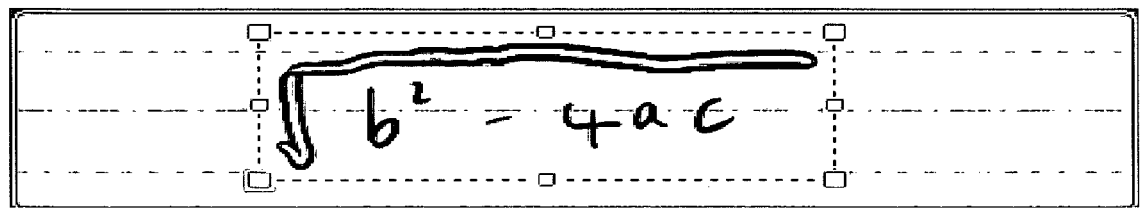
FIG. 68 illustrates another example of the user interface of a mathematical expression input panel in accordance with at least one aspect of the present invention.

The functions may be divided into three parts according to their operations. The operations of "Radical Expression," "Fraction," "Integration," "Summation," and "Product" are:

Select some strokes, as shown in FIG. 68.

Click the icon in the function panel. In this example, the icon is 

Figure 69:
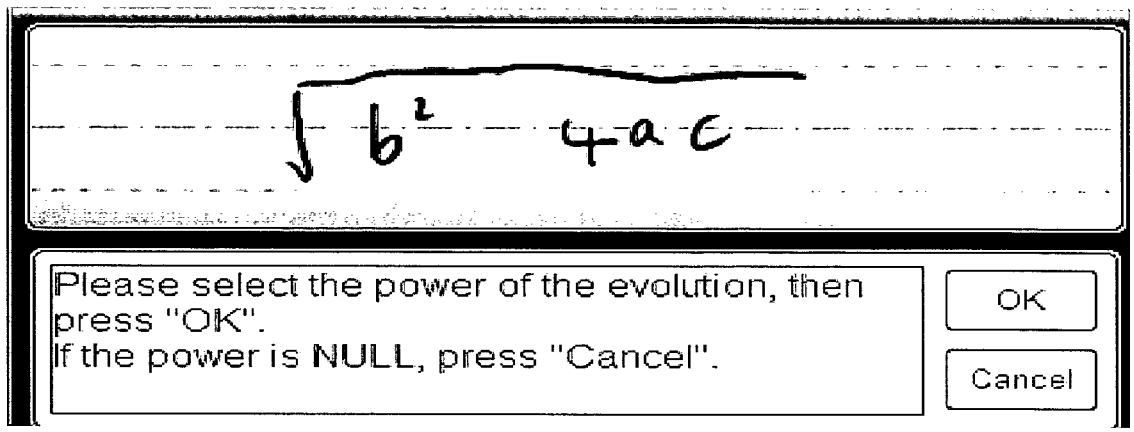
FIG. 69 illustrates another example of the user interface of a mathematical expression input panel in accordance with at least one aspect of the present invention.
Figure 70:
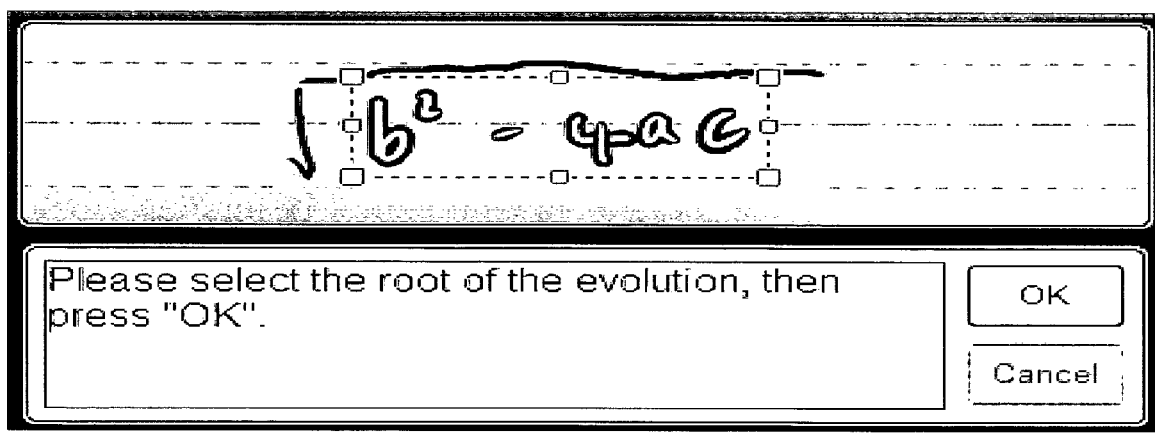
FIG. 70 illustrates another example of the user interface of a mathematical expression input panel in accordance with at least one aspect of the present invention.
Figure 71:
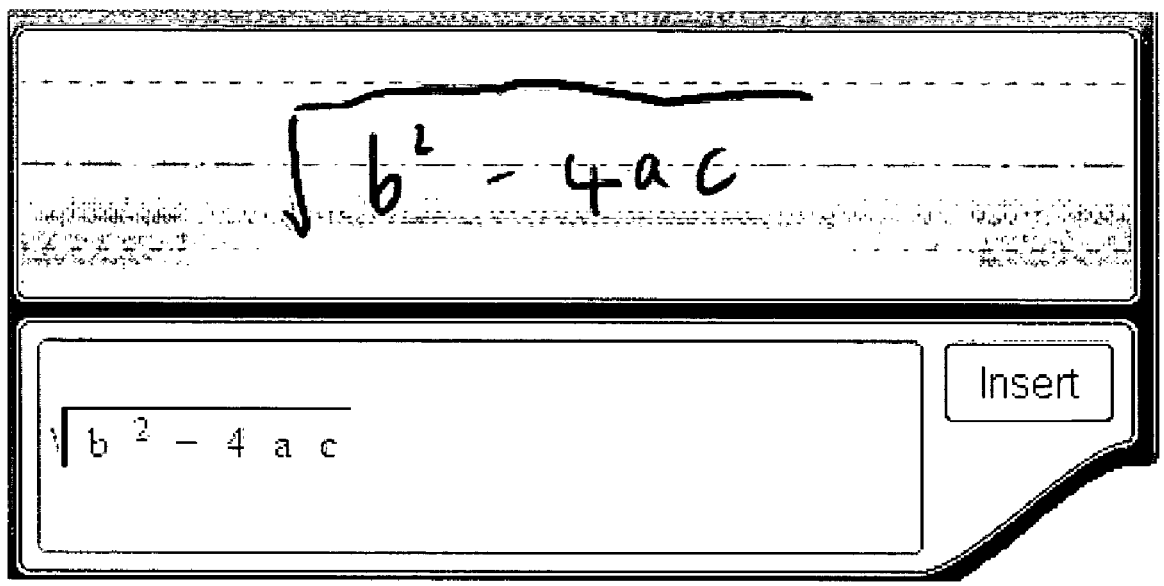
FIG. 71 illustrates another example of the user interface of a mathematical expression input panel with an accurate result expression in accordance with at least one aspect of the present invention.

Act according to the description text in the rendering area to specify the power and root of the evolution. In the example, since there is no power, users will click button "Cancel", as shown in FIG. 69. Then users will select the root of the evolution, as shown in FIG. 70. After pressing button "OK", the correct result is shown in FIG. 71.

The operations of "Regroup", "Promote", "Demote" and "Function Name" are:

Select some strokes.

Click the icon in the function panel.

The strokes selected will be grouped together and recognized as a single symbol or promoted, such as becoming a superscript, or demoted, such as becoming a subscript, or recognized as a function name, such as sin.

The operations of "Parenthesis", "Square Bracket" and "Curly Bracket" are:
Select some strokes.
Click the icon in the function panel.
Select left parenthesis and press button "OK".
Select right parenthesis and press button "OK".

The output data maybe in MathML format, bitmaps or any other format that may represent mathematical expressions.

Figure 72:
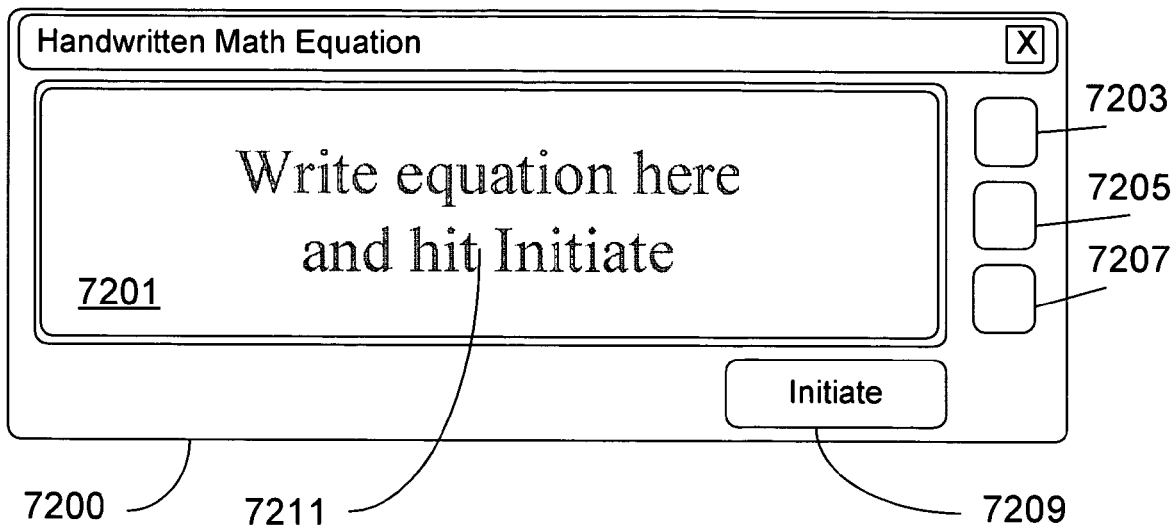
FIG. 72 is another illustrative graphical user interface for inputting mathematical expressions in handwritten form in accordance with at least one aspect of the present invention.

FIGS. 72-85 illustrate another example of a user interface for use with the handwritten mathematical recognition system. While working in an application program, such as Microsoft® Word by Microsoft® Corporation of Redmond, Wash., a user may decide to insert a mathematical expression by hand. Another program may be built into the application program to allow the user to initiate the insertion. When the user chooses to insert the handwritten mathematical expression, an associated dialog box 7200 may be shown. An example of such a dialog box 7200 is shown in FIG. 72.

In this example, the dialog box 7200 is modeless and resizable. A portion of the dialog box 7200 is handwriting area 7201. To the right of handwriting area 7201 are three writing tools: pen 7203, eraser 7205, and clear all 7207. Below handwriting area 7201, an "Initiate" button 7209 is separated from the other buttons. When the dialog box is resized, handwriting area 7201 may be resized accordingly; however, the user interface 7200 may be configured so that the ink and/or the buttons for writing tools 7203, 7205, and 7207 do not move or change size. The relative positions of the buttons and ink may also be configured to remain the same.

When a user activates the pen button 7203, she initiates a writing mode. Similarly, when she activates the eraser button 7205, she initiates an erasing mode. These two modes may be exclusive, i.e., when one is on, the other must be off. When there is no ink in the handwriting area 7201, the clear all 7207 button and the Initiate button 7209 may be configured to be disabled. When there is ink, these two buttons may be configured to be enabled. When the user activates the clear all button 7207, all the ink within handwriting area 7201 is removed and the user initiates a writing mode. When a user activates the Initiate button 7209, all the ink is sent to the mathematical expression recognizer and the user initiates the writing mode.

In accordance with one embodiment, handwriting area 7201 defaults to the writing mode and is cleared every time the dialog box 7200 is opened. As such, no ink is saved. If a user selects an equation that was previously entered by handwriting, the dialog box 7200 will not open with the original handwriting filled in. In an alternative embodiment, the user interface 7200 may be preconfigured and/or allow for a user to configure the user interface 7200 so that selection of an equation that was previously entered in handwriting will open the dialog box 7200 with the original handwriting filled in.

Figure 73:
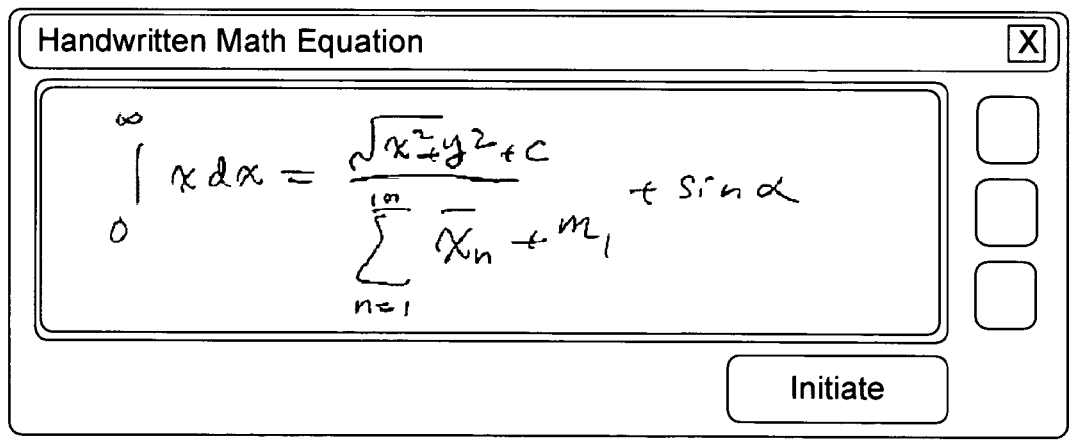
FIG. 73 is the example graphical user interface shown in FIG. 72 with a handwritten mathematical expression in a handwriting area in accordance with at least one aspect of the present invention.

The text "Write equation here and hit Initiate" 7211 may be configured to appear as a watermark in handwriting area 7201. Such a configuration helps a user to know where to start. Once the user starts writing, the watermark is removed and the clear all button 7207 and Initiate button 7209 may be enabled, such as shown in FIG. 73.

Figure 74:
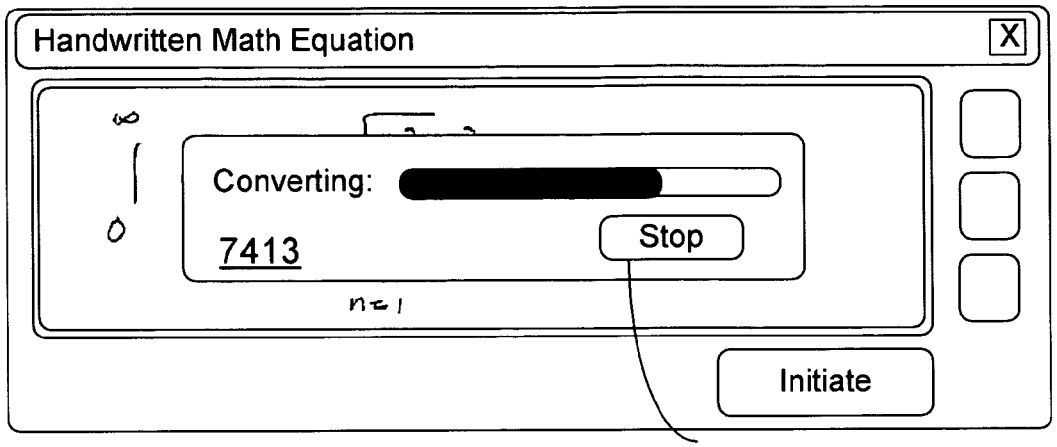
FIG. 74 illustrates another example of the graphical user interface shown in FIG. 73 with a progress bar in accordance with at least one aspect of the present invention.

Once the user finishes writing, she may activate the Initiate button 7209 to start the mathematical expression recognition operation as described herein. The system may be configured to show a progress bar 7413, such as shown in FIG. 74. The user may stop the recognition process by activating a Stop button 7415. When the user activates the Stop button 7415, the recognition system stops and the progress bar 7413 goes away. Progress speed in the progress bar 7413 may be estimated by the number of strokes and other parameters provided by the mathematical expression recognizer and/or by any other of a number of different methods. When the recognition process is finished, a result display area is shown, with the recognized equation.

Figure 75:
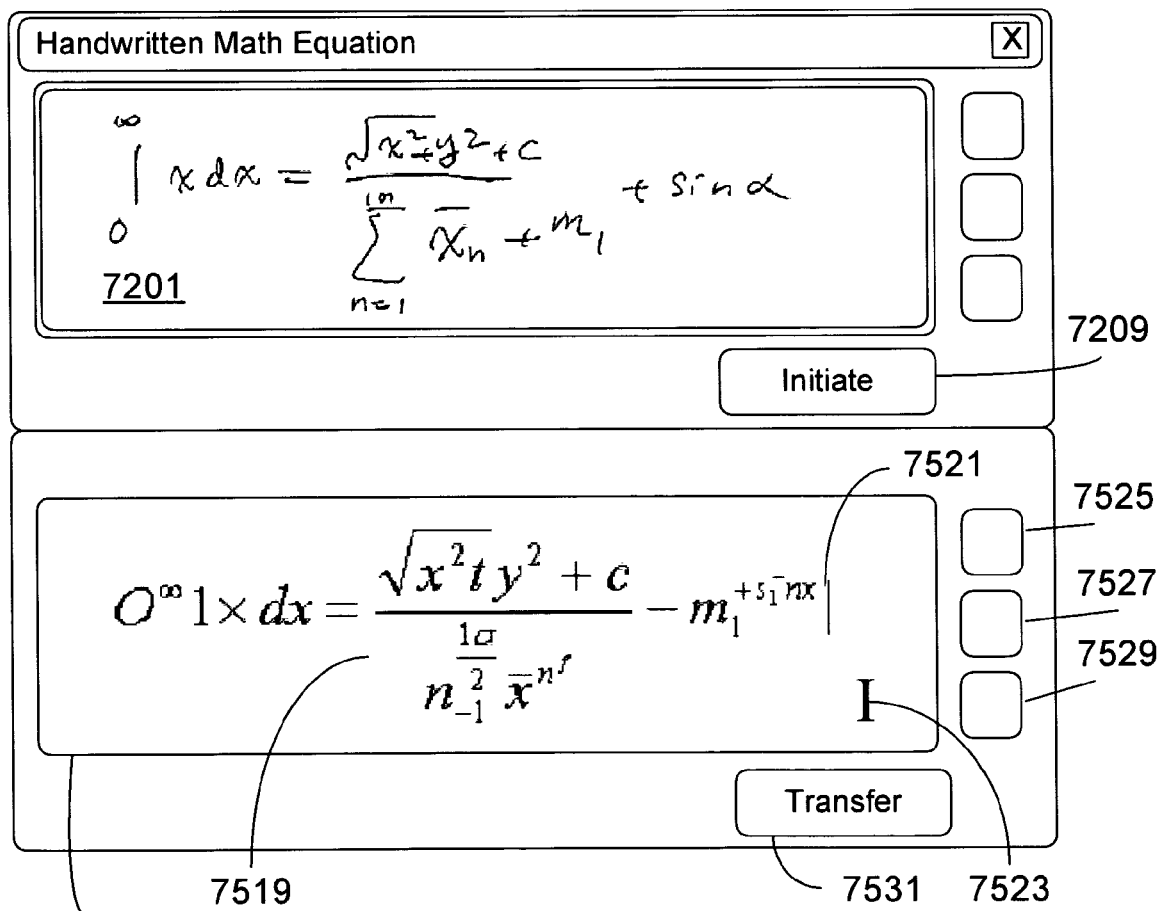
FIG. 75 illustrates another example of the graphical user interface shown in FIG. 73 with a result display area in accordance with at least one aspect of the present invention.
Figures 80, 81, 82, 83:
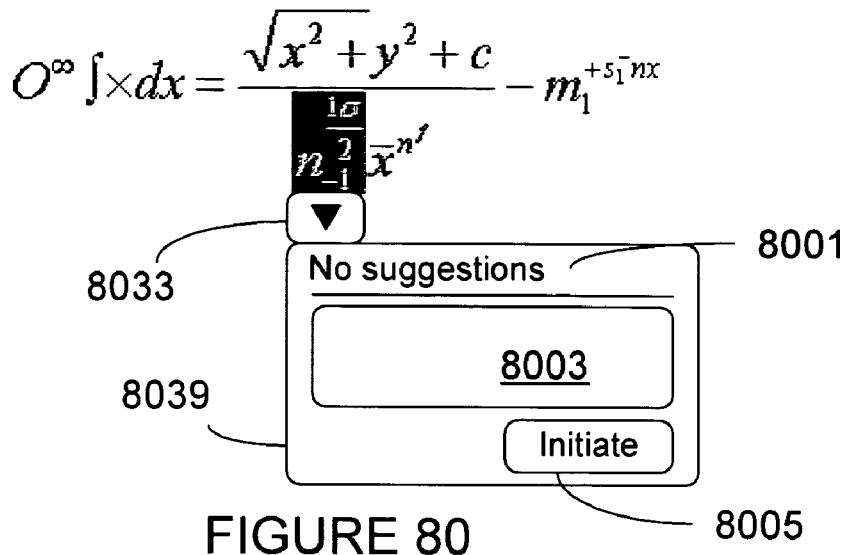
FIG. 80 illustrates another example of a graphical user interface with a dropdown menu in accordance with at least one aspect of the present invention.
FIG. 81 illustrates another example of a graphical user interface with drag and drop capabilities in accordance with at least one aspect of the present invention.
FIG. 82 illustrates another example of a graphical user interface with drag and drop capabilities in accordance with at least one aspect of the present invention.
FIG. 83 illustrates another example of a graphical user interface with drag and drop capabilities in accordance with at least one aspect of the present invention.
Figures 84, 85:
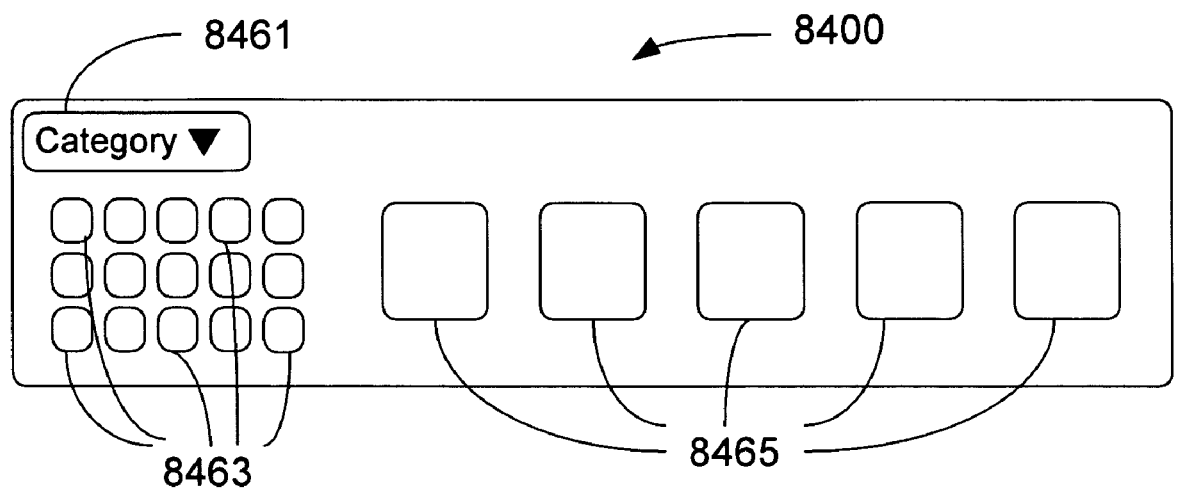
FIG. 84 illustrates another example of a graphical user interface of a symbol picker in accordance with at least one aspect of the present invention.
FIG. 85 illustrates another example of a graphical user interface with placeholders for a symbol in accordance with at least one aspect of the present invention.

As shown in FIG. 75, result display area 7517 is below handwriting area 7201. When a recognized equation is first shown 7519, an IP 7521 is placed at the end of the equation, e.g., a vertical flashing bar, such as shown. The cursor 7523 in result display area 7517 may be the "I" beam, which is similar to the cursor display position shown in other application programs, such as Microsoft® Word. A user may insert and select with the IP 7521 in result display area 7517. Common keys on a keyboard, such as arrow keys, backspace, and delete, may operate in result display area 7517. Three buttons are provided in the result display area: all symbols 7525, delete 7527, and undo 7529. Corresponding operations and functions of these buttons are described herein below.

A light gray mask may be applied to one or more portions of the upper zone of dialog box 7500. Such a mask may be used to guide the attention of the user away from the upper zone and focus on the result display area 7517 as correction functionalities may be provided there. A user still may erase, clear, and rewrite in the handwriting area 7201. When the user moves her cursor position into the upper zone, the mask may be removed. In such a situation, the cursor may become an arrow. When the user moves her cursor position into handwriting area 7201, the cursor may become the pen cursor, indicating that the user may write. As soon as the user writes or erases a stroke, result display area 7517 may be emptied or may be collapsed. Otherwise, result display area 7517 stays. In one implementation, when the user activates the Initiate button 7209, a determination is made as to whether there have been any changes to the ink since the last time the Initiate button 7209 was activated. If not, the mathematical expression recognizer is not started and the last recognized equation is displayed. In another implementation, no matter whether there have been any changes to the ink, all the ink is recognized again as if for the first time.

If the user is satisfied with the result, she may activate a Transfer button 7531 to insert the recognized equation 7519 into the application program, such as Microsoft® Word. In response, any ink in handwriting area 7201 is cleared, and the result display area 7517 is collapsed. The data sent to the application program may be in a specific type of format, such as MathML, bitmap, or any other format acceptable by the application program. When there is more than one application program open, the data may be configured to be sent to the application program in focus.

With the correction on ink configuration described above, one problem is that users may find difficulty understanding ink structure errors, such as symbol grouping errors. For example, in the equation shown in FIG. 75, strokes for the summation sign are not grouped together. One stroke, or group, is recognized as a fraction line, and another stroke, or group, is recognized as a "2."

Although possible to correct this inaccuracy on the ink, it is easier for a user to identify what is inaccurate in the recognized equation 7519. For example, in the equation 7519 shown in FIG. 75, the user may determine that the summation sign is missing and that other elements have been recognized. The user then may delete what is wrong and insert a summation sign.

Besides grouping errors, another common type of error is a layout error, e.g., superscript/subscript relationships and control regions of dominant symbols, which are recognized inaccurately. Direct manipulation, such as gesture and drag/drop, are simple and convenient ways to correct these errors.

Correction on text may include providing candidates, allowing rewriting, enabling drag and drop, and providing editing capabilities. Multiple candidates are provided for an equation, sub-expressions, and symbols. Users may rewrite part of an equation. Drag and drop allows easy and convenient correction of layout errors. By providing IP, allowing soft keyboard entry of symbols, and allowing insertion, selection, and deletion, sufficient editing capabilities ensure all errors may be corrected. In addition to correction user interface provided in result display area 7517, users may also write and/or erase in handwriting area 7201.

The system may be configured to implement "pin" functionality, i.e., when a user makes a correction to a candidate, the changes are reflected in other candidates. Or, the system may be configured not to implement the "pin" functionality, i.e. when a user makes a correction to a candidate, the changes are not respected by other candidates. In such a configuration, one implementation may be once users make a correction, such as choosing a candidate from the candidate list, rewrite, insertion, and deletion, candidates for the entire equation will not continue to be shown, because the candidates may be far off from what the user has corrected so far and may cause user confusion. Similarly, if the correction is inside a sub-expression, candidates for the sub-expression will not continue to be shown. Candidates for a written symbol may always be available.

A user may select any part of the recognized equation 7519, as long as the selection is allowed. If the user activates anywhere else in the recognized equation 7519, selection goes away and IP 7521 is placed where clicked.

When a user selects the entire equation, candidates 7635 for the equation 7519 are provided in the dropdown menu 7639. In the example shown in FIG. 76, the entire equation 7519 is selected. When the user activates the dropdown button 7633, candidates 7635 for the equation 7519 are shown. The user may choose from the candidates list. In response, the equation in result display area 7517 is replaced by the selected candidate, selection goes away, and IP 7521 is placed at the end of the equation. If the user does not want to choose anything from the list, she may choose "Enter Expression Again" 7637 to rewrite the equation. When the user chooses "Enter Expression Again" 7637, it may perform the same operation as choosing the clear all button 7207, i.e., all ink is cleared, and result display area 7517 is collapsed.

When a user selects a single character, candidates for the character are provided in the dropdown menu. In the example shown in FIG. 77, the character "t" 7701 is selected. When the user activates the dropdown button 7733 below the character 7701, candidates 7735 for the character 7701 are shown. The user may select "+" from the list. In such a situation, character "t" 7701 will be replaced by "+," selection goes away, and IP is placed after "+." If the correct character is not in the list, the user may rewrite the character in the "Enter Expression Again" area 7737. The "Enter Expression Again" area 7737 is for quick writing to correct errors. For example, the "Enter Expression Again" area 7737 may be a fix-sized, without the pen 7203, eraser 7205, and clear all 7207 tools. When the user activates an Initiate button 7709, dropdown menu 7739 stays. The ink that is written is fed to the mathematical expression recognizer system. When a result is returned, dropdown menu 7739 goes away, and selection is replaced by the recognition result, after which IP is placed.

During the recognition process, a progress bar may be shown. In such a situation, the user may activate a Stop button to stop the recognition. When the user activates the Stop button, dropdown menu 7739 stays, and the progress bar goes away.

If the user chooses a dominant symbol from the list or the recognition result is a single dominant symbol, placeholders for control regions such as above fraction line, below fraction line, lower limit, upper limit, etc., are inserted along with the symbol. As illustrated in FIG. 78, placeholders 7851 and 7853 are shown as dotted line boxes. Alternatively, other designs may be used to show placeholders, such as using a blank area instead of dotted line boxes. The user may place IP in a placeholder 7851, 7853 and insert symbols and/or drag and drop into the placeholders 7851, 7853. In the example shown in FIG. 78, the user selects the integral sign to replace the character "1." Placeholders for the lower limit 7853 and upper limit 7851 are inserted. Locations of the placeholders are the same as default drop zones, which is described herein below.

When a user selects a sub-expression, candidates for the sub-expression are provided in the dropdown menu. In the example shown in FIG. 79, the sub-expression $\sqrt{x^2+y^2}+c$ is selected. The user activates the dropdown button 7933 below the selection. Candidates 7935 for the sub-expression are then shown. In this example, no candidate is correct. As such, the user may rewrite the sub-expression in area 7937. When the user activates an Initiate button 7909, dropdown menu 7939 stays. The ink that is written is fed to the mathematical expression recognizer system. When the result is returned, dropdown menu 7939 goes away, and the selection is replaced by the recognition result, after which IP is placed. During the recognition process, a progress bar may be shown. In such a situation, the user may activate a Stop button to stop the recognition. When the user activates the Stop button, dropdown menu 7939 stays, and the progress bar goes away. If the sub-expression happens to be a single character, candidates for the character will be shown.

If the selection is neither a character nor a sub-expression, no candidates are provided in the dropdown menu. The users may rewrite the expression. In the example shown in FIG. 80, the part $$n_{-1}^{\frac{1\sigma}{2}}$$

is selected. The selection is neither a character nor a sub-expression. The user may activate dropdown button 8033 below the selection, where no candidates are shown. The user may rewrite the expression in area 8003. When the user activates an Initiate button 8005, dropdown menu 8039 stays. The ink that is written is fed to the mathematical expression recognizer system. When a result is returned, dropdown menu 8039 goes away, and the selection is replaced by the recognition result, after which IP is placed. During the recognition process, a progress bar may be shown. In such a situation, the user may activate a Stop button to stop the recognition. When the user activates the Stop button, dropdown menu 8039 stays, and the progress bar goes away.

When there is a selection, a user may drag and drop the selection. For example, the user may drag and drop to change subscript/superscript relationships, range of a radical sign, range of the numerator and denominator, etc. Drop locations may be shown in the user interface such as an "I" beam or shaded boxes shown in FIGS. 81, 82, and 83. Alternatively, other designs may be used to show the drop locations. In the example shown in FIG. 81, the superscript $^{+sinx}$ is selected to be dropped to after $m_1$, i.e., changed from a superscript to a non-superscript. In the example shown in FIG. 82, the superscript $n^f$ is selected to be dropped to the subscript of $\bar{x}$, i.e., changed from a superscript to a subscript. In the example shown in FIG. 83, the expression $y^2$ is selected to be dropped inside the radical sign after the character "t". In this situation, when there is a selection, the dropdown button described above may be shown. However, when the user starts dragging the selection, the dropdown button goes away.

The drop zones for each character maybe defined. For example, for a fraction line, the drop zones are Above, Below, Before and After. For an integral sign, the drop zones are Upper Limit (to the side of centered), Lower Limit(to the side of centered), Before and After.

The size of the drop zones may be configured based upon any of a number of different manners, including, but not limited to, the size of the result display area plus a buffer zone. The buffer zone may include the Before zone of the first character, the After, Superscript, and Subscript zones of the last character, and the Hat zones of all the characters. When there is nothing in a zone, the size of the zone is the bounding box of a single character. A dotted line "I" bar may be configured to indicate Before and After drop zones, and a shaded rectangle may be configured to indicate Above, Below, Radicand, Index, Hat, Base, Upper Limit, Lower Limit, Superscript, and Subscript drop zones.

The cursor position may be moved to a location that is the intersection of several drop zones. Rules may be devised to decide which drop zone to show. For example, Show only one zone of a character.

Show at most one dotted line "I" bar.

Show at most one shaded rectangle.

A dotted line "I" bar is always shown inside a shaded rectangle to indicate IP in the shaded rectangle. When there is nothing in a shaded rectangle, a dotted line "I" bar is shown at the beginning of the rectangle.

If zone A's parent character is inside zone B, show only zone A.

After the drop, the layout of the recognized equation may need to be changed. For example, a fraction line may need to be lengthened or shortened or a summation sign may need to be pushed down because it now has an upper limit.

Sufficient editing capabilities may be provided to ensure all errors in the recognized equation may be corrected. Three tools are provided in the result display area: all symbols, delete, and undo. Their behavior is explained below in Table 2.

TABLE 2

Example Behavior of Editing Tool Buttons

| Button Label | Action | Enable/ Disable |
|---|---|---|
| all symbols | Opens symbol (character) picker. Users choose a character and insert. The character is inserted at the IP. Note that if there is a selection (which may be multiple characters), the character will replace the selection. | Always enabled. |
| delete | At IP, deletes the character to the right. When there is selection, deletes selection. | Always enabled. |
| undo | Undo previous action, including candidate selection, convert, insertion of a single character, deletion, and drag/drop. | Disabled when there is no previous action. |

The symbol picker 8400 may be as simple as a list of all characters supported by the mathematical expression recognition system. Alternatively, symbol picker 8400 may be implemented in the form of a keyboard with all the characters as buttons on the keyboard. For example, symbol picker 8400 may replicate a categorization of all symbols, excluding those not supported by the mathematical expression recognizer system. For example, the categories may include: Algebra, Arrows, Binary Operators, Calculus, Geometry, Greek and Latin Characters, Operators with Limits, Relational and Logical Operators, Trigonometry, etc. A smaller set of categories may alternatively be employed. A dropdown menu 8461 may be used to switch between categories, with regular symbols 8463 being listed on the left, while dominant symbols 8465 are separately listed on the right. Symbol picker 8400 may be a modeless dialog box that users keep open to insert multiple symbols. For example, users may dock the dialog box below the text window.

When a user clicks on a symbol, it is inserted at the IP. In the example shown in FIG. 85, the user inserts the summation sign to replace the selection $$n_{-1}^{\frac{1\sigma}{2}}.$$

When the user inserts a dominant symbol 8541, placeholders 8551 and 8553 for control regions such as above fraction line, below fraction line, lower limit, upper limit, etc., are inserted along with the symbol 8541. Placeholders 8551 and 8553 are shown as dotted line boxes. The user may place IP in a placeholder and insert symbols and/or drag and drop into the placeholders. When there is a placeholder, one way to implement this is the placeholder becomes the drop zone, i.e., when the drop cursor is inside the placeholder, it becomes a shaded rectangle. When there is a placeholder and the drop cursor is in the drop zone defined for the character but not inside the placeholder, the drop zone user interface may not show.

If the user does not place anything in a placeholder 8551 or 8553, in one implementation, the placeholder is left empty in the result display area. The user may select and delete a placeholder 8551 and/or 8553. Locations of lower limit 8553 and upper limit 8551 placeholders are centered for most operators except for a single integral where locations of the lower limit and upper limit placeholders are to the side. As mentioned previously, the user may erase and rewrite in the handwriting area and have the handwritten equation recognized again.

With respect to an application programming interface (API), various aspects of the present invention may be provided through an API. For example, public APIs may interface with an operating system to allow the operating system to provide the various features of the present invention. In one embodiment, a software architecture stored on one or more computer-readable media for processing data representative of a handwritten mathematical expression recognition computation may include a component configured to recognize handwritten mathematical expressions and an application programming interface to access the component. An API may receive a request to recognize a handwritten mathematical expression, access the necessary function(s) of the recognition component to perform the operation, and then send the results back to an operating system. The operating system may use the data provided from the API to perform the various features of the present invention. Software applications may also perform various aspects of the present invention through APIs in the same way as described in the above example.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. A computer system with a processor and a memory for handwritten mathematical expression recognition, the computer system comprising:
a symbol grouping and recognition component configured to group input strokes corresponding to a handwritten mathematical expression into symbols and to recognize the symbols, based upon intra-group and inter-group information associated with the input strokes, the intra-group information associated with the input strokes includes a confidence representative of whether the input strokes are a certain symbol provided by the recognition of a symbol, and a score representative of whether the input strokes are a valid symbol based upon intra-group spatial information that includes a size difference among the input strokes and an offset measurement among the input strokes; and
a tabular structure analysis component configured to determine whether at least one of the symbols corresponds to a tabular structure by dividing the grouped input strokes into rows and columns in accordance with a size of the tabular structure and indicating that the rows and columns correspond to a tabular structure when the tabular structure has a bracketing character to its left
wherein the components are implemented as computer-executable instructions stored in the memory for execution by the processor.

2. The computer system of claim 1, further comprising a subordinate sub-expression analysis component configured to determine dominant symbol candidates of the symbols and to determine subordinate symbols for the dominant symbol candidates.

3. The computer system of claim 2, further comprising a subscript/superscript analysis and character determination component configured to identify subscript/superscript structures and symbol characters.

4. The computer system of claim 3, further comprising a semantic structure analysis component configured to determine the semantic structure of a mathematical expression.

5. The computer system of claim 4, further comprising a data structure of a parse tree configured to store multiple outputs from the components.

6. The computer system of claim 5, wherein the symbol grouping and recognition component is further configured to store the symbols in the data structure of the parse tree.

7. The computer system of claim 6, wherein the tabular structure analysis component is further configured to store the at least one of the symbols in the data structure of the parse tree.

8. The computer system of claim 7, wherein the subordinate sub-expression analysis component is further configured to store the dominant symbol candidates and subordinate symbols in the data structure of the parse tree.

9. The computer system of claim 8, wherein the subscript/superscript analysis and character determination component is further configured to store the subscript/superscript structures and symbol characters in the data structure of the parse tree.

10. The computer system of claim 1, further comprising a user interface component configured to receive the input strokes and to recognize candidates of the handwritten mathematical expression, wherein multiple recognized candidates are provided for selection at an expression level, a sub-expression level, and a symbol level, wherein mechanisms are provided for reviewing and correcting the recognized candidates.

11. A method performed by a computing device with a processor and a memory for recognizing a handwritten mathematical expression, the method comprising steps of:
receiving a plurality of input strokes corresponding to a handwritten mathematical expression;
grouping the received input strokes into grouped input strokes based upon intra-group and inter-group information associated with the input strokes; and
providing a candidate list of recognized candidate expressions based upon the input strokes, the providing of a candidate list including determining whether a symbol of the mathematical expression corresponds to a tabular structure by
dividing the grouped input strokes into rows and columns, wherein the tabular structure is one of a matrix and a multi-line expression, the dividing including dividing the symbol into columns separated by blank columns and dividing each column into rows separated by blank rows;
when the symbol has an open bracketing character to its left and a close bracketing character to its right, processing the rows and columns as a matrix; and
when the symbol has an open bracketing character but no close bracketing character to its right, processing the rows and columns as a multi-line expression
wherein the receiving, grouping, and providing are performed by the processor executing instructions stored in the memory.

12. The method of claim 11, further comprising steps of:
determining dominant symbol candidates of the symbols; and
determining subordinate symbols for the dominant symbol candidates.

13. The method of claim 12, further comprising a step of determining subscript/superscript structures and symbol characters.

14. The method of claim 13, further comprising a step of creating a parse tree in which to store multiple outputs corresponding to the plurality of input strokes.

15. The method of claim 14, further a step of storing the multiple outputs in the parse tree.

16. A software architecture encoded upon one or more computer storage media for processing data representative of a handwritten mathematical expression, comprising:
at least one component configured to recognize a mathematical expression based upon a plurality of input strokes corresponding to a handwritten mathematical expression, the component including
a symbol grouping component configured to group input strokes corresponding to a handwritten mathematical expression into symbols based upon intra-group and inter-group information associated with the input strokes; and
a tabular structure analysis component configured to determine whether a symbol of the mathematical expression corresponds to a tabular structure by dividing the grouped input strokes into rows and columns, when the symbol has a bracketing character to its left and a bracketing character to its right, processing the rows and columns as a matrix; and when the symbol has a bracketing character only to its left, processing the rows and columns as a multi-line expression; and at least one application program interface to access the component.

17. The software architecture encoded upon one or more computer storage media of claim 16, wherein the at least one component is further configured to provide a candidate list of recognized mathematical expressions.

\* \* \* \* \*